US005777762A

United States Patent [19]
Yamamoto

[11] Patent Number: 5,777,762
[45] Date of Patent: Jul. 7, 1998

[54] NETWORK SYSTEM FOR PERFORMING BIDIRECTIONAL TRANSMISSION, AND NODE DEVICE AND TRANSMISSION CONTROL METHOD USED IN THE SYSTEM

[75] Inventor: Mitsuru Yamamoto, Yokohama, Japan

[73] Assignee: Canon Kabushiki Kaisha, Tokyo, Japan

[21] Appl. No.: 937,783

[22] Filed: Sep. 24, 1997

Related U.S. Application Data

[63] Continuation of Ser. No. 658,776, Jun. 5, 1996, abandoned.

[30] Foreign Application Priority Data

Jun. 6, 1995 [JP] Japan .................................. 7-162876
May 25, 1996 [JP] Japan .................................. 8-153369

[51] Int. Cl.$^6$ .............................. H04J 4/00; H04J 14/00
[52] U.S. Cl. .................... 359/123; 359/118; 359/125; 370/389; 370/429
[58] Field of Search .......................... 359/118, 123, 359/125, 127, 135, 137, 157, 173; 370/389, 412, 415, 428–429, 473–474

[56] References Cited

U.S. PATENT DOCUMENTS

| | | | |
|---|---|---|---|
| 4,873,681 | 10/1989 | Arthurs et al. ........................ | 359/123 |
| 5,206,856 | 4/1993 | Chung .................................. | 370/400 |
| 5,600,469 | 2/1997 | Yamazaki .............................. | 359/135 |
| 5,617,233 | 4/1997 | Boncek .................................. | 359/123 |

*Primary Examiner*—Kinfe-Michael Negash
*Attorney, Agent, or Firm*—Fitzpatrick, Cella, Harper & Scinto

[57] ABSTRACT

This application provides a network system that can obviate the need for arbitration control, and can realize bidirectional communications and loopback communications. In the network system, a first channel to be transmitted in the first direction, a second channel to be transmitted in the second direction, and third and fourth channels distinguished from the above-mentioned channels are used, and the packet to be looped back is transmitted using either the third or fourth channel. The transmission direction of the third or fourth channel is determined or changed in the self node device or in another node device, thus realizing loopback communications. In order to output a packet temporarily stored in a buffer using a desired channel, a device for changing the channel to which the buffer is connected is used, and the packet is read out from the buffer in correspondence with the changed channel to be connected. As the device for changing the channel to which the buffer is connected, a variable channel transmitter or a selector is used.

97 Claims, 33 Drawing Sheets

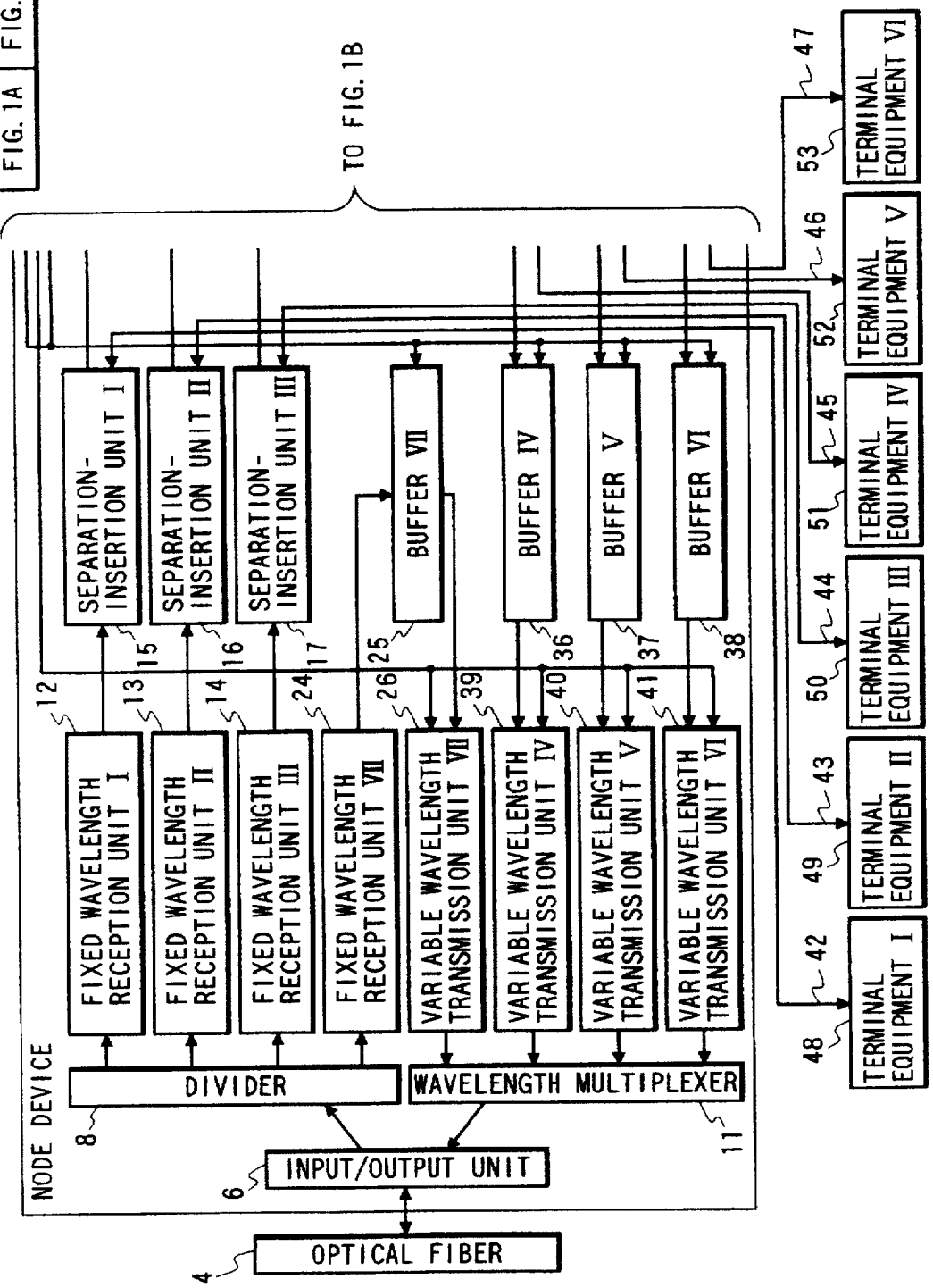

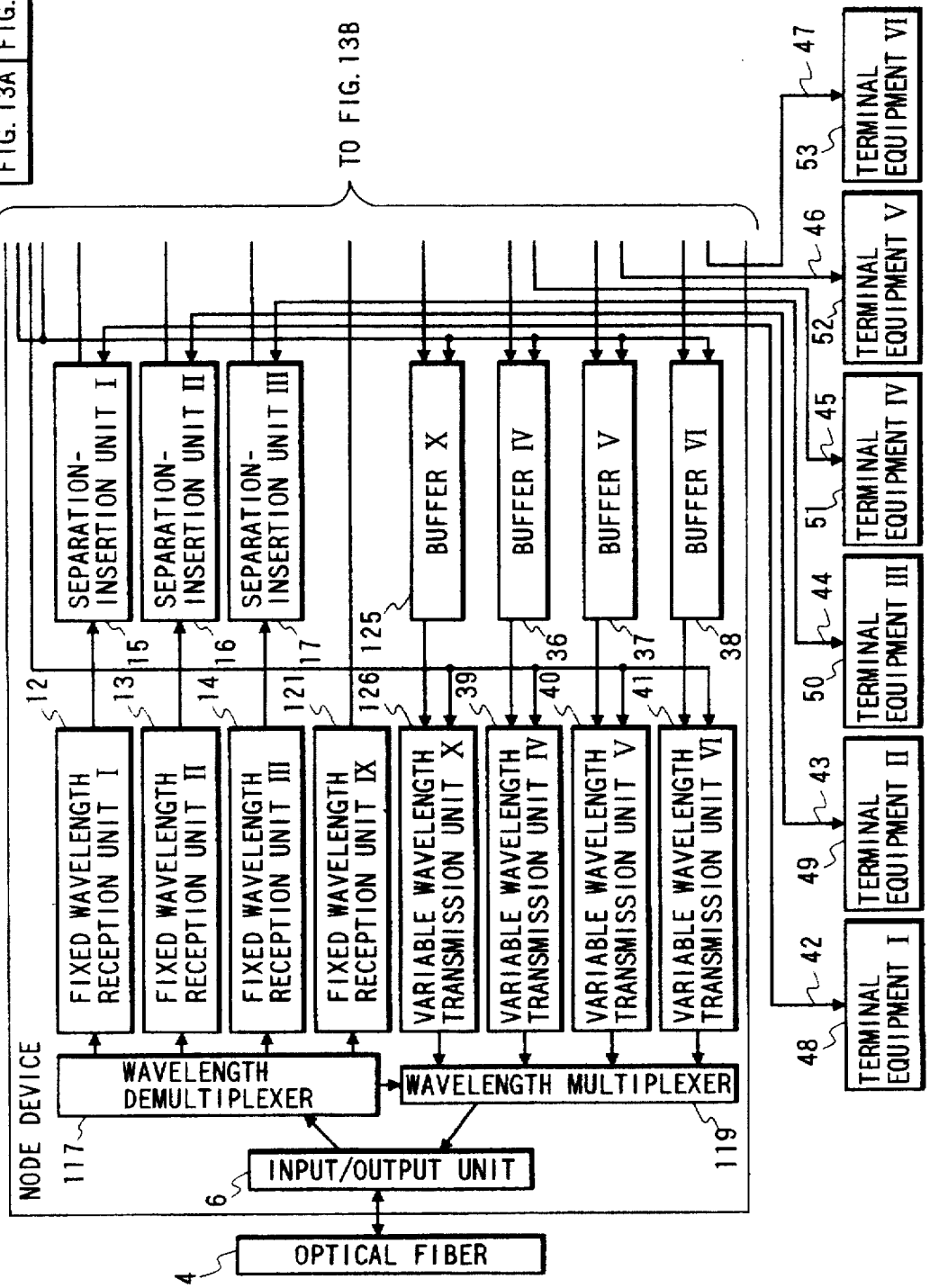

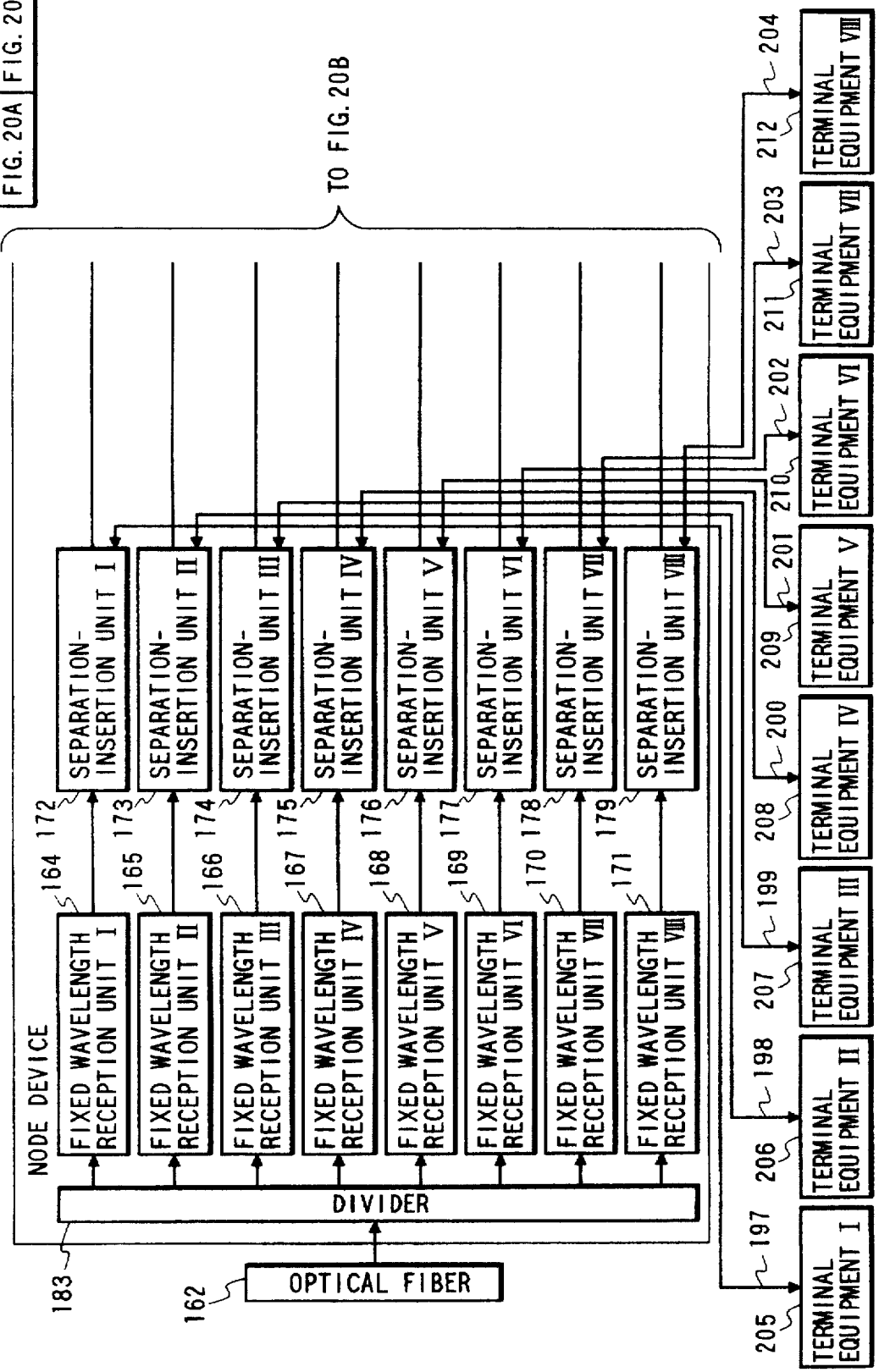

FIG. 20B

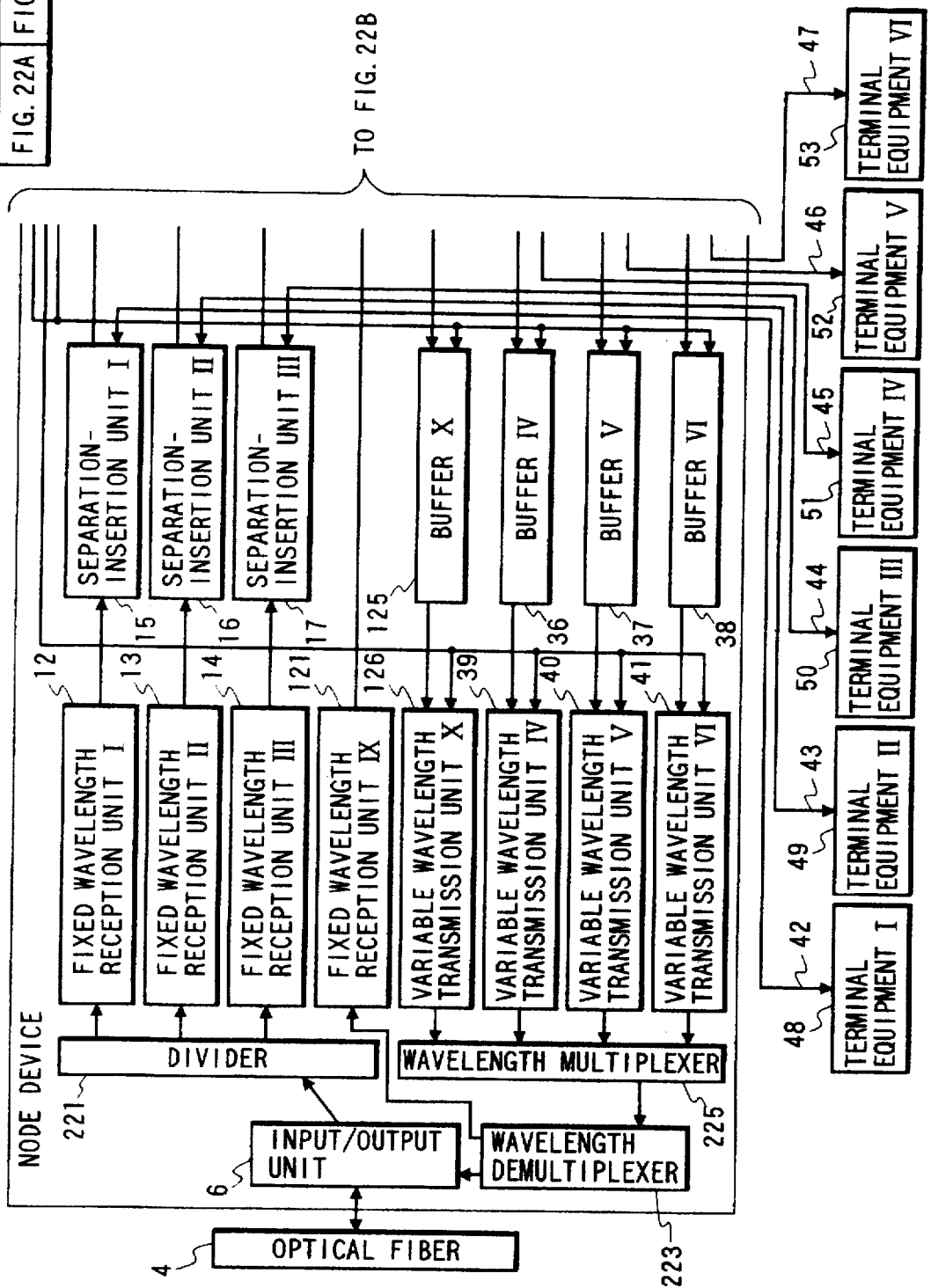

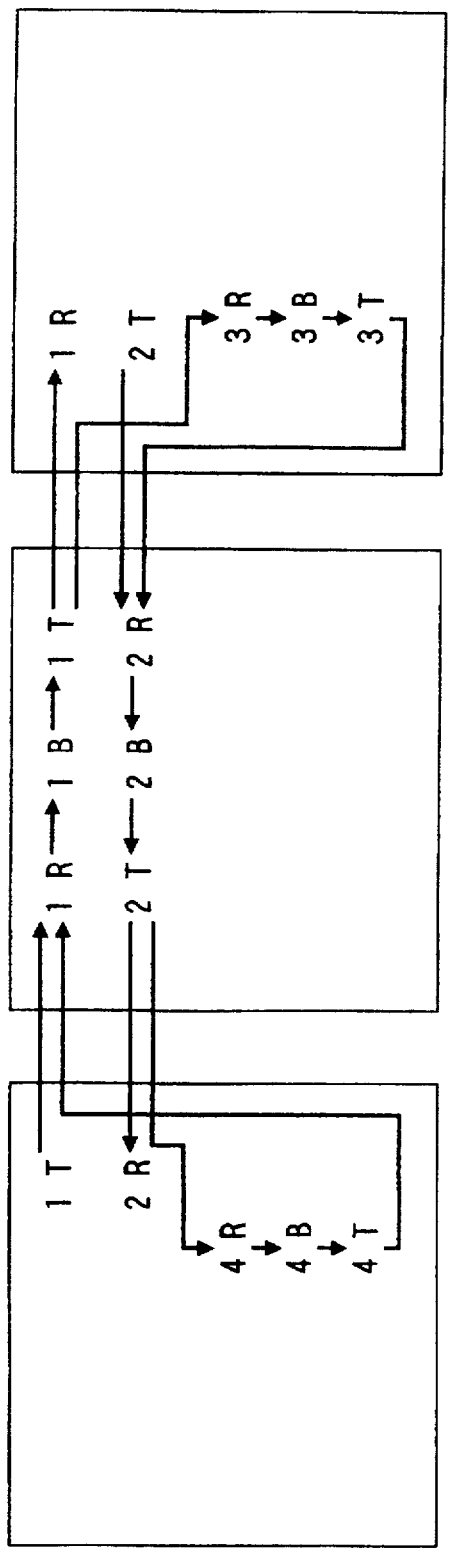

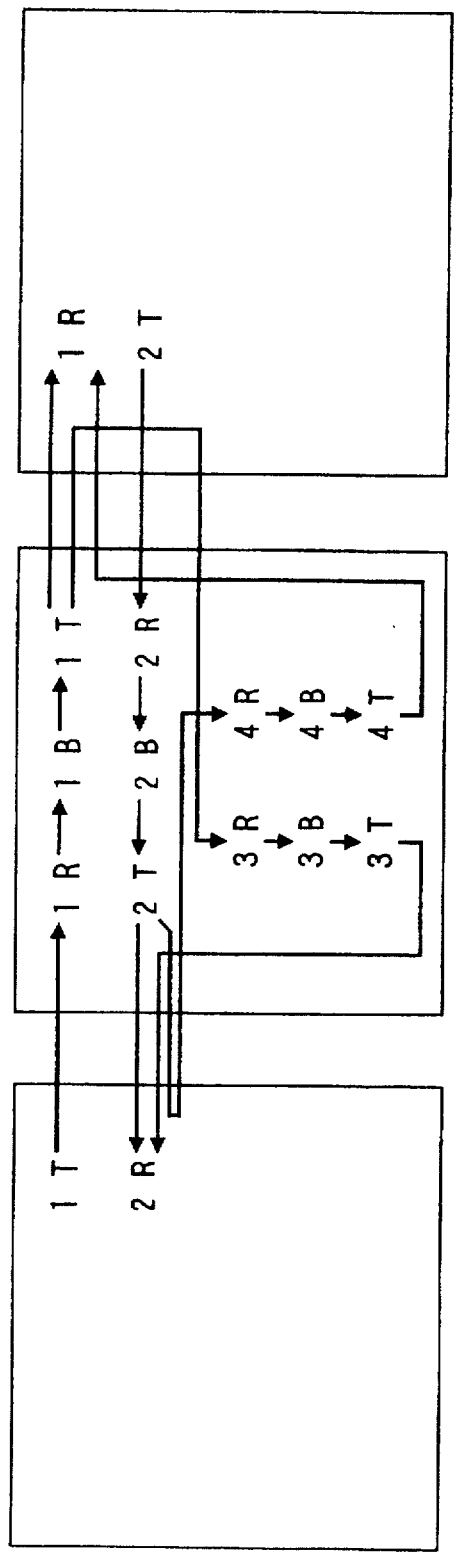

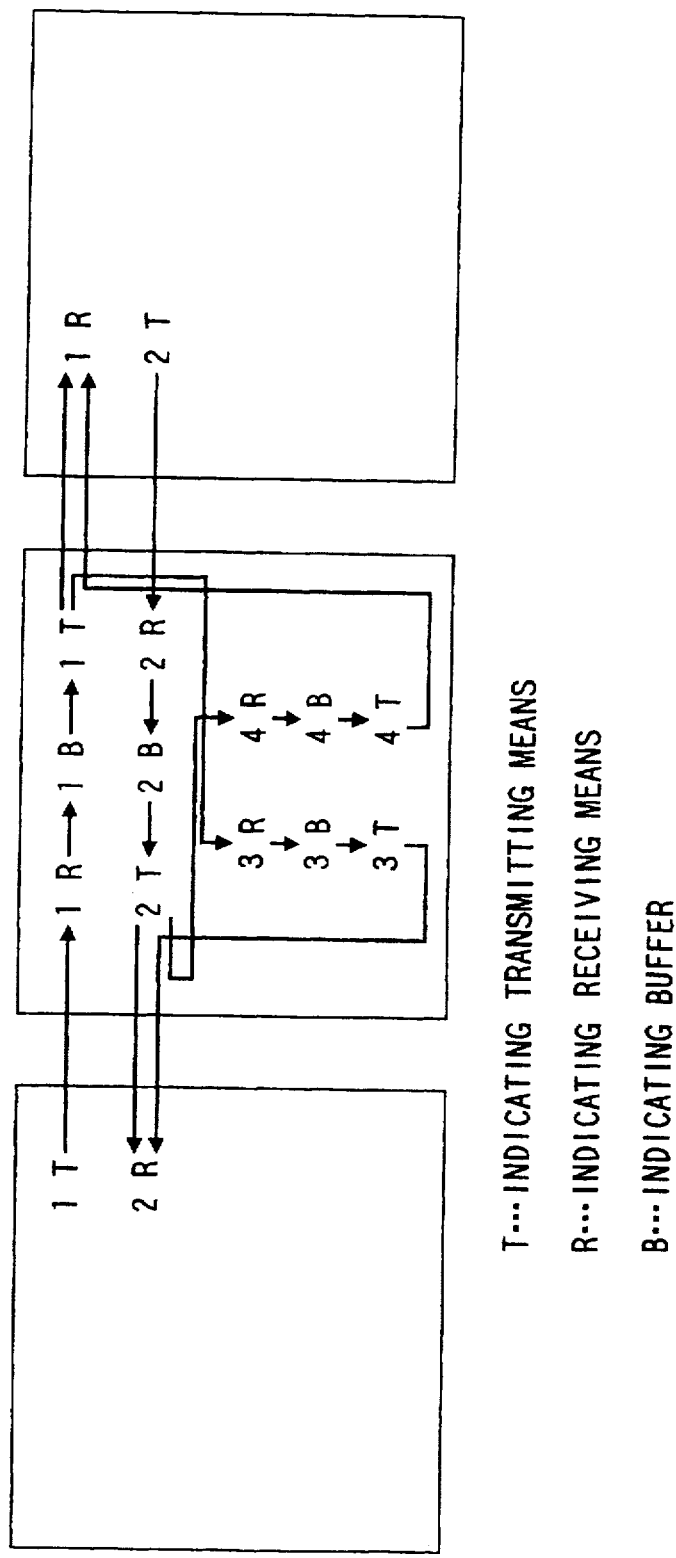

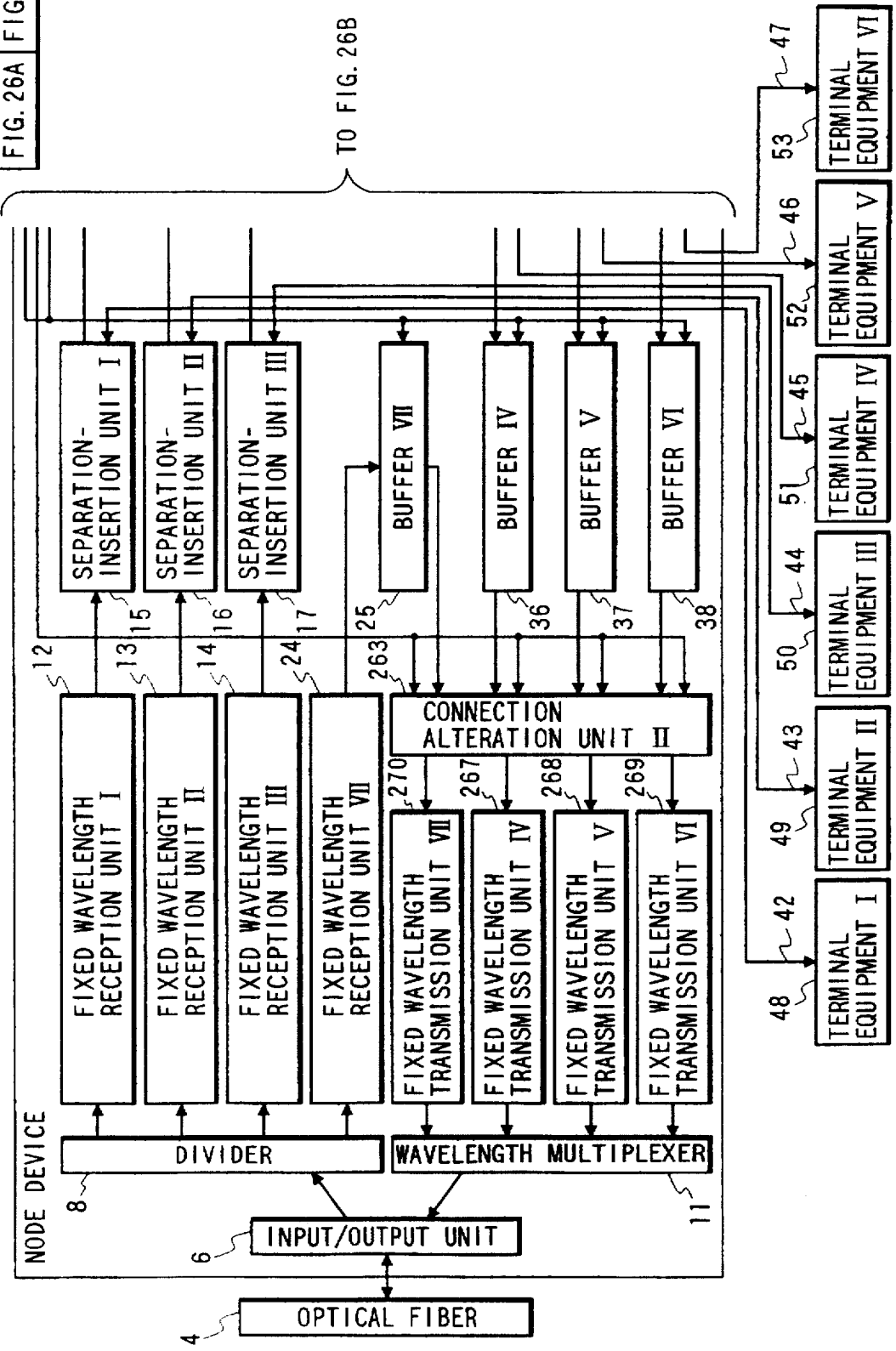

NETWORK SYSTEM FOR PERFORMING BIDIRECTIONAL TRANSMISSION, AND NODE DEVICE AND TRANSMISSION CONTROL METHOD USED IN THE SYSTEM

This application is a continuation of application Ser. No. 08/658,776 filed Jun. 5, 1996, now abandoned.

BACKGROUND OF THE INVENTION

1. Field of the Invention

The present invention relates to a network system, and a node device and a transmission control method used in the system and, more particularly, to a node device used for connecting a plurality of terminal equipments via sub transmission paths, a network system constituted by a transmission path (a plurality of channels for transmitting, e.g., wavelengths) for connecting a plurality of node devices, and a transmission control method of packets transmitted by the terminal equipments and the network system.

2. Related Background Art

In recent years, in order to realize a high-speed network that connects high-speed terminal equipments, a network system which uses a network comprising a wavelength multiplex transmission path using a plurality of optical wavelengths has been examined. A network system, a node device, and a transmission control method of this type are roughly classified into two types.

As shown in FIG. 14, the first network system has an arrangement constituted by node devices 127 each for connecting a plurality of terminal equipments 133 and 134, and a wavelength multiplex transmission path 135 which connects the plurality of node devices and uses a plurality of optical wavelengths.

In the first network system shown in FIG. 14, a packet transmitted from the terminal equipment 133 or 134 and input to one of input I/F (Interface) units 131 is switched by a switching unit 129 so as to be transmitted using a predetermined wavelength by one of a plurality of fixed wavelength transmission units 130. Then, the switched packet is output to the predetermined fixed wavelength transmission unit 130, and is transmitted therefrom using the predetermined wavelength. Thereafter, the transmitted packet is relayed by a node device or devices 127 present before the node device 127 to which the terminal equipment indicated by the reception address is connected. The switching unit 129 controls the output destination of the received packet, so that the packet is finally received by a corresponding fixed length reception unit 128 of the target node device 127 and is output from an output I/F unit 132 to which the terminal equipment indicated by the reception address is connected. The packet is then output from the predetermined output I/F unit 132 and is received by the target terminal equipment. The switching unit 129 of the node device 127 serves to attain routing of the packet to a desired terminal equipment of a desired node device by controlling its switching operation for selecting one of the plurality of fixed wavelength transmission units 130 and one of the plurality of I/F units 132 to which the input packet is to be output.

The second network system is a so-called transmission media shared type system connected via a topological wavelength multiplex transmission path such as a bus or star type network. Such system uses a so-called demand assign system to perform arbitration control so as to prevent congestion or contention in which multiple terminal equipments try to use an identical wavelength. That is, upon transmission of a packet from a given terminal equipment, the terminal equipment issues a request associated with the use of the wavelength multiplex transmission path to a server which manages the wavelengths to be used by the respective terminal equipments, and thereafter, the server assigns the use wavelength to the terminal equipment that issued the request.

The above-mentioned systems suffer the following problems.

In the first system, since the switching unit 129 has a large hardware scale, as will be described below, the node device 127 becomes highly costly. FIG. 15 shows the first arrangement of the switching unit 129 used in the first system, and illustrates a crossbar type switching unit having N input terminals and N output terminals. Referring to FIG. 15, decoders 136 read the address portions of packets, and instruct a control unit 140 of the output destinations of the packets. FIFOs (First In First Out) 137 temporarily store input packets, and output the stored packets in the input order onto output lines 141 under the control of the control unit 140. Input lines 138 are used for supplying packet signals output from the FIFOs 137 to the input terminals of switches 139. The switches 139 serve to switch whether or not packet signals input to the input lines 138 are output onto the output lines. The control unit 140 performs reading control of the FIFOs 137 and the ON/OFF control of the switches 139 in accordance with the outputs from the decoders 136. The output lines 141 supply packet signals output from the switches 139 to the output destinations. FIG. 18 shows the format of a packet switched by the above-mentioned packet switching unit. Referring to FIG. 18, an address portion 150 indicates the reception address of this packet, and a data portion 151 stores information to be carried by this packet.

In this crossbar type switching unit, the control unit 140 performs routing control for changing output destinations by controlling the ON/OFF states of the switches 139 connected to desired output destinations. Also, the control unit 140 performs arbitration control. That is, when the inputs from the plurality of input lines 138 are requested to be output to an identical output destination, i.e., when so-called output congestion has occurred, the control unit 140 determines one to be output of the plurality of inputs. With these control operations, the switching operation is realized.

However, the first arrangement of the switching unit requires N×N switches 139 when the number of input terminals is N and the number of output terminals is N, resulting in a large hardware scale.

In the first arrangement of the switching unit, N outputs from the switches 139 for connecting the plurality of input lines 138 and the plurality of output lines 141 are connected to a single output line. For this reason, the connection line length increases, thus generating a wiring delay and increasing the parasitic capacitance of the wiring lines. If the number of input terminals N increases, it becomes difficult to increase the operation speed of the switches. Therefore, the first arrangement of the switching unit is not suitable for switching high-speed input packet signals. Furthermore, in the first arrangement of the switching unit, arbitration control must be performed by detecting generation of output congestion for all the inputs in units of output destinations. Therefore, the control unit 140 that performs this control requires a large hardware scale.

FIG. 16 shows the second arrangement of the switching unit, which is achieved to overcome the drawbacks of the first arrangement of the switching unit. In this arrangement, the switching unit is constituted by connecting a plurality of 2×2 switches each having two input terminals and two output terminals, as will be described below. Referring to FIG. 16, each of 2×2 switches has two input terminals and two output terminals, and has two functions, i.e., a straight function of straight-connecting the input and output terminals, and a cross function of cross-connecting the input and output terminals. By connecting the twelve 2×2 switches in a shuffle network pattern, an omega type switching unit having eight input terminals and eight output terminals is realized.

FIG. 17 shows the internal arrangement of the 2×2 switch 142 having the two input terminals and the two output terminals. Referring to FIG. 17, decoders I 143 and II 144 read the address portions of input packets and instruct a control unit 149 of the output terminals of the packets. FIFOs I 145 and II 146 temporarily store input packets and output the stored packets to selectors I 147 and II 148 in the input order under the control of the control unit 149. The selectors I 147 and II 148 select FIFOs that store packet signals to be output to output destinations under the control of the control unit 149. In the above-mentioned straight state, the selector I selects the FIFO I, and the selector II selects the FIFO II. On the other hand, in the cross state, the selector I selects the FIFO II, and the selector II selects the FIFO I.

In the second arrangement of the switching unit, the required number of 2×2 switches 142 is NlogN−N/2 (the base of log is 2), and is smaller than N×N in the first arrangement of the switching unit. However, since each 2×2 switch 142 requires decoders, FIFOs, a control unit, and selectors, the entire switching unit requires a large hardware scale. Furthermore, in the second arrangement of the switching unit, even in cases other than those in which different inputs are to be connected to an identical output destination, a so-called blocking phenomenon occurs, i.e., inputs cannot often be connected to desired output destinations depending on the connection states of other inputs. For example, when input 5 is connected to output destination 3 in FIG. 16, the upper left 2×2 switch 142 is set in the cross state. However, in order to connect input 1 to output destination 1, the upper left 2×2 switch 142 must be set in the straight state, resulting in blocking.

As described above, in the first network system, since the switching unit as principal part of the node device requires a large hardware scale, the node device itself highly costly.

On the other hand, the second network system has an arrangement, as shown in FIG. 19, and suffers the following problems.

FIG. 19 shows the arrangement of the second system, and exemplifies a network system constituted by connecting a server which has a function of assigning or allocating wavelengths to be used by the respective terminal equipments, and a plurality of terminal equipments in a bus pattern.

Referring to FIG. 19, an optical fiber 152 serves as a bus type wavelength multiplex transmission path. A server 153 has a wavelength assignment function. Terminal equipments 154 are connected to the server 153 via the optical fiber 152. A power multiplexing/dividing device 155 outputs an optical signal output from a variable wavelength transmission unit 156 to the optical fiber 152. Also, the device 155 divides an optical signal transmitted on the optical fiber 152, and outputs the divided optical signal to a fixed wavelength reception unit 157. The variable wavelength transmission unit 156 comprises a tunable laser diode (TLD). The unit 156 converts a packet signal output from a packet processing unit 158 into an optical signal of a predetermined wavelength, and outputs the converted optical signal to the power multiplexing/dividing device 155. The fixed wavelength reception unit 157 comprises a filter having a function of passing only an optical signal of a predetermined wavelength and shielding optical signals of other wavelengths, and a photodiode having a function of converting the optical signal of the predetermined wavelength that has passed through the filter into an electrical signal, and outputting the converted electrical signal. Different passing wavelengths are assigned to the filters of the fixed wavelength reception units 157 of the respective terminal equipments. A wavelength control unit 159 controls the transmission wavelength of the variable wavelength transmission unit 156 to a desired wavelength. A control unit 160 allocates a plurality of use wavelengths to be used in this network system, and performs arbitration control associated with use congestion of the wavelengths.

This system requires an arbitration function of controlling to prevent a single transmission wavelength from being assigned to the variable wavelength transmission units 156 of more than one terminal equipments since the optical fiber 152 serving as the bus type wavelength multiplex transmission path is shared by the respective terminal equipments. For this purpose, a demand assign system is adopted. In the demand assign system, upon transmission of a packet from each terminal equipment 154, each terminal equipment 154 sets the transmission wavelength of its variable wavelength transmission unit 156 at a wavelength that can be received by the server 153, and sends a transmission request packet indicating a destination terminal equipment to the server 153. Upon reception of the transmission request packet, the server 153 checks the use state of an optical signal of the wavelength, that can be received by the terminal equipment designated as the destination, using the wavelength allocation control unit 160, and transmits a communication permission/inhibition packet, which grants permission to communicate if the wavelength is not in use or denies the communication if the wavelength is in use, by setting the transmission wavelength of the variable wavelength transmission unit 156 at a wavelength that can be received by the terminal equipment which transmitted the transmission request packet. The terminal equipment 154 that transmitted the transmission request packet receives the communication permission/inhibition packet. If permission to communicate is granted, the terminal equipment 154 sets the transmission wavelength of the variable wavelength transmission unit 156 at a wavelength that can be received by the destination terminal equipment, and transmits a desired packet.

On the other hand, if the communication is denied, the terminal equipment 154 transmits a transmission request packet to the server 153 again after an elapse of a predetermined wait time, and repeats this operation until it receives a communication permission. In this manner, the arbitration function for controlling to prevent a single transmission wavelength from being assigned to the variable wavelength transmission units 156 of more than one terminal equipments is realized.

In the second system, since the filters of the respective terminal equipments 154 are set to pass optical signals of different wavelengths, the respective photodiodes receive optical signals of different, specific wavelengths. Therefore, by changing the transmission wavelength of the tunable laser diode (TLD) of the terminal equipment serving as a packet source, a routing function of transmitting a packet to a desired destination can be realized.

However, in the second network system, since a long time is required for communicating with the server 153 to attain the arbitration function (e.g., transmission of a transmission request packet, reception of a communication permission/inhibition packet, and the like), and the server must perform arbitration control of all the wavelengths to be used on the network, the heavy load is imposed on the arbitration control unit in the server, and the arbitration function itself is a time-consuming one, resulting in a low throughput of the network system. Furthermore, since the wavelength control unit 159 of each terminal equipment must control the transmission wavelength to a predetermined wavelength in units of communications with the server and communications with destination terminal equipments, high-speed wavelength control is required, thus increasing the hardware scale.

The present inventor has previously proposed a node device and a network system shown in FIGS. 20A and 20B in consideration of the problems of the above-mentioned two network systems.

Referring to FIGS. 20A and 20B, a control unit 161 performs the reading control of buffers I 180 to VIII 187 and the transmission wavelength control of variable wavelength transmission units I 188 to VIII 195. An optical fiber 162 serves as an optical wavelength multiplex transmission path. A divider 163 divides an optical signal transmitted on the optical fiber 162, and outputs the divided optical signal to eight fixed wavelength reception units I 164 to VIII 171. Each of the fixed wavelength reception units I to VIII receives only a packet transmitted as an optical signal of one wavelength corresponding to one of wavelengths λ1 to λ8. Each of separation-insertion units I 172 to VIII 179 has a function of separating a packet to be transmitted onto a corresponding one of sub transmission paths I 197 to VIII 204 from a packet flow output from the corresponding fixed wavelength reception unit and outputting the separated packet to the sub transmission path, and a function of inserting a packet transmitted from the sub transmission path into a packet flow output from the fixed wavelength reception unit. The buffers I 180 to VIII 187 have a function of temporarily storing packets output from the separation-insertion units I 172 to VIII 179. Each of the variable wavelength transmission units I 188 to VIII 195 converts a packet output from the corresponding buffer into an optical signal of a predetermined wavelength as one of the wavelengths λ1 to λ8 and outputs the converted optical signal onto the optical fiber 162 via a wavelength multiplexer 196 under the control of the control unit 161. The wavelentgh multiplexer 196 multiplexes optical signals of the wavelengths λ1 to λ8 output from the eight variable wavelength transmission units, and outputs the multiplexed signal onto the optical fiber 162. The sub transmission paths I 197 to VIII 204 serve as packet transmission paths between the separation-insertion units I to VIII and terminal equipments I 205 to VIII 212. The terminal equipments I 205 to VIII 212 receive packets output from the separation-insertion units I to VIII, generate packets to be transmitted to other terminal equipments, and transmit them to the separation-insertion units I to VIII via the sub transmission paths I to VIII.

FIG. 21 shows the arrangement of a network system using the node device of the system shown in FIGS. 20A and 20B, and illustrates an example wherein four node devices are connected via optical fibers. Node devices 213 to 216 are equivalent to that shown in FIGS. 20A and 20B. Eight terminal equipments are connected to each node device via eight sub transmission paths. Optical fibers 217 to 220 serve as optical wavelength multiplex transmission paths.

In the above-mentioned proposal, a packet output from a terminal equipment is inserted into a packet flow output from the fixed wavelength reception unit, and is then temporarily stored in the buffer. Thereafter, the packet is output as an optical signal of a predetermined wavelength from the variable wavelength transmission unit, and the optical signal is relayed by a node device or devices present before the node device to which the destination terminal equipment is connected. Thereafter, the variable wavelength transmission unit in the node device immediately before the node device, to which the destination terminal equipment is connected, converts the input optical signal into an optical signal of a wavelength that can be received by the fixed wavelength reception unit, which outputs a packet to the separation-insertion unit to which the sub transmission path of the destination is connected, and outputs the converted optical signal. The output optical signal is received by the predetermined fixed wavelength reception unit, and is then output from the separation-insertion unit onto the sub transmission path. Finally, the packet is received by the destination terminal equipment.

SUMMARY OF THE INVENTION

The above-mentioned proposal can prevent the hardware scale of the node device from increasing by obviating the need for the switching unit in the node device of the first system, so as to provide a low-cost node device. Furthermore, the above-mentioned proposal can simplify routing control by obviating the need for the arbitration control that disturbs improvement of the throughput of the network system. However, in the above-mentioned proposal, when the source terminal equipment and the destination terminal equipment are connected to different separation-insertion units of a single node device, a packet is transmitted from the variable wavelength transmission unit, is relayed by all the node devices arranged in a ring pattern except for the own node device, and is then received by the fixed wavelength reception unit that outputs the packet to the separation-insertion unit to which the destination terminal equipment is connected. Then, the packet is output from this separation-insertion unit onto the sub transmission path, and is received by the destination terminal equipment. As described above, when the source terminal equipment and the destination terminal equipment are connected to different separation-insertion units of a single node device, and when a packet is to be transmitted to a relatively near node device on the upstream side in the transmission direction, the packet is relayed by all or most of the node devices arranged in a ring pattern except for the own node device, resulting in a large transmission delay.

The present invention has been made in consideration of the problems of the above-mentioned systems and, has as its object to provide a low-cost node device which can prevent an increase in its hardware scale by obviating the need for the switching unit in the node device of the above-mentioned first network system.

Furthermore, it is the second object of the present invention to provide an improved node device with a small hardware scale, which can simplify routing control by obviating the need for arbitration control that disturbs improvement of the throughput of the network system, and can attain a higher-speed operation than the above-mentioned proposal by simplifying the wavelength control of a tunable laser diode used in a variable wavelength transmitting means, and to provide a network system using the node device, and a transmission control method.

It is the third object of the present invention to solve the problem of the proposal of the present inventors, i.e., a large transmission delay generated since a packet is relayed by all the node devices arranged in a ring pattern except for the own node device when a source terminal equipment and a destination terminal equipment are connected to different separation-insertion units of a single node device.

In order to achieve the above objects, according to the present invention, the node device and the network system are arranged as follows, and the following transmission control method is adopted.

The node device and the network system according to the present invention are a network system which connects a plurality of node devices via a transmission path for transmitting a plurality of channels, and performs transmission in two directions, i.e., the first direction and the second direction opposite to the first direction, or a node device used in the network system.

(1) The node device comprises:

first communication means constituted by first receiving means for receiving a first channel, transmitted in the first direction, of the plurality of channels, and first buffer means for temporarily storing a packet received by the first receiving means;

second communication means constituted by second receiving means for receiving a second channel, transmitted in the second direction, of the plurality of channels, and second buffer means for temporarily storing a packet received by the second receiving means;

third communication means constituted by third receiving means for receiving a third channel different from the first and second channels, and third buffer means for temporarily storing a packet received by the third receiving means;

fourth communication means constituted by fourth receiving means for receiving a fourth channel different from the first, second, and third channels, and fourth buffer means for temporarily storing a packet received by the fourth receiving means;

first output means for connecting the first and fourth buffer means to different channels of the first and third channels, and switching the channels to which the first and fourth buffer means are connected as needed;

second output means for connecting the second and third buffer means to different channels of the second and fourth channels, and switching the channels to which the second and third buffer means are connected as needed; and buffer control means for controlling the first, second, third, and fourth buffer means so that packets to be output by the channels to which the first, second, third, and fourth buffer means are connected are read out from the first, second, third, and fourth buffer means. The present invention can realize bidirectional communications and bidirectional loopback communications since the first to fourth channels which can be distinguished from each other are used.

(2) Furthermore, according to the present invention, various numbers of channels can be used. In this case, in the present invention, the first channel includes $n_1$ first channels ($n_1$ is an integer not less than 1), the second channel includes $n_2$ second channels ($n_2$ is an integer not less than 1), the third channel includes $n_3$ third channels ($n_3$ is an integer not less than 1), and the fourth channel includes $n_4$ fourth channels ($n_4$ is an integer not less than 1), the node device comprises $n_1$ first communication means equivalent to the first communication means, $n_2$ second communication means equivalent to the second communication means, $n_3$ third communication means equivalent to the third communication means, and $n_4$ fourth communication means equivalent to the fourth communication means, the $n_1$ first receiving means of the $n_1$ first communication means respectively receive different channels of the $n_1$ first channels, the $n_2$ second receiving means of the $n_2$ second communication means respectively receive different channels of the $n_2$ second channels, the $n_3$ third receiving means of the $n_3$ third communication means respectively receive different channels of the $n_3$ third channels, and the $n_4$ fourth receiving means of the $n_4$ fourth communication means respectively receive different channels of the $n_4$ fourth channels, the first output means connect the $n_1$ first buffer means and the $n_4$ fourth buffer means to different channels of the $n_1$ first channels and the $n_3$ third channels, and switches the channels to which the $n_1$ first buffer means and the $n_4$ fourth buffer means are connected as needed, and the second output means connect the $n_2$ second buffer means and the $n_3$ third buffer means to different channels of the $n_2$ second channels and the $n_4$ fourth channels, and switches the channels to which the $n_2$ second buffer means and the $n_3$ third buffer means are connected as needed.

(3) In the present invention, $n_1$ and $n_2$ are equal to each other, and $n_3$ and $n_4$ are equal to each other. With this arrangement, the prepared channels can be effectively used.

(4) In the present invention, the first output means comprises $n_1+n_4$ variable channel transmitters respectively corresponding to the $n_1$ first buffer means and the $n_4$ fourth buffer means, and the second output means comprises $n_2+n_3$ variable channel transmitters respectively corresponding to the $n_2$ second buffer means and the $n_3$ third buffer means. With this arrangement, the need for any switch for switching connections can be obviated.

(5) On the other hand, in the present invention, the first output means comprises $n_1+n_3$ fixed channel transmitters for performing transmission using different channels of the $n_1$ first channels and the $n_3$ third channels, and first connection alteration means which has $n_1+n_4$ input terminals respectively corresponding to the $n_1$ first buffer means and the $n_4$ fourth buffer means and $n_1+n_3$ output terminals respectively corresponding to the $n_1+n_3$ fixed channel transmitters, and can alter a connection relationship between the input and output terminals, and the second output means comprises $n_2+n_4$ fixed channel transmitters for performing transmission using different channels of the $n_2$ first channels and the $n_4$ third channels, and second connection alteration means which has $n_2+n_3$ input terminals respectively corresponding to the $n_2$ first buffer means and the $n_3$ third buffer means and $n_2+n_4$ output terminals respectively corresponding to the $n_2+n_4$ fixed channel transmitters, and can alter a connection relationship between the input and output terminals. With this arrangement, variable channel transmitters need not be used. In this case, although the connection alteration means is required, the switching operation of this means requires neither address confirmation in units of packets nor arbitration.

(6) Furthermore, in the present invention, the third receiving means receives the third channel transmitted from the output means of another node device at an upstream side in the first direction, and the fourth receiving means receives the fourth channel transmitted from the output means of another node device at an upstream side in the second direction. With this arrangement, a loopback communication takes a route in which a packet temporarily output from the first node device in the first or second direction is temporarily received by the communication means of another node device, and is looped back in the opposite direction.

(7) In this case, if the $n_1$ first channels, the $n_2$ second channels, the $n_3$ third channels, and the $n_4$ fourth channels are optical channels which are distinguished from each other on the basis of the transmission directions and wavelengths thereof, at least the $n_1$ first channels and the $n_3$ third channels are optical channels having different wavelengths, and at least the $n_2$ second channels and the $n_4$ fourth channels are optical channels having different wavelengths.

(8) In the present invention, the first output means outputs the third channel in the first direction, and the second output means outputs the fourth channel in the second direction, and the node device further comprises means for extracting the third channel from the channels transmitted in the first direction and outputting the extracted third channel in the second direction, and means for extracting the fourth channel from the channels transmitted in the second direction and outputting the extracted fourth channel in the first direction. With this arrangement, a loopback communication takes a route in which a packet temporarily output from the first node in the first or second direction is extracted before it is input to the communication means of another node device, and is looped back in the opposite direction.

(9) In this case, if the $n_1$ first channels, the $n_2$ second channels, the $n_3$ third channels, and the $n_4$ fourth channels are optical channels which are distinguished from each other on the basis of the transmission directions and wavelengths thereof, at least the $n_1$ first channels and the $n_3$ third channels are optical channels having different wavelengths, at least the $n_2$ second channels and the $n_4$ fourth channels are optical channels having different wavelengths, at least the $n_1$ first channels and the $n_4$ fourth channels are optical channels having different wavelengths, and at least the $n_2$ second channels and the $n_4$ fourth channels are optical channels having different wavelengths.

(10) Furthermore, in the present invention, the node device further comprises means for extracting the third channel from outputs from the first output means of the own node device, and inputting the extracted third channel to the third receiving means, and means for extracting the fourth channel from outputs from the second output means of the own node device, and inputting the extracted fourth channel to the fourth receiving means. With this arrangement, a loopback communication takes a route in which a packet is looped back without being output from the own node device onto the transmission path.

(11) In this case, if the $n_1$ first channels, the $n_2$ second channels, the $n_3$ third channels, and the $n_4$ fourth channels are optical channels which are distinguished from each other on the basis of the transmission directions and wavelengths thereof, at least the $n_1$ first channels and the $n_3$ third channels are optical channels having different wavelengths, and at least the $n_2$ second channels and the $n_4$ fourth channels are optical channels having different wavelengths.

(12) In the present invention, the first buffer means reads out a packet to be transmitted in the second direction of input packets when the first buffer means is connected to the third channel, and the second buffer means reads out a packet to be transmitted in the first direction of input packets when the second buffer means is connected to the fourth channel.

(13) In the present invention, transmission channels of at least the $n_1$ variable channel transmitters corresponding to the $n_1$ first buffer means of the $n_1+n_4$ variable channel transmitters of the first output means are controlled to change in accordance with a pattern for selecting the $n_1$ first channels and the $n_3$ third channels in turn, and transmission channels of at least the $n_2$ variable channel transmitters corresponding to the $n_2$ second buffer means of the $n_2+n_3$ variable channel transmitters of the second output means are controlled to change in accordance with a pattern for selecting the $n_2$ second channels and the $n_4$ fourth channels in turn.

(14) In this case, the transmission channels of the $n_1$ variable channel transmitters are controlled to change in accordance with identical patterns having different selection timings, and the transmission channels of the $n_2$ variable channel transmitters are controlled to change in accordance with identical patterns having different selection timings. With this arrangement, the patterns can be easily set.

(15) On the other hand, as for other variable channel transmitters, transmission channels of at least the $n_4$ variable channel transmitters corresponding to the $n_4$ fourth buffer means of the $n_1+n_4$ variable channel transmitters of the first output means can be controlled to change in accordance with a pattern for selecting at least the $n_1$ first channels in turn, and transmission channels of at least the $n_3$ variable channel transmitters corresponding to the $n_3$ third buffer means of the $n_2+n_3$ variable channel transmitters of the second output means can be controlled to change in accordance with a pattern for selecting at least the $n_2$ second channels in turn. This is because the $n_4$ variable transmitters corresponding to the $n_4$ first buffer means need not always perform transmission with respect to the third channel, and the $n_3$ variable transmitters corresponding to the $n_3$ third buffer means need not always perform transmission with respect to the fourth channel. As such patterns, a pattern which controls to output nothing during the connection period to unnecessary channels of the patterns used in (14) may be used.

(16) On the other hand, transmission channels of the $n_1+n_4$ variable channel transmitters of the first output means are controlled to change in accordance with identical patterns which select the $n_1$ first channels and the $n_3$ third channels in turn and have different selection timings, and transmission channels of the $n_2+n_3$ variable channel transmitters of the second output means are controlled to change in accordance with identical patterns which select the $n_2$ second channels and the $n_4$ fourth channels in turn and have different selection timings. With this arrangement, the patterns can be easily set.

(17) Furthermore, in the present invention, the $n_1$ first channels, the $n_2$ second channels, the $n_3$ third channels, and the $n_4$ fourth channels are optical channels which are distinguished from each other on the basis of the transmission directions and wavelengths thereof, and if variable channel transmitters are used as the transmitters, the pattern for selecting the plurality of channels in turn selects odd wavelengths in turn in an ascending order starting from a first wavelength when the channels to be selected by the pattern are arranged in an order of shorter wavelengths, selects a largest even wavelength after a largest odd wavelength is selected, selects even wavelengths in a descending order, and selects the first wavelength again after a second wavelength is selected.

(18) Alternatively, the pattern may select even wavelengths in turn in an ascending order starting from a second wavelength when the channels to be selected by the pattern are arranged in an order of shorter wavelengths, selects a largest odd wavelength after a largest even wavelength is selected, selects odd wavelengths in a descending order, and selects the second wavelength again after a first wavelength is selected. With this pattern, since the wavelength shift amount upon changing the wavelengths can be reduced, the wavelengths can be quickly changed, and a stable output can be obtained.

(19) Furthermore, in the network system of the present invention, the plurality of node devices are preferably connected in a ring pattern.

(20) When the node device of the present invention outputs a signal to, e.g., the terminal equipment, separation means for separating a packet to be output onto a sub transmission path from packets transmitted by some of the plurality of channels, and outputting the separated packet onto the sub transmission path is preferably used.

(21) When the node device of the present invention receives a signal from, e.g., the terminal equipment, insertion means for inserting a packet to be output to another node device via one of the buffer means and one of the output means into a packet flow received by one of the receiving means is preferably used.

(22) Furthermore, a transmission control method of the present invention is characterized by:

transmitting a packet to be transmitted in the second direction of packets temporarily stored in buffer means of a first node device, which buffer means is connected to a channel to be transmitted in the first direction, in the first direction by a predetermined channel distinguished from other channels transmitted in the first direction, and receiving the packet to be transmitted in the second direction, which is transmitted in the first direction by the predetermined channel, by a second node device which is located at a downstream side, in the first direction, of the first node device, and transmitting the packet by a channel to be transmitted in the second direction.

(23) Another transmission control method of the present invention is a transmission control method of a packet in a node device of a network system which connects a plurality of node devices via a transmission path for transmitting a plurality of channels, and transmits packets between the node devices in a first direction and a second direction opposite to the first direction, characterized by transmitting a packet to be transmitted in the second direction of packets temporarily stored in buffer means of a first node device, which buffer means is connected to a channel to be transmitted in the first direction, in the first direction by a predetermined channel distinguished from other channels transmitted in the first direction, and extracting the predetermined channel transmitted in the first direction by a second node device which is located at a downstream side, in the first direction, of the first node device, and outputting the extracted predetermined channel in the second direction.

(24) Still another transmission control method of the present invention is a transmission control method of a packet in a node device of a network system which connects a plurality of node devices via a transmission path for transmitting a plurality of channels, and transmits packets between the node devices in a first direction and a second direction opposite to the first direction, characterized by outputting a packet to be transmitted in the second direction of packets temporarily stored in buffer means of a first node device, which buffer means is connected to a channel to be transmitted in the first direction, by a predetermined channel distinguished from other channels transmitted in the first direction, extracting the predetermined channel in the first node device, receiving the extracted predetermined channel in the first node device, inputting the received packet to be transmitted in the second direction to buffer means of the first node device, which buffer means is connected to a channel to be transmitted in the second direction, and outputting the packet in the second direction via the buffer means.

The above-mentioned transmission control method of the present invention can realize loopback communications by discriminating channels that perform loopback communications and channels that do not perform loopback communications from each other.

In the node device, network system, and transmission control method with the above-mentioned arrangements according to the present invention, the routing control of a packet input from the sub transmission path to the separation-insertion means is attained by changing the fixed channel receiving means for receiving the packet by controlling a channel to which the buffer means is connected, and by controlling read/write accesses to the buffer means. The change pattern of channels to which the buffer means is connected is fixed. Furthermore, arbitration control is attained by altering connections so that multiple buffer means do not simultaneously output signals to an identical channel.

Furthermore, of packets stored in the buffer means which can be connected to a channel to be transmitted in one direction, the transmission direction of a packet to be transmitted in the other direction is reversed by the first or second loopback communication means in the own node device or a neighboring node device.

BRIEF DESCRIPTION OF THE DRAWINGS

Figure 20B:
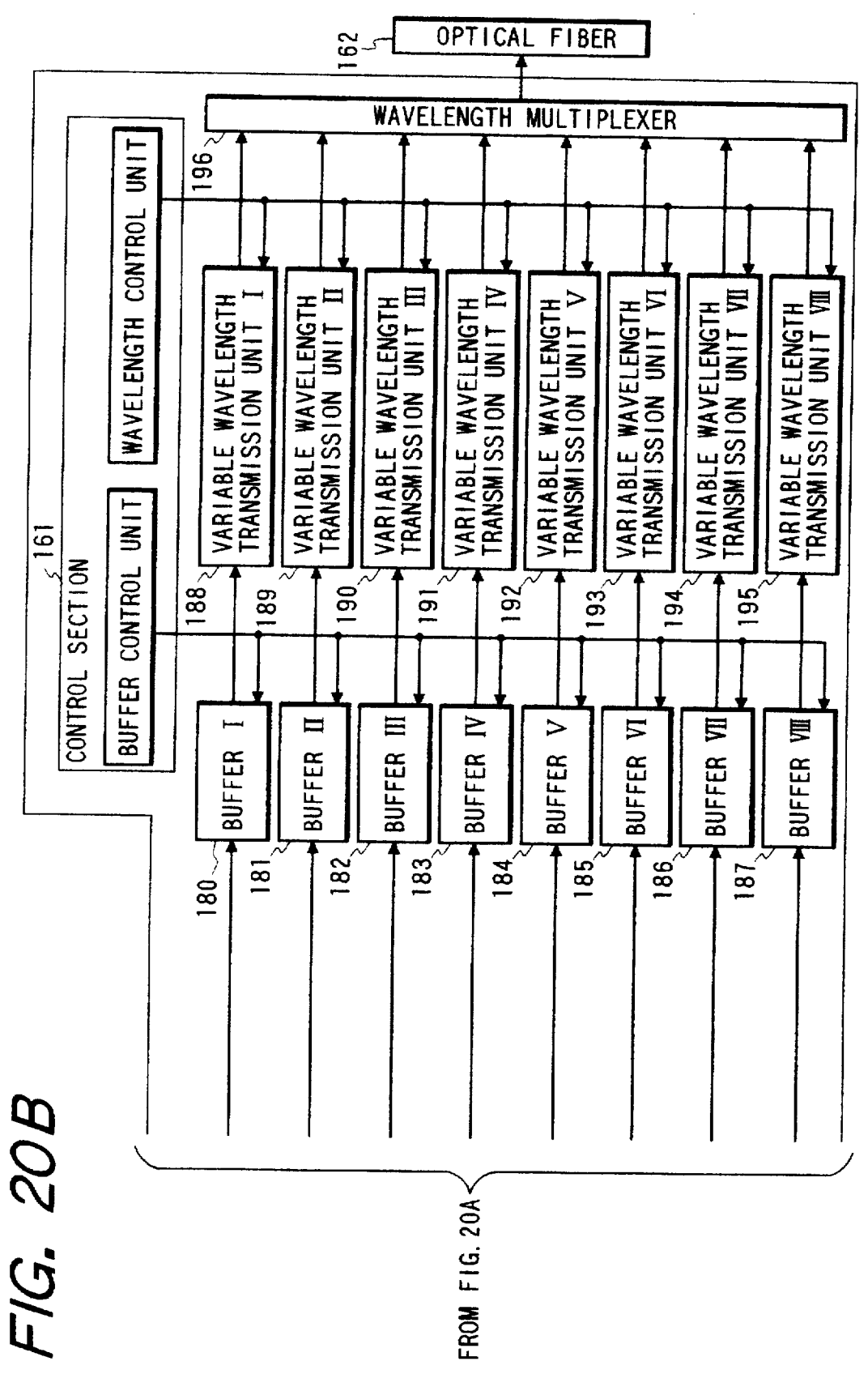

FIG. 20 is comprised of FIGS. 20A and 20B showing block diagrams illustrating the arrangement of a node device according to another proposal of the present inventors;

FIG. 23 is a chart showing the principle of loopback communications of the first embodiment;

FIG. 24 is a chart showing the principle of loopback communications of the third embodiment;

FIG. 25 is a chart showing the principle of loopback communications of the fourth embodiment;

DETAILED DESCRIPTION OF THE PREFERRED EMBODIMENTS

(First Embodiment)

Figure 1B:
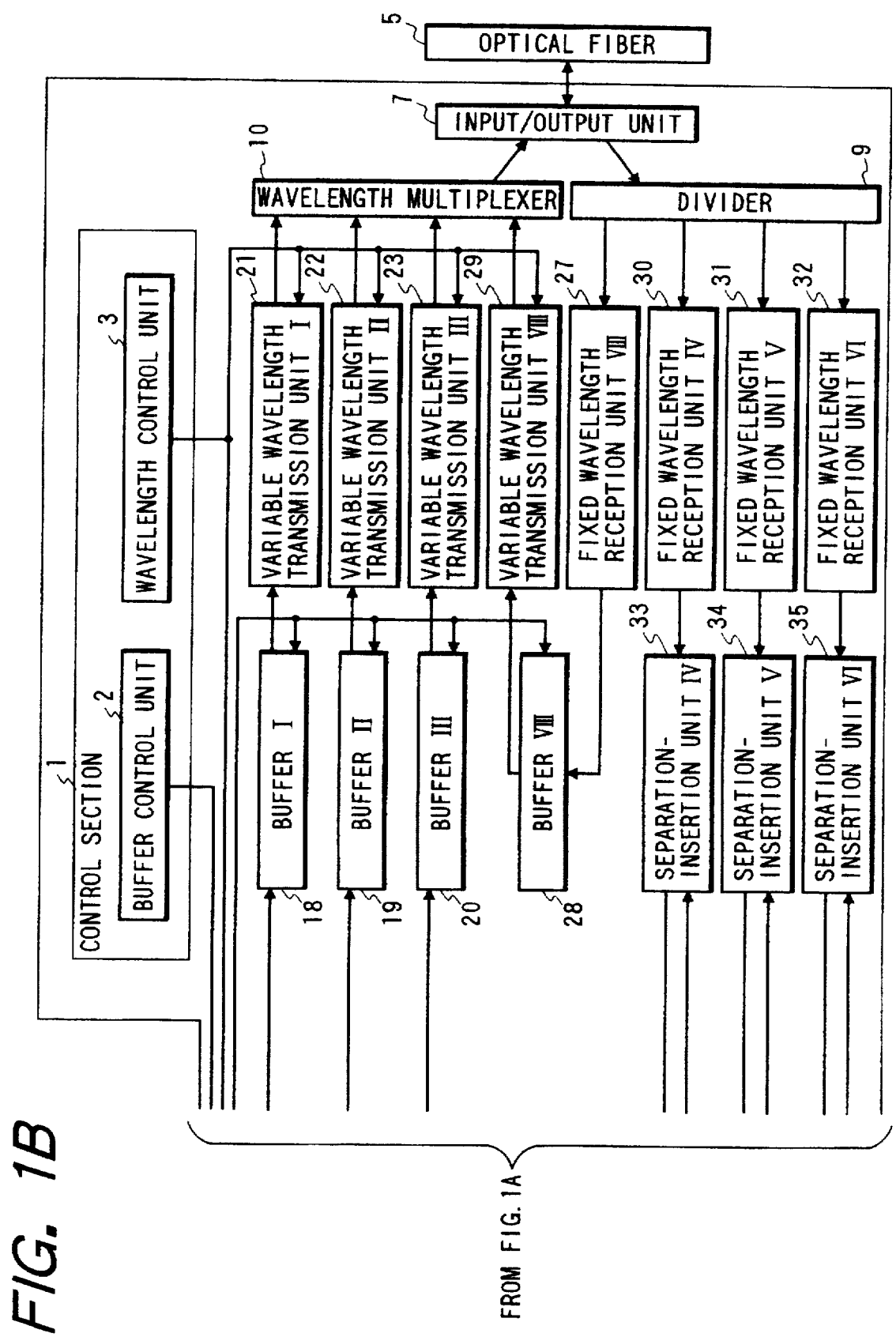
FIG. 1 is comprised of FIGS. 1A and 1B showing block diagrams illustrating the arrangement of a node device according to the first embodiment of the present invention.

FIGS. 1A and 1B show node devices according to the first embodiment of the present invention, and illustrates an example wherein six sub transmission paths are connected to a ring-shaped optical wavelength multiplex transmission path. One terminal equipment is connected to each sub transmission path. Note that a packet to be described below indicates a sequence of signals having a field that stores information to be transmitted, and a field that stores information associated with the address of the information.

Referring to FIGS. 1A and 1B, a control section 1 of the node device comprises a buffer control unit 2 and a wavelength control unit 3. The buffer control unit 2 controls not to read out any data from a buffer until the reception wavelength of a fixed wavelength reception unit that outputs a packet to a separation-insertion unit, to which the sub transmission path of the destination is connected in the neighboring node at the downstream side in the transmission direction, matches the transmission wavelength of a variable wavelength transmission unit that transmits a packet stored in the buffer, when the sub transmission path of the destination of the packet stored in the buffer is connected to the node device at the downstream side in the transmission direction. The wavelength control unit 3 controls the transmission wavelengths of variable wavelength transmission units in accordance with a predetermined transmission wavelength control pattern (to be described later). Each of optical fibers 4 and 5 as ring-shaped optical wavelength multiplex transmission paths serves as a transmission path between a divider of a neighboring node device and a divider of the own node device. Input/output units 6 and 7 perform input/output operations between the optical fibers and the node device. That is, the input/output units 6 and 7 output optical signals transmitted via the optical fibers 4 and 5 to dividers 8 and 9, and output optical signals output from wavelength multiplexers 10 and 11. The dividers 8 and 9 divide optical signals output from the input/output units 6 and 7, and output the divided optical signals to four fixed wavelength reception units. The wavelength multiplexers 10 and 11 multiplex optical signals output from four variable wavelength transmission units, and output the multiplexed optical signals to the input/output units 6 and 7.

Fixed wavelength reception units I 12 to III 14 serve as first fixed wavelength receiving means, and their internal arrangement will be described later. Each of the fixed wavelength reception units I 12 to III 14 receives only a packet transmitted as an optical signal of one wavelength corresponding to one of wavelengths λ1 to λ3, respectively. Separation-insertion units I 15 to III 17 serve as first separation-insertion means, and have a function of separating a packet to be transmitted onto the corresponding sub transmission path from a packet flow output from the corresponding fixed wavelength reception unit and outputting the separated packet onto the sub transmission path, and a function of inserting a packet sent from the corresponding sub transmission path into a packet flow output from the corresponding fixed wavelength reception unit. The internal arrangement of the separation-insertion unit will be described later. Buffers I 18 to III 20 serve as first buffer means, and have a function of temporarily storing packets output from the separation-insertion units. The internal arrangement of the buffer will be described later.

Variable wavelength transmission units I 21 to III 23 serve as first variable wavelength transmitting means using tunable laser diodes (TLDs). Each of the variable wavelength transmission units I 21 to III 23 converts a packet output from the corresponding buffer into an optical signal of a predetermined one of wavelengths λ1 to λ3, and λ8 under the control of the wavelength control unit, and outputs the converted signal as an optical signal transmitted in the first direction onto the optical fiber 5 serving as the optical wavelength multiplex transmission path via the wavelength multiplexer 10 and the input/output unit 7. The internal arrangement of the variable wavelength transmission unit will be described later. The fixed wavelength reception unit I 12, the separation-insertion unit I 15, the buffer I 18, and the variable wavelength transmission unit I 21 constitute a set of first communication means, and a packet received by the fixed wavelength reception unit is processed in this set but is never processed by other sets. Similarly, the fixed wavelength reception unit II 13, the separation-insertion unit II 16, the buffer II 19, and the variable wavelength transmission unit II 22 constitute another set of first communication means, and the wavelength reception unit III 14, the separation-insertion unit III 17, the buffer III 20, and the variable wavelength transmission unit III 23 also constitute still another set of first communication means. The following description will be given under the assumption that the transmission units constituting the output means belong to the respective communication means since they have one-to-one correspondences with the buffers in this embodiment.

A fixed wavelength reception unit VII 24 serves as a third fixed wavelength receiving means, and receives only a packet transmitted in the first direction as an optical signal of the wavelength $\lambda 8$ output from the divider 8. A variable wavelength transmission unit VII 26 serves as a third variable wavelength transmitting means. The variable wavelength transmission unit VII 26 converts a packet output from a buffer VII 25 into an optical signal of a predetermined one of wavelengths $\lambda 4$, $\lambda 5$, $\lambda 6$, and $\lambda 7$ under the control of the wavelength control unit 3, and outputs the converted signal onto the optical fiber 4 via the wavelength multiplexer 11 and the input/output unit 6 so as to be transmitted in the second direction. The fixed wavelength reception unit VII 24 and the variable wavelength transmission unit VII 26 constitute a third communication means, which will also be referred to as a first loopback communication means hereinafter since it is used for looping back the transmission direction.

A fixed wavelength reception unit VIII 27 serves as a fourth fixed wavelength receiving means, and receives only a packet transmitted in the second direction as an optical signal of the wavelength $\lambda 7$ output from the divider 9. A buffer VIII 28 temporarily stores a packet. A variable wavelength transmission unit VIII 29 serves as a fourth variable wavelength transmitting means. The variable wavelength transmission unit VIII 29 converts a packet output from the buffer VIII 28 into an optical signal of a predetermined one of the wavelengths $\lambda 1$, $\lambda 2$, $\lambda 3$, and $\lambda 8$ under the control of the wavelength control unit 3, and outputs the converted signal onto the optical fiber 5 via the wavelength multiplexer 10 and the input/output unit 7 so as to be transmitted in the first direction. The fixed wavelength reception unit VIII 27 and the variable wavelength transmission unit VIII 29 constitute a fourth communication means, which will also be referred to as a second loopback communication means hereinafter since it is used for looping back the transmission direction.

Fixed wavelength reception units IV 30 to VI 32 serve as second fixed wavelength receiving means. Each of the fixed wavelength reception units IV 30 to VI 32 receives only a packet transmitted as an optical signal of a corresponding one of the wavelengths $\lambda 4$ to $\lambda 6$. Separation-insertion units IV 33 to VI 35 serve as second separation-insertion means. Buffers IV 36 to VI 38 serve as second buffer means.

Variable wavelength transmission units IV 39 to VI 41 serve as second variable wavelength transmitting means. Each of the variable wavelength transmission units IV 39 to VI 41 converts a packet output from the corresponding buffer into an optical signal of a predetermined one of the wavelengths $\lambda 4$ to $\lambda 6$, and $\lambda 7$ under the control of the wavelength control unit 3, and outputs the converted signal as an optical signal to be transmitted in the second direction onto the optical fiber 4 as the optical wavelength multiplex transmission path via the wavelength multiplexer 11 and the input/output unit 6. The fixed wavelength reception unit IV 30, the separation-insertion unit IV 33, the buffer IV 36, and the variable wavelength transmission unit IV 39 constitute a set of second communication means, and a packet received by the fixed wavelength reception unit IV 30 is processed in this set but is never processed by other sets. Similarly, the fixed wavelength reception unit V 31, the separation-insertion unit V 34, the buffer V 37, and the variable wavelength transmission unit V 40 constitute another set of second communication means, and the fixed wavelength reception unit VI 32, the separation-insertion unit VI 35, the buffer VI 38, and the variable wavelength transmission unit VI 41 also constitute still another set of second communication means.

Sub transmission paths I 42 to VI 47 serve as packet transmission paths between the separation-insertion units and terminal equipments. Terminal equipments I 48 to VI 53 are respectively connected to the sub transmission paths I 42 to VI 47. Each of these terminal equipments receives a packet output from the corresponding separation-insertion unit, generates a packet to be transmitted to another terminal equipment, and transmits the packet to the separation-insertion unit via the sub transmission path.

Figure 2:
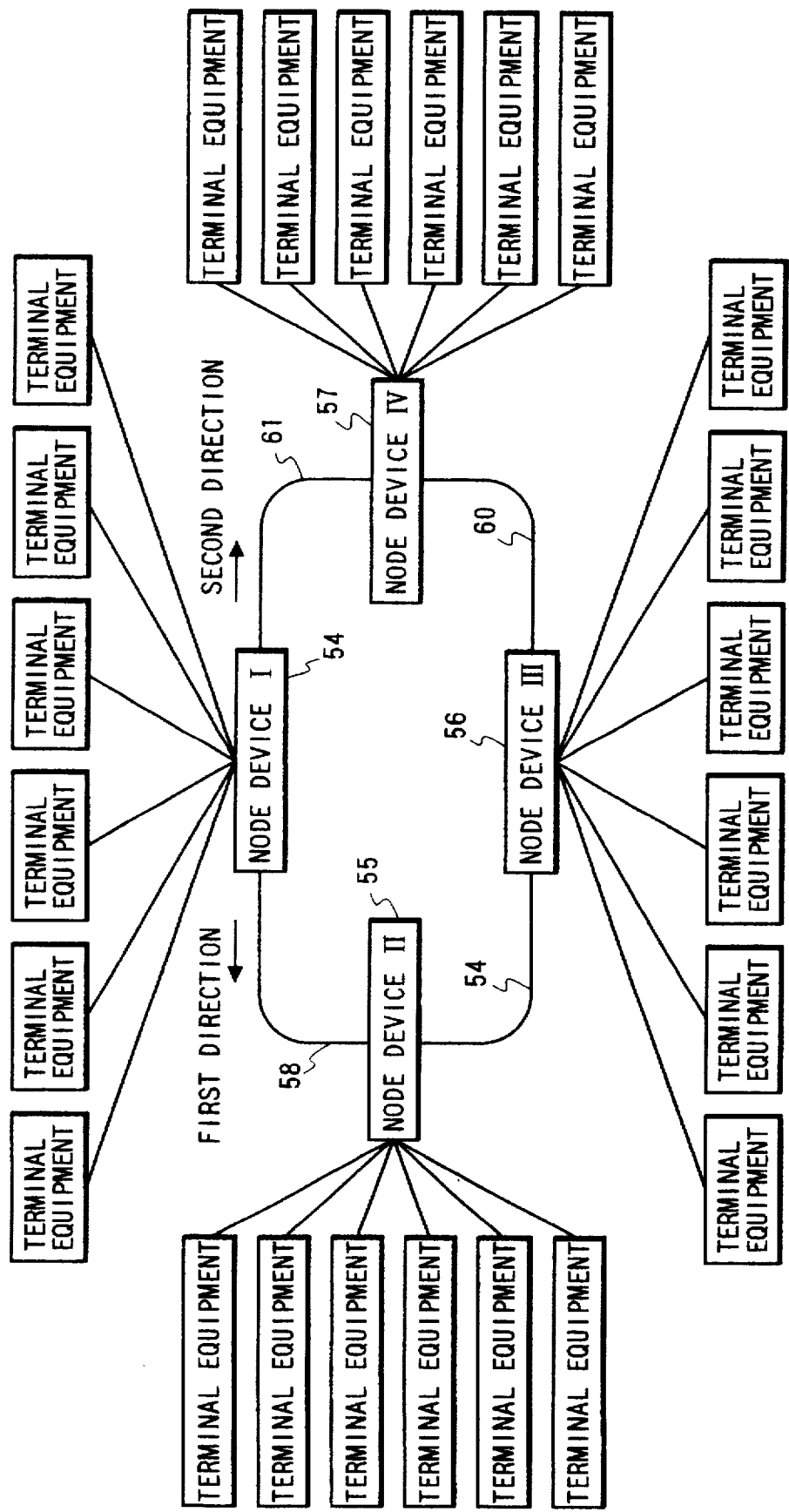
FIG. 2 is a block diagram showing the arrangement of a network system according to the first embodiment of the present invention.

FIG. 2 shows the arrangement of a network system using the node device according to the first embodiment of the present invention, and exemplifies a case wherein four node devices are connected in a ring pattern via optical fibers. The counterclockwise direction in FIG. 2 corresponds to the first transmission direction, and the clockwise direction in FIG. 2 corresponds to the second transmission direction. Node devices 54 to 57 are equivalent to that shown in FIGS. 1A and 1B. Six terminal equipments are connected to each node device via six sub transmission paths. Optical fibers 58 to 61 constitute optical wavelength multiplex transmission paths.

Figure 3:
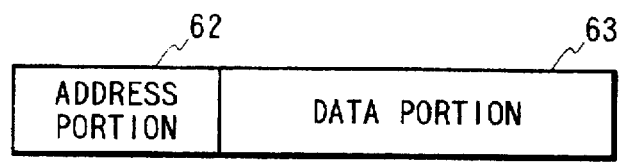
FIG. 3 is a view showing the format of a packet used in the present invention.

FIG. 3 shows the format of a packet to be transmitted in this embodiment. Referring to FIG. 3, an address portion 62 indicates the destination terminal equipment of this packet, and a data portion 63 stores information to be carried by this packet.

Figure 4:
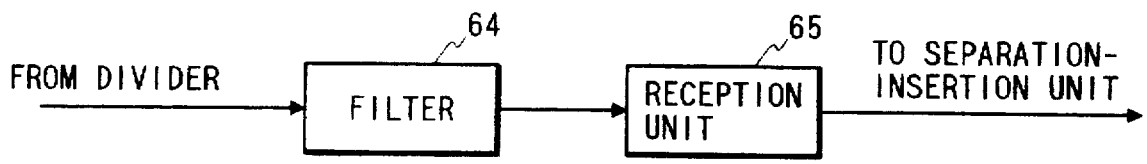
FIG. 4 is a block diagram showing the arrangement of a fixed wavelength reception unit according to the first embodiment of the present invention.

FIG. 4 shows the internal arrangement of each of the fixed wavelength reception units I 12 to VIII 27 used in the node device according to the first embodiment of the present invention. Referring to FIG. 4, a filter 64 has a function of passing only an optical signal of a fixed wavelength assigned to each fixed wavelength reception unit, and intercepting optical signals of other wavelengths. The passing wavelengths of the filters 64 of the fixed wavelength reception units are set as follows: $\lambda 1$ for the fixed wavelength reception unit I; $\lambda 2$ for the fixed wavelength reception unit II; $\lambda 3$ for the fixed wavelength reception unit III; $\lambda 4$ for the fixed wavelength reception unit IV; $\lambda 5$ for the fixed wavelength reception unit V; $\lambda 6$ for the fixed wavelength reception unit VI; $\lambda 8$ for the fixed wavelength reception unit VII; and $\lambda 7$ for the fixed wavelength reception unit VIII. Note that the wavelengths are selected to satisfy $\lambda 1 < \lambda 2 < \lambda 3 < \lambda 8 < \lambda 4 < \lambda 5 < \lambda 6 < \lambda 7$. A reception unit 65 uses a photodiode. The reception unit 65 converts an optical signal of the predetermined wavelength that has passed through the filter 64 into an electrical signal, and outputs the converted signal to an output terminal. The reception unit 65 comprises a Pin photodiode (Pin-PD), and has a function of waveshaping and outputting a signal using an amplifier, an equalizer, and an identification circuit connected at the output side of the Pin photodiode.

Figure 5:
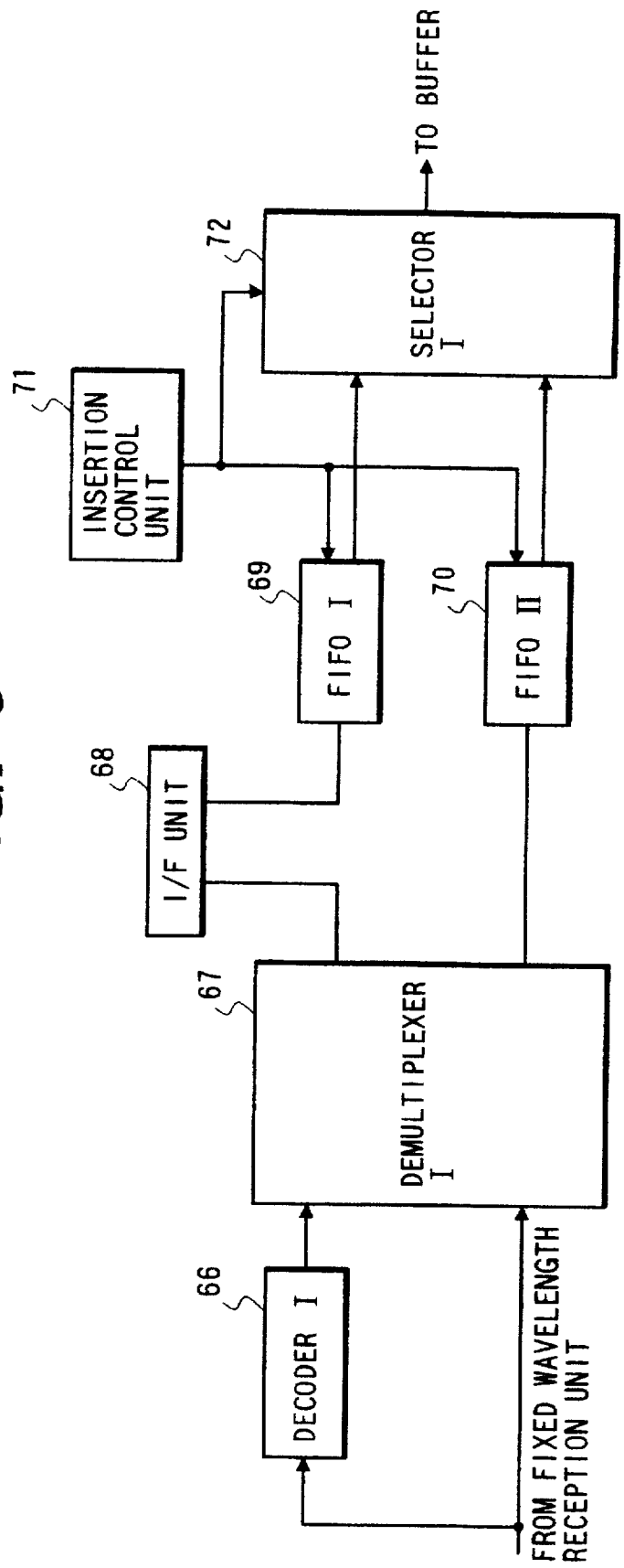
FIG. 5 is a block diagram showing the arrangement of a separation-insertion unit according to the first embodiment of the present invention.

FIG. 5 shows the internal arrangement of each of the separation-insertion units I 15 to VI 35 used in the node device according to the first embodiment of the present invention. The separation-insertion units I 15 to VI 35 have the same internal arrangement. Referring to FIG. 5, a decoder I 66 reads the address portion 62 of an input packet, and instructs a demultiplexer I 67 as to whether or not this packet is to be output onto the sub transmission path. The demultiplexer I 67 outputs the input packet to an I/F unit 68 or a FIFO II 70 in accordance with the instruction of the decoder I 66. The I/F unit 68 outputs a packet output from the demultiplexer I 67 onto the sub transmission path, and outputs a packet input from the sub transmission path to a FIFO (First In First Out) I 69. The FIFO I 69 and the FIFO II 70 temporarily store input packets and output the stored packets to a selector I 72 in the input order under the control of an insertion control unit 71. The insertion control unit 71 performs the reading control of the FIFOs I and II, and also performs control for inserting a packet transmitted from the sub transmission path into a packet flow output from the fixed wavelength reception unit by instructing a FIFO to be selected to the selector I. The selector I 72 selects the FIFO that stores a packet signal to be output in accordance with an instruction from the insertion control unit 71.

Figure 6:
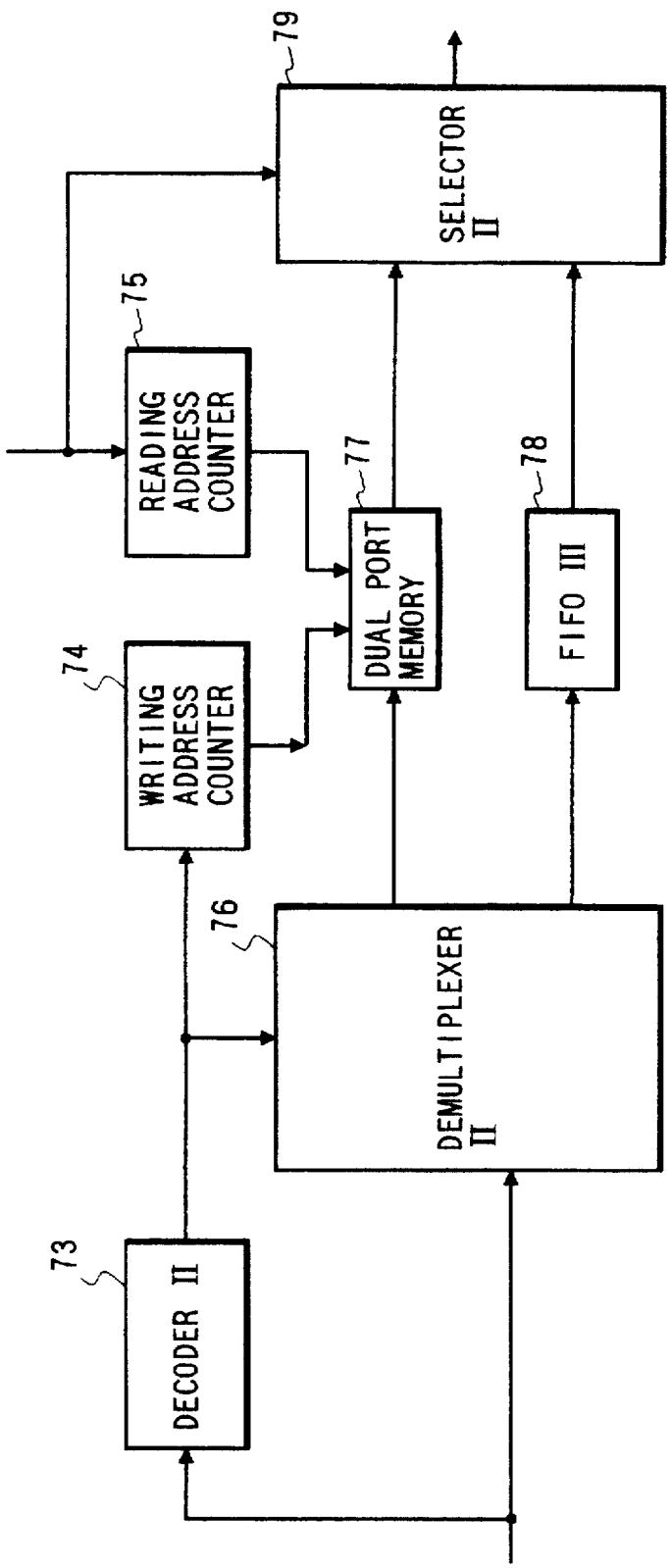
FIG. 6 is a block diagram showing the arrangement of a buffer according to the first embodiment of the present invention.

FIG. 6 shows the internal arrangement of each of the buffers I to VI used in the node device according to the first embodiment of the present invention. The buffers I to VI have the same internal arrangement. Referring to FIG. 6, in a dual port memory 77, a wavelength for transmission is designated and a packet to be transmitted is stored. A FIFO III 78 stores a packet whose transmission wavelength need not be designated. A decoder II 73 reads the address portion 62 of an input packet, and controls the output destination of a demultiplexer II 76 as follows in accordance with the destination of the packet.

Figure 7:
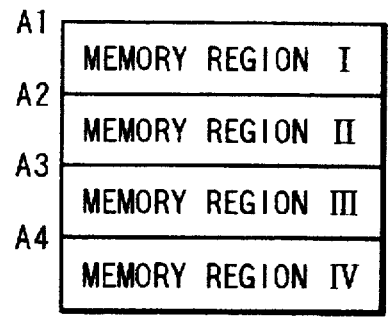
FIG. 7 is a view showing the memory map of a dual port memory according to the first embodiment of the present invention.

(1) When the destination is a terminal equipment connected, via the sub transmission path, to the separation-insertion means which belongs to the communication means different from that, to which the own buffer belongs, of the first or second communication means, the decoder II 73 instructs the demultiplexer II 76 to set the dual port memory 77 as the output destination, and instructs a writing address counter 74 to set the writing start address of the dual port memory 77, in which the packet is to be written, in correspondence with the reception wavelength of the fixed wavelength receiving means (the third fixed wavelength receiving means of the neighboring node device at the downstream side in the first direction if the own buffer belongs to the first communication means; the fourth fixed wavelength receiving means of the neighboring node device at the downstream side in the second direction if the own buffer belongs to the second communication means) which belongs to the loop-back communication means in the neighboring node device at the downstream side in the transmission direction. This address value will be described later with reference to FIG. 7.

(2) When the destination is a terminal equipment connected, via the sub transmission path, to the separation-insertion means which belongs to the same communication means as that, to which the own buffer belongs, of the first or second communication means, one of the following three processing operations is performed.

(2)-1 When the destination is a terminal equipment connected, via the sub transmission path, to the separation-insertion means of the own node device, the same processing as in (1) is performed.

(2)-2 When the destination is a terminal equipment connected, via the sub transmission path, to the separation-insertion means of the node device which neighbors the communication means, to which the own buffer belongs, at the downstream side in the transmission direction, the decoder II 73 instructs the demultiplexer II 76 to set the dual port memory 77 as the output destination, and instructs the writing address counter 74 to set the writing start address of the dual port memory 77, in which the packet is to be written, in correspondence with the reception wavelength of the fixed wavelength receiving means that outputs a packet to the separation-insertion means, to which the sub transmission path of the destination is connected, in the neighboring node device.

(2)-3 When the destination is none of the above-mentioned terminal equipments, the decoder II 73 instructs the demultiplexer II 76 to set the FIFO III 78 as the output destination.

The writing address counter 74 sequentially outputs writing address signals of a packet to the dual port memory 77 in accordance with the writing start address value output from the decoder II 73. A reading address counter 75 uses an offset value output from the buffer control unit 2 as the reading start address, and sequentially outputs reading address signals of a packet to the dual port memory 77. The demultiplexer II 76 outputs an input packet to the dual port memory 77 or the FIFO III 78 in accordance with an instruction of the decoder II 73. The dual port memory 77 can independently perform the reading and writing operations of packet data. The memory region of the dual port memory 77 is divided into four regions in correspondence with the transmission wavelengths of packets. Memory regions I to IV respectively correspond to the transmission wavelengths $\lambda 1$, $\lambda 2$, $\lambda 3$, and $\lambda 8$ in the buffer that belongs to the first communication means. On the other hand, the memory regions I to IV respectively correspond to the transmission wavelengths $\lambda 4$, $\lambda 5$, $\lambda 6$, and $\lambda 7$ in the buffer that belongs to the second communication means. The start addresses (to be described later) of these regions are respectively A1, A2, A3, and A4. The FIFO III 78 temporarily stores input packets, and outputs the stored packets to a selector II 79 in the input order under the control of a reading control unit 88 (see FIG. 8). The selector II 79 selects one of the outputs from the dual port memory 77 and the FIFO III 78 to be output to the variable wavelength transmission unit in accordance with an instruction from the buffer control unit 2.

The internal arrangement of each of the buffers VII 25 and VIII 28 used in the node device according to the first embodiment of the present invention is the same as that shown in FIG. 6. In this case, the decoder II 73 reads the address portion 62 of an input packet, and operates as follows in accordance with the destination of the packet.

(3)-1 When the destination is a sub transmission path connected to the separation-insertion unit of the neighboring node device at the downstream side in the transmission direction opposite to the transmission direction of the reception wavelength of the fixed wavelength receiving means of the loopback communication means to which the own buffer belongs, the decoder II 73 instructs the demultiplexer II 76 to set the dual port memory 77 as its output destination, and instructs the writing address counter 74 to set the writing start address value of the dual port memory 77, in which this packet is to be written, in correspondence with the reception wavelength of the fixed wavelength receiving means that outputs a packet to the separation-insertion means, to which the sub transmission path of the destination is connected, in the neighboring node device.

(3)-2 When the destination is not the above-mentioned one, the decoder II 73 instructs the demultiplexer II 76 to set the FIFO III 78 as its output destination.

Figure 8:
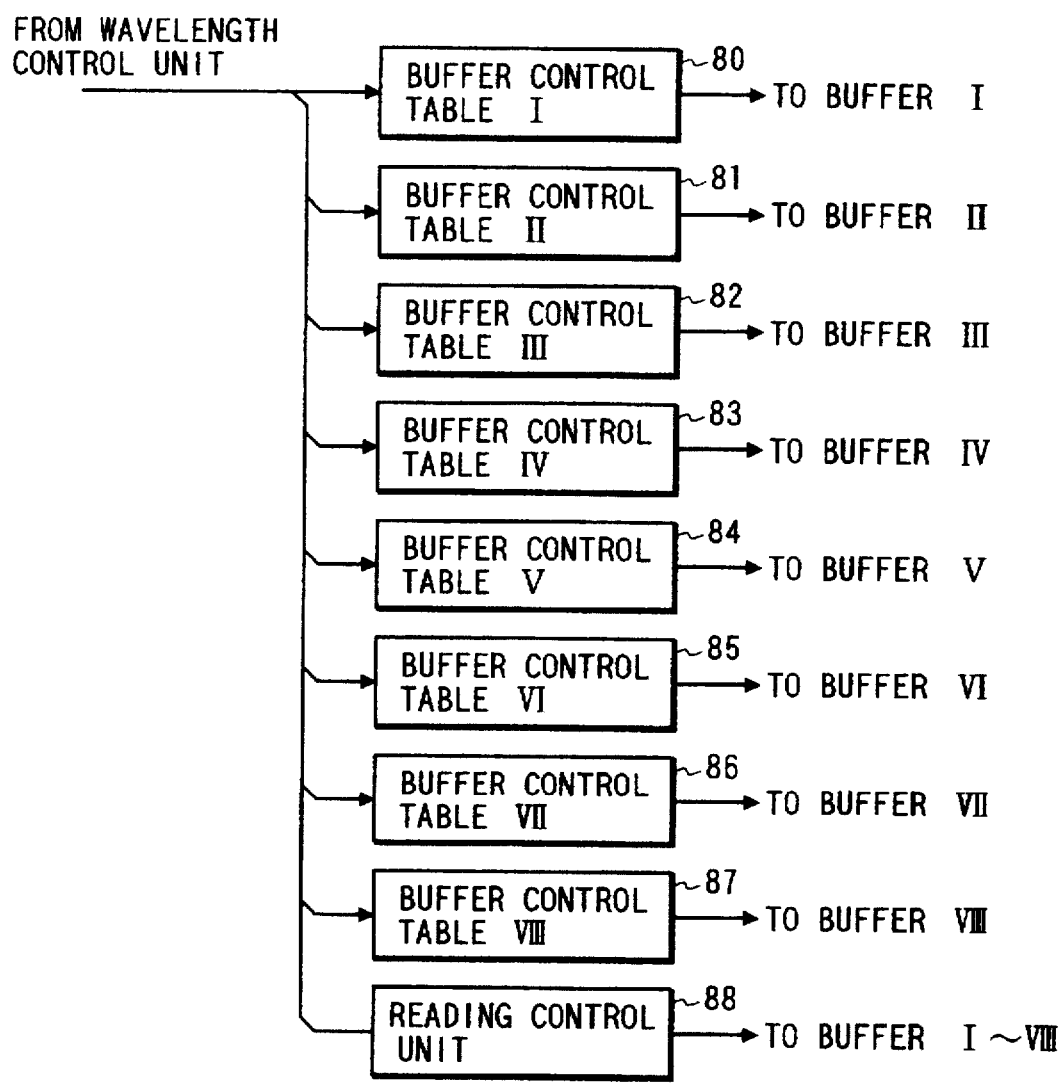
FIG. 8 is a block diagram showing the arrangement of a buffer control unit according to the first embodiment of the present invention.

FIG. 8 shows the internal arrangement of the buffer control unit 2 used in the node device according to the first embodiment of the present invention. Referring to FIG. 8, buffer control tables I 80 to VIII 87 are sequentially read out in accordance with the address values output from the wavelength control unit 3, and output predetermined offset values to the reading address counters 75 of the buffers I 18 to VIII 20. These tables comprise read-only memories (ROMs). The contents of the buffer control tables I 80 to VIII 87 will be described later. A reading control unit 88 counts clock signals output from the wavelength control unit 3 to output reading control signals for controlling the reading operations of the dual port memories 77 and the FIFOs III 78 to the buffers I to VIII.

Figure 9:
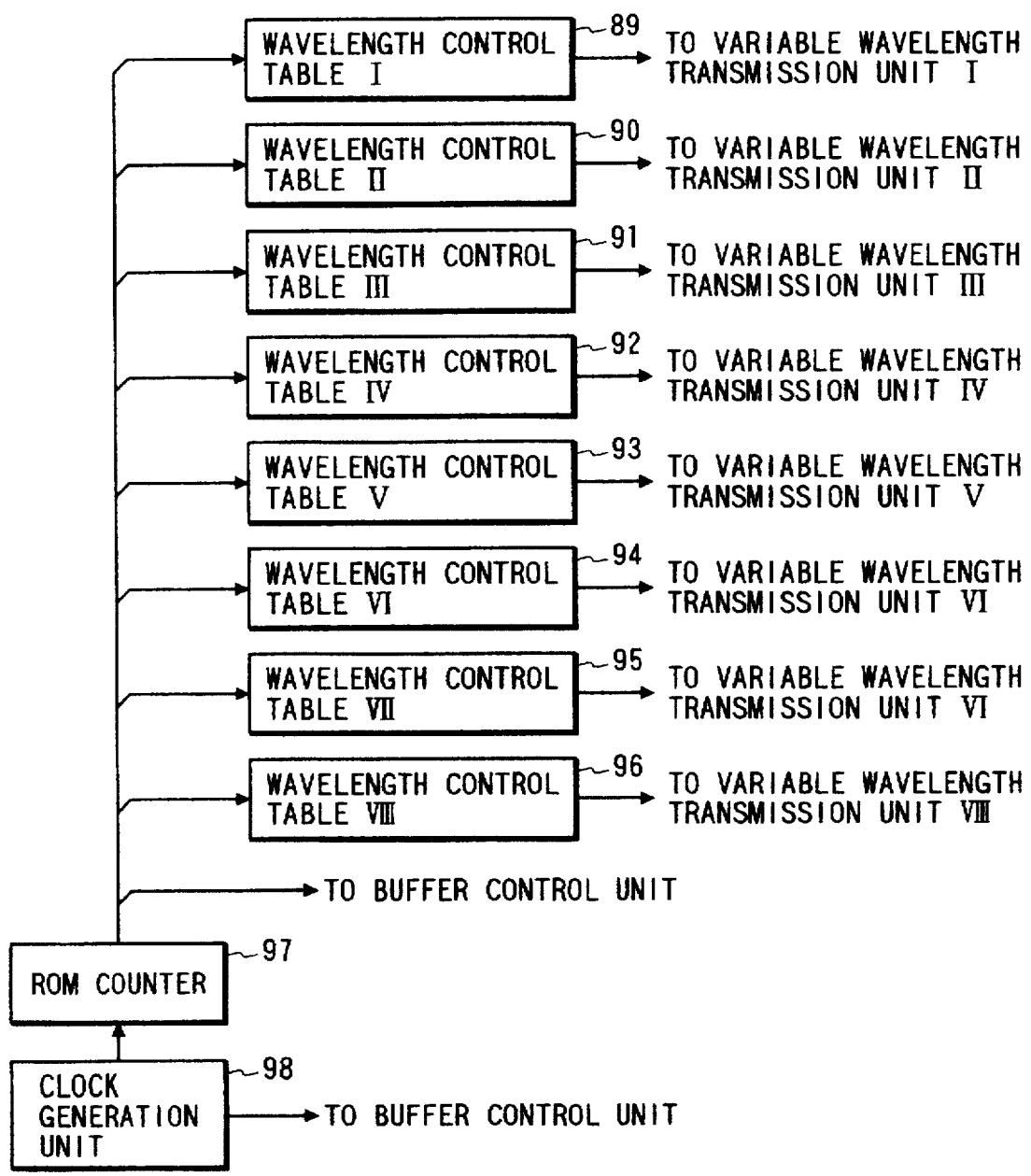
FIG. 9 is a block diagram showing the arrangement of a wavelength control unit according to the first embodiment of the present invention.

FIG. 9 shows the internal arrangement of the wavelength control unit 3 used in the node device according to the first embodiment of the present invention. Referring to FIG. 9, wavelength control tables I 89 to VIII 96 are sequentially read out by the address values output from a 2-bit ROM counter 97 and output predetermined wavelength control signals to drive units 99 (see FIG. 10) of the variable wavelength transmission units. These tables comprise read-only memories (ROMs). The contents of the wavelength control tables I to VIII will be described later. A clock generation unit 98 generates a predetermined clock signal and supplies it to the buffer control unit 2. The unit 98 also frequency-divides the clock signal and outputs the divided signal to the ROM counter 97.

Figure 10:
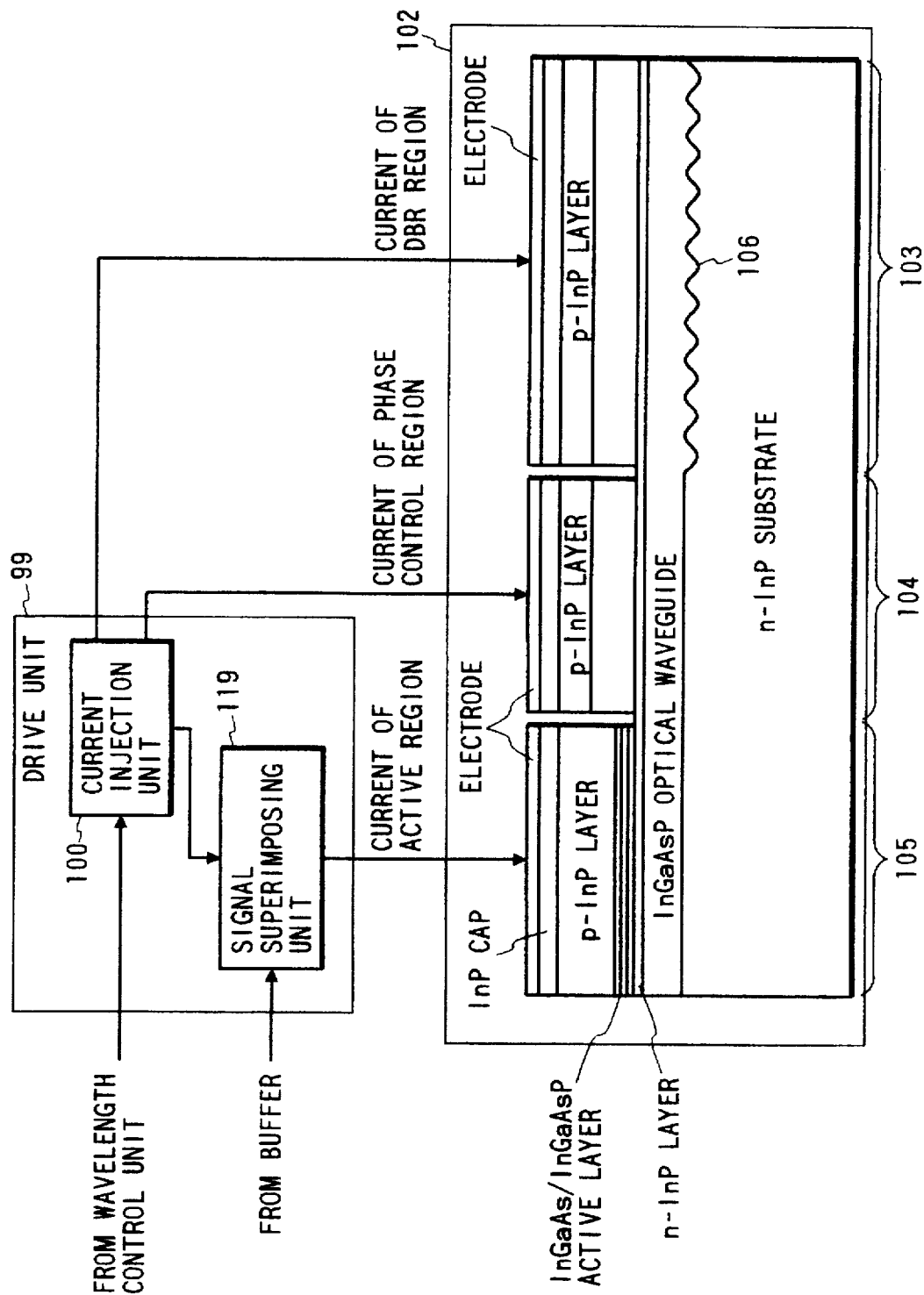
FIG. 10 is a block diagram showing the arrangement of a variable wavelength transmission unit according to the first embodiment of the present invention.

FIG. 10 shows the internal arrangement of each of the variable wavelength transmission units I to VIII used in the node device according to the first embodiment of the present invention. The variable wavelength transmission units I to VIII have the same arrangement. Referring to FIG. 10, a drive unit 99 is constituted by a signal superimposing unit 101 and a current injection unit 100. The current injection unit 100 controls the bias values of currents to be injected to three regions, i.e., a light emission region 105, a phase control region 104, and a DBR region 103, of a DBR tunable laser diode (TLD) 102, thereby controlling the transmission wavelength to a desired wavelength. The signal superimposing unit 101 superimposes an electrical signal supplied from the corresponding buffer onto a bias current output from the current injection unit 100, thus causing the DBR tunable laser to output an optical signal which is intensity-modulated by the predetermined wavelength. The DBR tunable laser diode (TLD) 102 has the DBR region 103 which changes its refractive index in correspondence with the injected carrier amount to change the transmission wavelength. The phase control region 104 attains phase matching of the transmission wavelength between the DBR region 103 and the light emission region 105. The light emission region 105 serves as an active portion for laser oscillation. A diffraction grating 106 is used for obtaining a sole transmission wavelength.

In the first embodiment, the contents of the wavelength control tables I 89 to VIII 96 are set, as shown in Table 1 below. Table 1 shows the transmission wavelengths of the variable wavelength transmission units under the control of the wavelength control unit 3. On the other hand, the offset values of the buffer control tables I 80 to VIII 87 are set, as shown in Table 2 below. These 16 tables are synchronously read out by the ROM counter 97.

TABLE 1

| Table Name | Address | | | |
| --- | --- | --- | --- | --- |
| | 0 | 1 | 2 | 3 |
| Wavelength Control Table I | $\lambda 1$ | $\lambda 3$ | $\lambda 8$ | $\lambda 2$ |
| Wavelength Control Table II | $\lambda 2$ | $\lambda 1$ | $\lambda 3$ | $\lambda 8$ |
| Wavelength Control Table III | $\lambda 8$ | $\lambda 2$ | $\lambda 1$ | $\lambda 3$ |
| Wavelength Control Table IV | $\lambda 4$ | $\lambda 6$ | $\lambda 7$ | $\lambda 5$ |
| Wavelength Control Table V | $\lambda 5$ | $\lambda 4$ | $\lambda 6$ | $\lambda 7$ |
| Wavelength Control Table VI | $\lambda 7$ | $\lambda 5$ | $\lambda 4$ | $\lambda 6$ |
| Wavelength Control Table VII | $\lambda 6$ | $\lambda 7$ | $\lambda 5$ | $\lambda 4$ |
| Wavelength Control Table VIII | $\lambda 3$ | $\lambda 8$ | $\lambda 2$ | $\lambda 1$ |

TABLE 2

| Table Name | Address | | | |
| --- | --- | --- | --- | --- |
| | 0 | 1 | 2 | 3 |
| Buffer Control Table I | A1 | A3 | A4 | A2 |
| Buffer Control Table II | A2 | A1 | A3 | A4 |
| Buffer Control Table III | A4 | A2 | A1 | A3 |
| Buffer Control Table IV | A1 | A3 | A4 | A2 |
| Buffer Control Table V | A2 | A1 | A3 | A4 |
| Buffer Control Table VI | A4 | A2 | A1 | A3 |
| Buffer Control Table VII | A3 | A4 | A2 | A1 |
| Buffer Control Table VIII | A3 | A4 | A2 | A1 |

Therefore, the transmission wavelength of each tunable laser diode (TLD) cyclically shifts in the order of $\lambda 1$ to $\lambda 3$, $\lambda 8$, $\lambda 2$, and $\lambda 1$ or in the order of $\lambda 4$ to $\lambda 6$, $\lambda 7$, $\lambda 5$, and $\lambda 4$ depending on the first or second transmission direction. Note that the wavelengths are selected to satisfy $\lambda 1 < \lambda 2 < \lambda 3 < \lambda 8 < \lambda 4 < \lambda 5 < \lambda 6 < \lambda 7$, as described above. In this manner, since the wavelength cyclically shifts intermittently, the maximum value of the change amount of the wavelength upon changing the wavelength can be reduced. For example, when the wavelength is changed in turn in the order of $\lambda 1$, $\lambda 2$, $\lambda 3$, and $\lambda 8$, the wavelength change amount from $\lambda 8$ to $\lambda 1$ becomes large. However, when the wavelengths are set as described above, such large wavelength change amount does not occur. Furthermore, as shown in Table 1, the transmission wavelengths of the tunable laser diodes (TLDs) cyclically shift in different-phases so that multiple laser tunable laser diodes (TLDs) do not perform transmission using an identical wavelength. As described above, the wavelength control tables I89 to VIII 96 determine the transmission wavelength control pattern.

In Tables 1 and 2, when the transmission wavelength of the variable wavelength transmission unit that performs transmission in the first direction is $\lambda 1$, the value A1 of the memory region I is assigned to the offset value used for reading out data from the dual port memory 77 in the buffer, and when the transmission wavelengths are $\lambda 2$, $\lambda 3$, and $\lambda 8$, the values corresponding to the memory regions II, III, and IV are assigned. Similarly, when the transmission wavelength of the variable wavelength transmission unit that performs transmission in the second direction is $\lambda 4$, the value A1 of the memory region I is assigned to the offset value used for reading out data from the dual port memory 77 in the buffer, and when the transmission wavelengths are $\lambda 5$, $\lambda 6$, and $\lambda 7$, the values corresponding to the memory regions II, III, and IV are assigned.

In the buffer shown in FIG. 6, the memory regions I to IV correspond to the reception wavelength of the fixed wavelength reception unit that outputs a packet to the separation-insertion means, to which the sub transmission path of the destination is connected, in the neighboring node device, or the reception wavelength of the fixed wavelength reception unit in the loopback communication means. Therefore, when the wavelength control tables are set, as shown in Table 1, and the buffer control tables are set, as shown in Table 2, the reading operation of packet data stored in each buffer is controlled until the transmission wavelength of the variable wavelength transmission unit matches the reception wavelength of the fixed wavelength reception unit that outputs a packet to the separation-insertion unit, to which the sub transmission path of the destination is connected, in the neighboring node.

The following operation examples of the first embodiment of the present invention will be described below with reference to FIGS. 1A to 10 and the timing chart in FIG. 11:

Operation Example 1) transmission of a packet whose source is the terminal equipment I 48 connected to the sub transmission path I 42 of the node device I 54, and whose destination is the terminal equipment V52 connected to the sub transmission path V 46 of the node device IV 57; and Operation Example 2) transmission of a packet whose source is the terminal equipment I 48 connected to the sub transmission path I 42 of the node device I 54, and whose destination is the terminal equipment III 50 connected to the sub transmission path III 44 of the same first communication means of the same node device I 54.

In the following description, this packet will be called a packet A. Also, in the following description, identical constituting elements of different node devices will be denoted by the same reference numerals shown in FIGS. 1A to 10, for the sake of simplicity.

Figure 11:
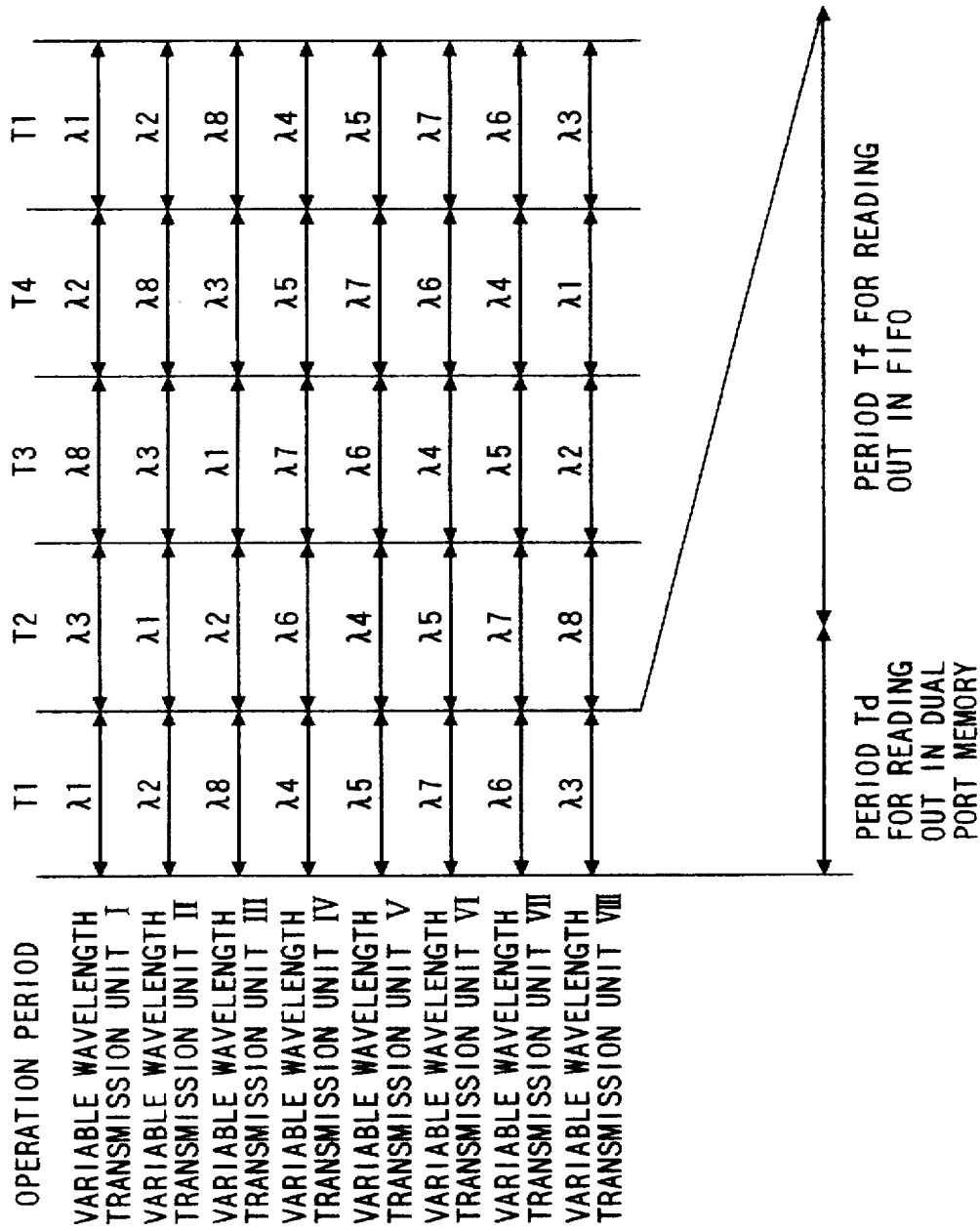
FIG. 11 is a timing chart of the first embodiment of the present invention.

The operation of the node device in this embodiment is constituted by four consecutive operation periods T1, T2, T3, and T4, as shown in FIG. 11. Furthermore, each of these four consecutive operation periods T1, T2, T3, and T4 is divided into a period Td for reading out the dual port memory 77 and a period Tf for reading out the FIFO III 78 in correspondence with the operations of each buffer.

The terminal equipment I 48 as the source connected to the sub transmission path I 42 of the node device I 54 forms the packet A in the format shown in FIG. 3 by adding, as the address portion 62, the address of the terminal equipment V 52 as the destination connected to the sub transmission path V 46 of the node device IV 57, to data to be transmitted to the terminal equipment V 52 connected to the sub transmission path V 46 of the node device IV 57. The terminal equipment I 48 then transmits the packet A to the separation-insertion unit I 15 of the node device I 54 via the sub transmission path I 52. The I/F unit 68 of the separation-insertion unit I 15 of the node device I 54 sequentially writes the packet A transmitted via the sub transmission path I 42 in the FIFO I 69. Upon completion of the writing operation of the packet A in the FIFO I 69, the insertion control unit 71 detects the division of a packet flow which is being read out from the FIFO II 70, switches the FIFO output to be output from the selector I 72 to the output from the FIFO I 69, stops the reading operation of the FIFO II 70, and starts a reading operation of the FIFO I 69. Upon completion of the reading operation of the packet A written in the FIFO I 69, the insertion control unit 71 switches the FIFO output to be output from the selector I 72 to the output from the FIFO II 70 again, stops the reading operation of the FIFO I 69, and restarts the reading operation of the FIFO II 70. The packet A output from the selector I 72 is input to the buffer I 18.

The decoder II 73 of the buffer I 18 reads the address portion 62 of the input packet A. The buffer I 18 belongs to the first communication means, and the destination of the packet A is the sub transmission path V 46 connected to the second communication means of the node device IV 57. For this reason, the decoder II 73 determines that condition (1) above is satisfied, sets the dual port memory 77 as the output destination of the demultiplexer II 76, and instructs the writing start address A4 to the writing address counter 74. The writing address counter 74 loads this writing start address, generates writing addresses of the input packet A by sequentially incrementing the counter, and outputs the writing addresses to the dual port memory 77. Since the input port of the dual port memory 77 receives the packet A via the demultiplexer II 76, the packet A is sequentially written in the memory region IV in accordance with the addresses output from the writing address counter 74.

Assuming that the operation period in which the packet A is written in the dual port memory 77 is T1, the reading operation of the packet A from the dual port memory 77 is controlled to wait until the operation period T3 in which the transmission wavelength of the variable wavelength transmission unit I 21 matches the reception wavelength λ8 of the fixed wavelength reception unit VII 24 of the first loopback communication means of the neighboring node device II 55. During the period Td for reading out the dual port memory in the operation period T3, the packet A is read out under the control of the buffer control unit 2.

During the operation period T3, a reading address value "2" is simultaneously output from the ROM counter 97 of the wavelength control unit 3 to the wavelength control tables I 89 to VII 96. With this address value, the contents of the wavelength control tables are read out. As shown in Table 1 above, the contents read out from the wavelength control table I at that time are a control signal corresponding to the wavelength λ8, and similarly, the contents respectively read out from the wavelength control tables II, III, IV, V, VI, VII, and VIII are control signals corresponding to the wavelengths λ3, λ1, λ7, λ6, λ4, λ5, and λ2. These control signals are respectively input to the drive units 99 of the variable wavelength transmission units I 21 to VIII 29. In the drive units 99, the injection currents of the current injection units 100 are set by these wavelength control signals, and the transmission wavelengths of the tunable laser diodes (TLDs) are set to be predetermined wavelengths.

At the same time, during the period Td for reading out the dual port memory in the operation period T3, the reading address value "2" output from the ROM counter 97 of the wavelength control unit 3 is input to the buffer control tables of the buffer control unit 2. With this address value, the contents of the buffer control tables I 80 to VIII 87 are read out. As shown in Table 2 above, the contents read out from the buffer control table I at that time are the offset value A4 corresponding to the memory region IV, and similarly, the contents respectively read out from the buffer control tables II, III, IV, V, VI, VII, and VIII are the offset values A3, A1, A4, A3, A1, A2, and A2 corresponding to the memory regions III, I, IV, III, I, II, and II. These offset values are output to the reading address counters 75 of the buffers I 18 to VIII 28. On the other hand, the reading control unit 88 of the buffer control unit 2 outputs a control signal for setting the dual port memory 77 in the read enable state, a control signal for setting the FIFO III 78 in the read disable state, a control signal for setting the dual port memory 77 as the input source of the selector II 79, and the like on the basis of clock signals output from the wavelength control unit 3.

Upon reception of these control signals, the reading address counter 75 in the buffer I 18 loads the offset value A4 output from the buffer control table I 80, generates addresses for reading out a packet written in the memory region IV by sequentially incrementing the counter, and outputs the addresses to the dual port memory 77. With these reading addresses, the packet is sequentially read out from the output port of the dual port memory 77, and is output to the variable wavelength transmission unit I 21. The packet read out at this time is the packet A written in the memory region IV during the operation period T1, and the packet A is transmitted. The transmission wavelength is λ8, and the packet A is received by the fixed wavelength reception unit VII 24 of the loopback communication means of the neighboring node device II 55 at the downstream side in the transmission direction.

At the same time, during the period Td for reading out the dual port memory in the operation period T3, the reading address counter 75 of the buffer II 19 loads the offset value A3 output from the buffer control table II 81, and a packet written in the memory region III is read out from the dual port memory 77 as in the buffer I 18. The readout packet is output to the variable wavelength transmission unit II 22. Likewise, packets are respectively read out from the memory region I of the buffer III 20, the memory region IV of the buffer IV 36, the memory region III of the buffer V 37, the memory region I of the buffer VI 38, the memory region II of the buffer VII 25, and the memory region II of the buffer VIII 28, and are output to the variable wavelength transmission units III 23 to VIII 29. The packets read out at that time are packets addressed to the terminal equipments connected to the sub transmission paths I to III of the neighboring node device II 55 at the downstream side in the transmission direction and the sub transmission paths IV to VI of the node device IV 57, or packets which are looped back by the loopback communication means.

Subsequently, during the period Tf for reading out the FIFO in the operation period T3, the reading control unit 88 of the buffer control unit 2 outputs a control signal for setting the dual port memory in the read disable state, a control signal for setting the FIFO III in the read enable state, a control signal for setting the FIFO III as the input source of the selector II, and the like on the basis of clock signals output from the wavelength control unit 3. Upon reception of these control signals, a packet stored in the FIFO III in the buffer I 18 is read out, and is output to the variable wavelength transmission unit I 12 via the selector II. Similarly, packets written in the FIFOs III in the buffers II 19 to VIII 28 are sequentially read out, and are output to the variable wavelength transmission units II 22 to VIII 29.

The variable wavelength transmission units I 12 to III 23, and VIII 29 respectively convert the packets output from the buffers I 18 to III 20, and VIII 28 into optical signals of the wavelengths λ8, λ3, λ1, and λ2 on the basis of the wavelength control signals output from the wavelength control unit 3, and output these signals onto the optical fiber 5 (the optical fiber 58 in FIG. 2; the same applies to the following description) via the wavelength multiplexer 10 and the input/output unit 7 so as to be transmitted in the first direction. Although optical signals of the wavelengths λ4, λ5, λ6, and λ7 output from the node device II 55 are transmitted on the optical fiber 5 in the second direction, since these signals have different wavelengths, they do not influence each other. Similarly, the variable wavelength transmission units IV 39 to VII 26 respectively convert the packets output from the buffers IV 36 to VII 25 into optical signals of the wavelengths λ7, λ6, λ4, and λ5 on the basis of the wavelength control signals output from the wavelength control unit 3, and output these signals onto the optical fiber 4 (the optical fiber 61 in FIG. 2; the same applies to the following description) via the wavelength multiplexer 11 and the input/output unit 6 so as to be transmitted in the second direction.

The packet A which has been transmitted from the terminal equipment I 48 connected to the sub transmission path I 42 of the node device I 54 to the terminal equipment V 52 connected to the sub transmission path V 46 of the node device IV 57 is transmitted to the node device II 55 as the optical signal of the wavelength λ8, as described above. The packet A received by the node device II 55 as the optical signal of the wavelength λ8 is subjected to loopback relay transmission processing by the first loopback communication means in the node device II 55.

The optical signals of the wavelengths λ1, λ2, λ3, and λ8 transmitted from the node device I 54 via the optical fiber 58 are output from the input/output unit 6 to the divider 8 of the node device II 55, and are divided by the divider 8. The divided optical signals are respectively input to the fixed wavelength reception units I 12 to III 14, and VII 24. In the fixed wavelength reception unit VII, only the optical signal of the wavelength λ8 passes through the filter 64, and is received by the reception unit 65. The packet A is received by the fixed wavelength reception unit VII 24 since it has been transmitted from the node device I 54 as the optical signal of the wavelength λ8. The packet A received by the fixed wavelength reception unit VII 24 is output to the buffer VII 25.

The decoder II 73 of the buffer VII 25 reads the address portion 62 of the input packet A. Since the destination of this packet A is not the sub transmission path connected to the neighboring node device I 54 ((3)-2 above), the decoder II 73 sets the FIFO III 78 as the output destination of the demultiplexer II 76. Thus, the packet A is written in the FIFO III. Assuming that the operation period in which the packet A is written in the FIFO III is T4, the packet A is read out under the control of the buffer control unit 2 during the period Tf for reading out the FIFO III in the neighboring operation period T1.

During the next operation period T1, the ROM counter 97 of the wavelength control unit 3 simultaneously outputs a reading address value "0" to the wavelength control tables I to VIII. With this address value, the contents of the wavelength control tables are read out. The contents read out from the wavelength control table VII corresponding to the variable wavelength transmission unit VII 26 that will transmit the packet A are a control signal corresponding to the wavelength λ6, as shown in Table 1 above. Therefore, the packet A is output as the optical signal of the wavelength λ6 from the variable wavelength transmission unit VII 26 of the node device II 55 onto the optical fiber 58 so as to propagate in the second transmission direction, and is received by the fixed wavelength reception unit VI 32 of the node device I 54.

The packet A received by the fixed wavelength reception unit VI 32 of the node device I 54 is output to the separation-insertion unit VI 35. The decoder I 66 of the separation-insertion unit VI 35 reads the address portion 62 of the input packet A. Since the destination of the packet A is the sub transmission path connected to the neighboring node device IV 57 at the downstream side in the transmission direction, the decoder I 66 sets the FIFO II 70 as the output destination of the demultiplexer I 67. The packet A written in the FIFO II in this manner is read out under the control of the insertion control unit 71, and is output to the buffer VI 38 via the selector I 72.

The decoder II 73 of the buffer VI 38 reads the address portion 62 of the packet A. Since the destination of the packet A is the terminal equipment V 52 connected to the sub transmission path V 46 connected to the neighboring node device IV 57 at the downstream side in the transmission direction, the decoder II 73 sets the dual port memory 77 as the output destination of the demultiplexer II 76, and at the same time, outputs A2 as the writing start address to the writing address counter 74. The writing address counter 74 loads this writing start address, generates the writing addresses of the input packet A by sequentially incrementing the counter, and outputs the writing addresses to the dual port memory 77. The packet A is input to the input port of the dual port memory 77 via the demultiplexer II, and is sequentially written in the memory region II in accordance with the addresses output from the address counter 74. The reading operation of the packet A from the dual port memory 77 is controlled to wait until the operation period T2 in which the transmission wavelength of the variable wavelength transmission unit VI 41 matches the reception wavelength λ5 of the fixed wavelength reception unit V 31 that outputs a packet to the separation-insertion unit V, to which the sub transmission path V of the destination is connected, in the neighboring node device IV 57 at the downstream in the transmission direction. The packet A which is written in the memory region II of the buffer VI 38 is read out during the period Td for reading out the dual port memory in the operation period T2, as in the node device II 55, and is output as an optical signal of the wavelength λ5 from the variable wavelength transmission unit VI 41 onto the optical fiber 61 so as to travel in the second transmission direction. Then, the packet A is received by the fixed wavelength reception unit V 31 of the node device IV 57.

The packet A received by the fixed wavelength reception unit V 31 of the node device IV 57 is output to the separation-insertion unit V 34. The decoder I 66 of the separation-insertion unit V 34 reads the address portion 62 of the input packet A. Since the destination of the packet A is the sub transmission path V 46 connected to the separation-insertion unit V 34 itself, the decoder I 66 sets the I/F unit 68 as the output destination of the demultiplexer I 67. With this control, the packet A is output to the I/F unit 68 via the demultiplexer I 67, and is transmitted to the sub transmission path V 46. Thereafter, the packet A is received by the terminal equipment V 52 as the destination. After the address portion 62 is removed from the packet A, only the data portion 63 is extracted, and is subjected to desired processing.

As described above, in operation example 1), the packet A, which is transmitted from the terminal equipment I 48 as the source connected to the sub transmission path I 42 of the node device I 54 to the terminal equipment V 52 connected to the sub transmission path V 46 of the node device IV 57, is output from the variable wavelength transmission unit I 21 of the node device I 54 at the wavelength λ8 in the first direction. Thereafter, the packet A is output at the wavelength λ6 in the second transmission direction by the first loopback communication means of the neighboring node II 55 at the downstream side of the node device I 54. In the node device I 54 located at the upstream side, in the transmission direction, of the node device IV 57 as the destination, the packet A is converted into an optical signal of the wavelength λ5 as the reception wavelength of the fixed wavelength reception unit V that outputs a packet to the separation-insertion unit V, to which the sub transmission path V of the destination is connected, in the node device IV 57, and is output in the second transmission direction. Then, the packet A is received by the fixed wavelength reception unit V 31 of the node device IV 57, and is separated by the separation-insertion unit V 34. The separated packet A is transmitted onto the sub transmission path V 46, and is then received by the terminal equipment V 52.

Subsequently, operation example 2) transmission of a packet whose source is the terminal equipment I 48 connected to the sub transmission path I 42 of the node device I 54, and whose destination is the terminal equipment III 50 connected to the sub transmission path III 44 of the same first communication means of the same node device I 54 will be explained below.

In the case of operation example 2), a packet is looped back by the two node devices, i.e., the node devices II 55 and IV 57. The operation condition of the decoder II 73 of the buffer I 18 upon transmission of a packet from the node device I 54 is (2)-1 above. However, in this case, since the same operation as in (1) is performed, the operation of the buffer I 18 is the same as that in operation example 1) above. The operation from when the packet transmitted from the node device I 54 is looped back by the node device II 55 until it is received by the fixed wavelength reception unit VI 32 of the node device I 54 is the same as that in operation example 1) above, and a detailed description thereof will be omitted.

The packet A received by the fixed wavelength reception unit VI 32 of the node device I 54 is output to the separation-insertion unit VI 35. The decoder I 66 of the separation-insertion unit VI 35 reads the address portion 62 of the input packet A. Since the destination of this packet A is "(1) a terminal equipment connected to the separation-insertion means that belongs to the communication means different from that, to which the own buffer belongs, of the first or second communication means", the decoder II 73 sets the dual port memory 77 as the output destination of the demultiplexer II 76, and instructs the writing address counter 74 of the writing start address A4. With this control, the packet A is written in the memory region IV.

The packet A written in the memory region IV is read out during the period Td for reading out the dual port memory in the operation period T1, in which the transmission wavelength of the variable wavelength transmission unit VI 41 of the node device I 54 matches the reception wavelength λ7 of the fixed wavelength reception unit VIII 27 of the loopback communication means of the neighboring node device IV 57. The readout packet A is output as an optical signal of the wavelength λ7 from the variable wavelength transmission unit VI 41 onto the optical fiber 61 so as to travel in the second transmission direction, and is then received by the fixed wavelength reception unit VIII 27 of the node device IV 57.

The packet A received by the node device IV 57 as the optical signal of the wavelength λ7 is subjected to loopback relay transmission processing by the second loopback communication means in the node device IV 57. The packet A received by the fixed wavelength reception unit VIII 27 of the node device IV 57 is written in the memory region III of the dual port memory 77 of the buffer VIII 28 since its destination is the terminal equipment III 50 connected to the sub transmission path III 44 of the first communication means of the neighboring node device I 54 at the downstream side in the transmission direction opposite to the transmission direction of the wavelength received by the fixed wavelength reception unit VIII 27. The packet A written in the dual port memory 77 is read out during the period Td for reading out the dual port memory in the operation period T1, and is output as an optical signal of the wavelength λ3 from the variable wavelength transmission unit VIII 29 onto the optical fiber 61 so as to travel in the first transmission direction. Then, the packet A is received by the fixed wavelength reception unit III 14 of the node device I 54.

The packet A received by the fixed wavelength reception unit III 14 of the node device I 54 is separated by the separation-insertion unit III 17, and is output to the I/F unit 68 via the demultiplexer I 67. The packet A is transmitted onto the sub transmission path III 44, and is then received by the terminal equipment III 50 as the destination. After the address portion 62 is removed from the packet A, only the data portion 63 is extracted, and is subjected to desired processing.

As described above, in operation example 2), the packet A which is transmitted from the terminal equipment I 48 as the source connected to the sub transmission path I 42 of the node device I 54 toward the terminal equipment III 50 connected to the sub transmission path III 44 of the same first communication means of the same node device I 54 is looped back by the two node devices, i.e., the node devices II 55 and IV 57, and is then transmitted to the terminal equipment III 50 as the destination.

Other operations are similarly performed in accordance with the above-mentioned operation examples. FIG. 23 shows the principle of the loopback communications in this embodiment. Referring to FIG. 23, numeral 1 and the like indicate the first one and the like.

(Second Embodiment)

Figure 12:
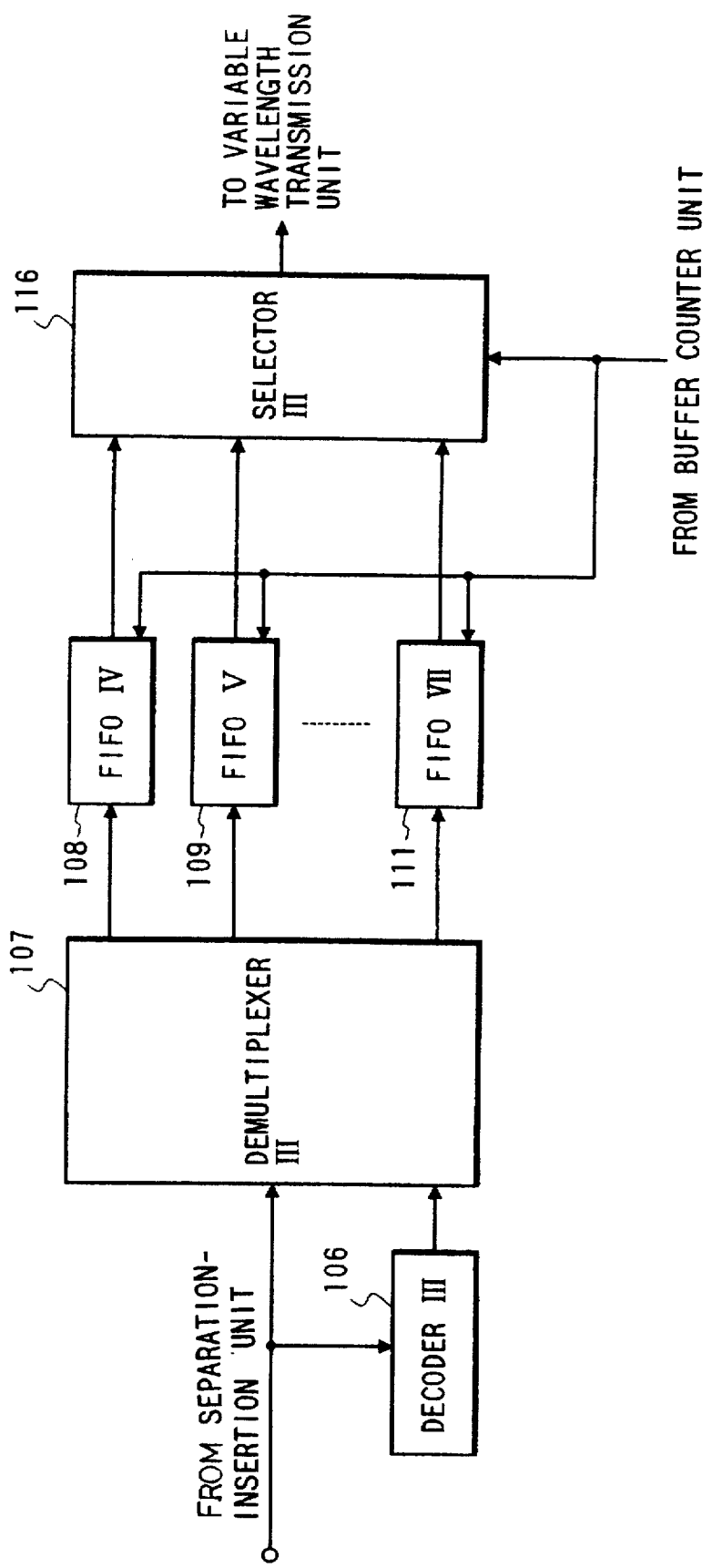
FIG. 12 is a block diagram showing the arrangement of a buffer according to the second embodiment of the present invention.

FIG. 12 shows another internal arrangement of each of the buffers I 18 to VIII 28 in the first embodiment of the present invention.

Referring to FIG. 12, a decoder III 106 reads an address portion 62 of an input packet, selects a FIFO in which the packet is to be written, and instructs a demultiplexer III 107 of the selected FIFO. The demultiplexer III 107 outputs a packet signal input from the separation-insertion unit to the predetermined FIFO in accordance with an instruction from the decoder III 106. FIFOs 108 to 111 are arranged in correspondence with transmission wavelengths. The FIFOs 108 to 111 temporarily store packet signals output from the demultiplexer III 107 and the stored packet signals are read out in accordance with an instruction from the buffer control unit 2. A selector III 116 selects a predetermined one of the FIFOs IV to VII in accordance with a control signal from the buffer control unit 2, and outputs the output signal from the selected FIFO to the variable wavelength transmission unit.

Table 3 below shows an embodiment of buffer control tables preferably used in the buffer arrangement shown in FIG. 12, and summarizes the serial numbers of FIFOs from which packet signals are to be read out. The arrangement of the buffer control unit is the same as that shown in FIG. 6.

TABLE 3

| Table Name | Address | | | |
|---|---|---|---|---|
| | 0 | 1 | 2 | 3 |
| Buffer Control Table I | IV | VI | VII | V |
| Buffer Control Table II | V | IV | VI | VII |
| Buffer Control Table III | VII | V | IV | VI |
| Buffer Control Table IV | IV | VI | VII | V |
| Buffer Control Table V | V | IV | VI | VII |
| Buffer Control Table VI | VII | V | IV | VI |

TABLE 3-continued

| Table Name | Address | | | |
|---|---|---|---|---|
| | 0 | 1 | 2 | 3 |
| Buffer Control Table VII | VI | VII | V | IV |
| Buffer Control Table VIII | VI | VII | V | IV |

In this embodiment, in each operation period, the FIFOs shown in the buffer control tables of Table 3 are selected, and the written packet signals are read out therefrom and are output to the variable wavelength transmission units. For example, during the operation period T1, in the buffer I 18, the FIFO IV is selected, and the written packet signal is read out therefrom and is output to the variable wavelength transmission unit I 21.

In this embodiment, using a plurality of FIFOs, since the need for supplying an offset value to the reading address counter 75 as in the arrangement of the first embodiment can be obviated, the arrangement of the buffer can be simplified. The operation is the same as that in the first embodiment.

(Third Embodiment)

Figure 13B:
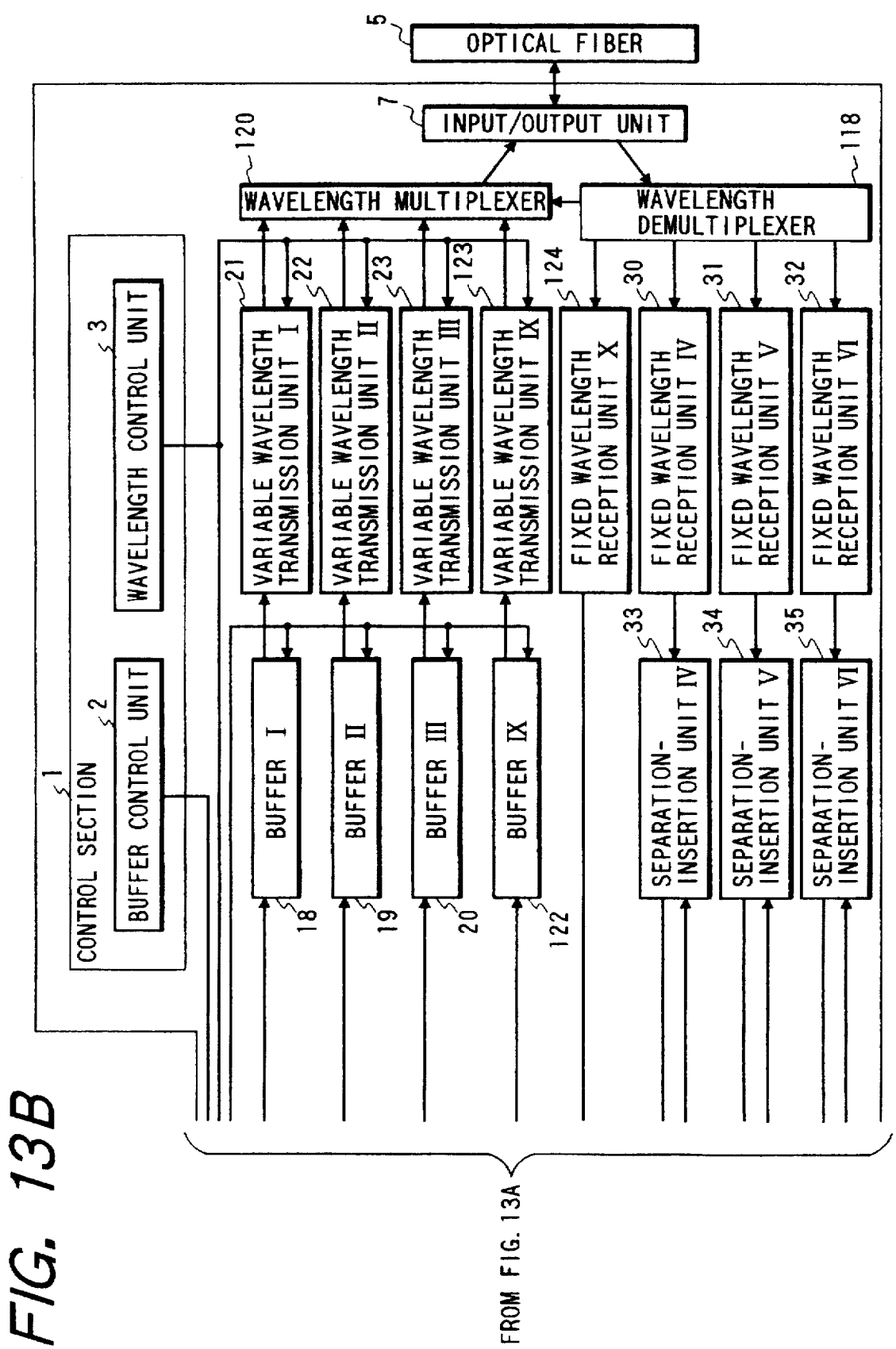
FIG. 13 is comprised of FIGS. 13A and 13B showing block diagrams illustrating the arrangement of a buffer according to the third embodiment of the present invention.
Figure 14:
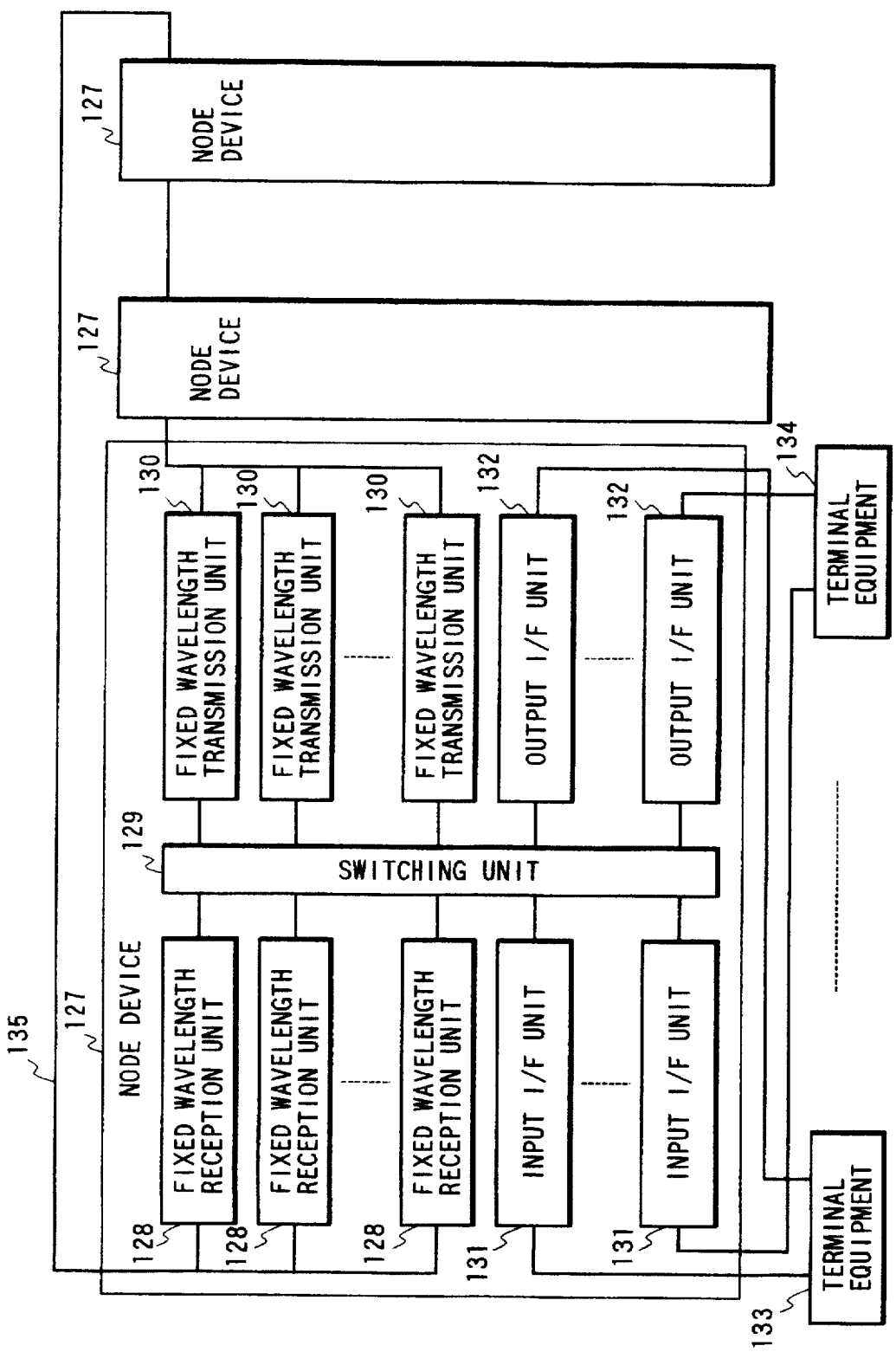
FIG. 14 is a block diagram showing the arrangement of the first system.
Figure 15:
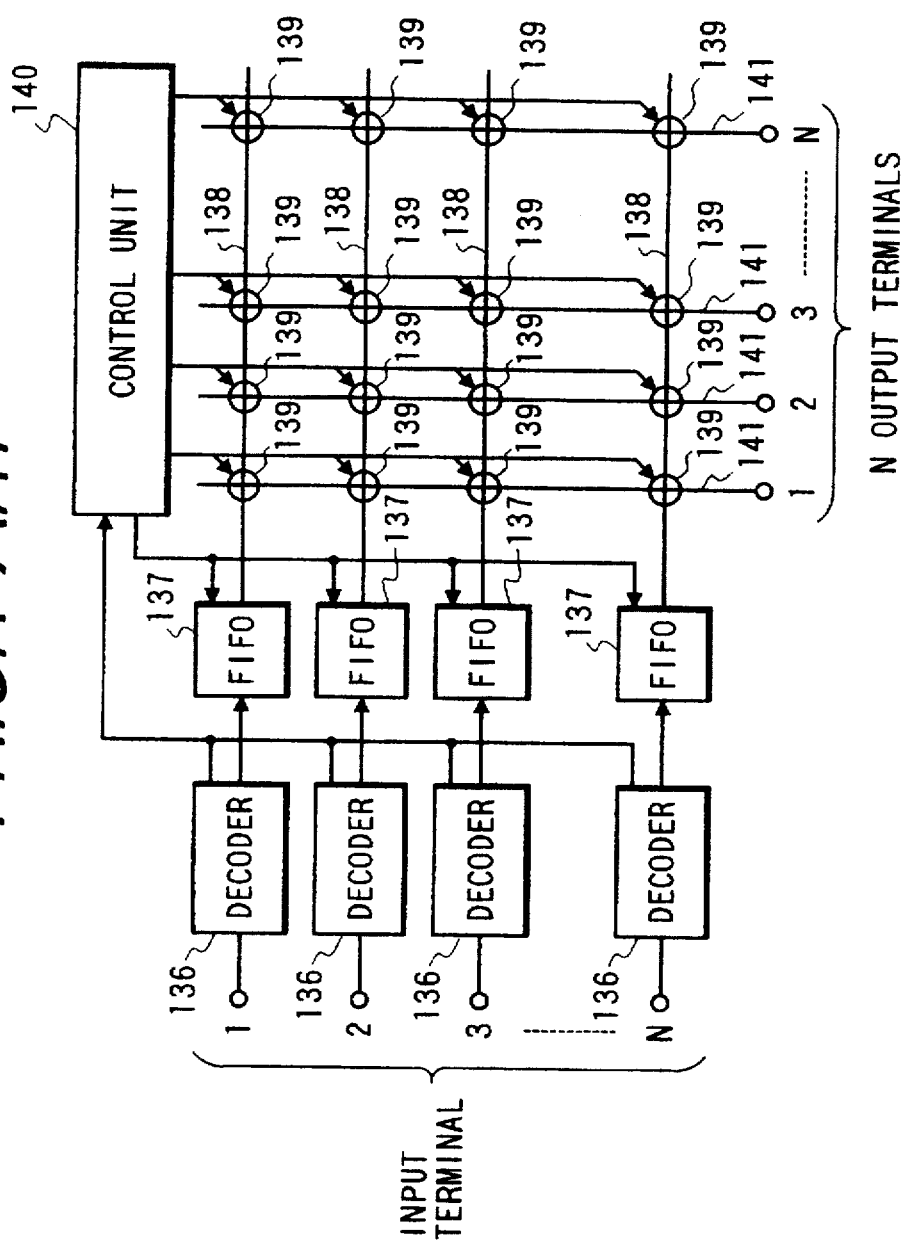
FIG. 15 is a block diagram showing the arrangement of 8×8 electrical switches in the first system.
Figure 16:
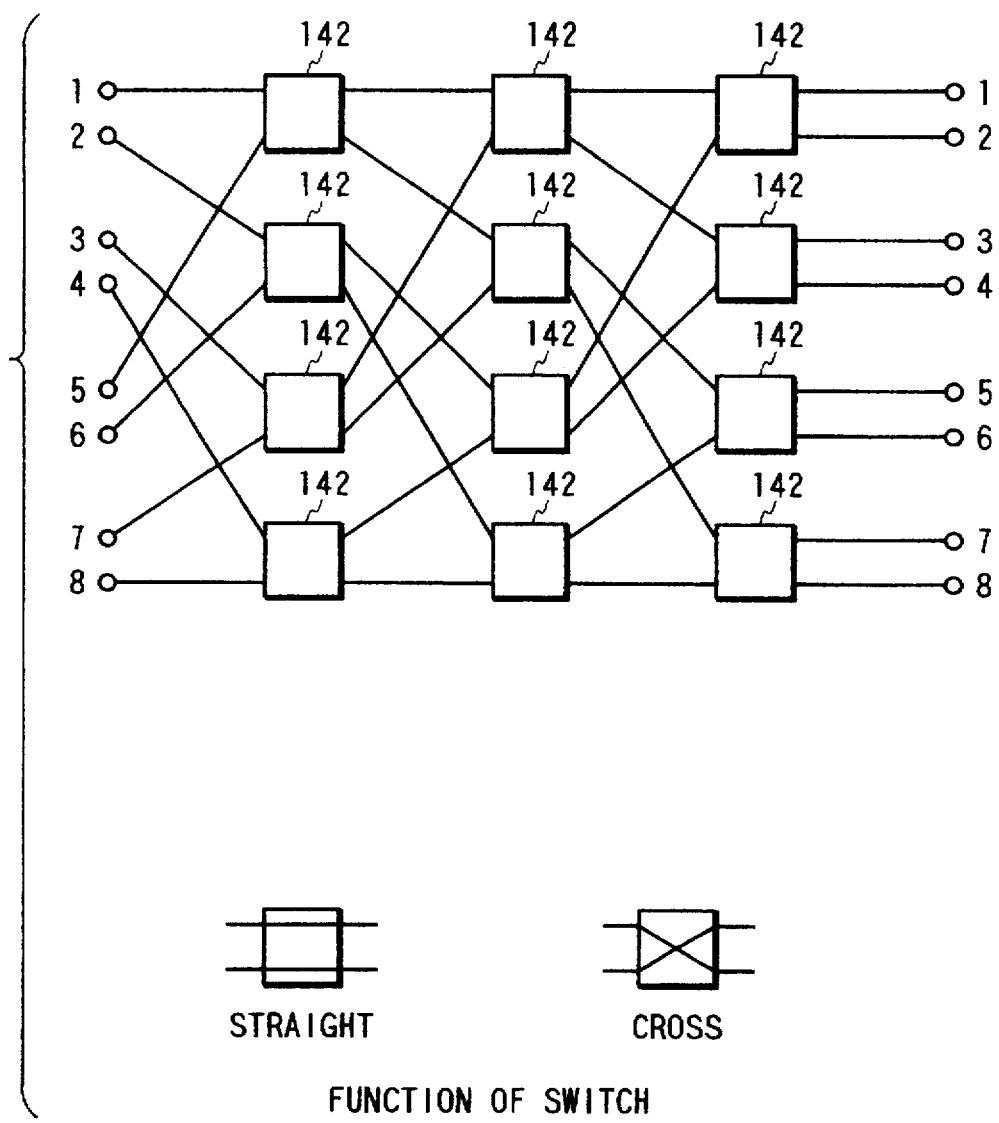
FIG. 16 is a block diagram showing another arrangement of 8×8 electrical switches in the first system.
Figure 17:
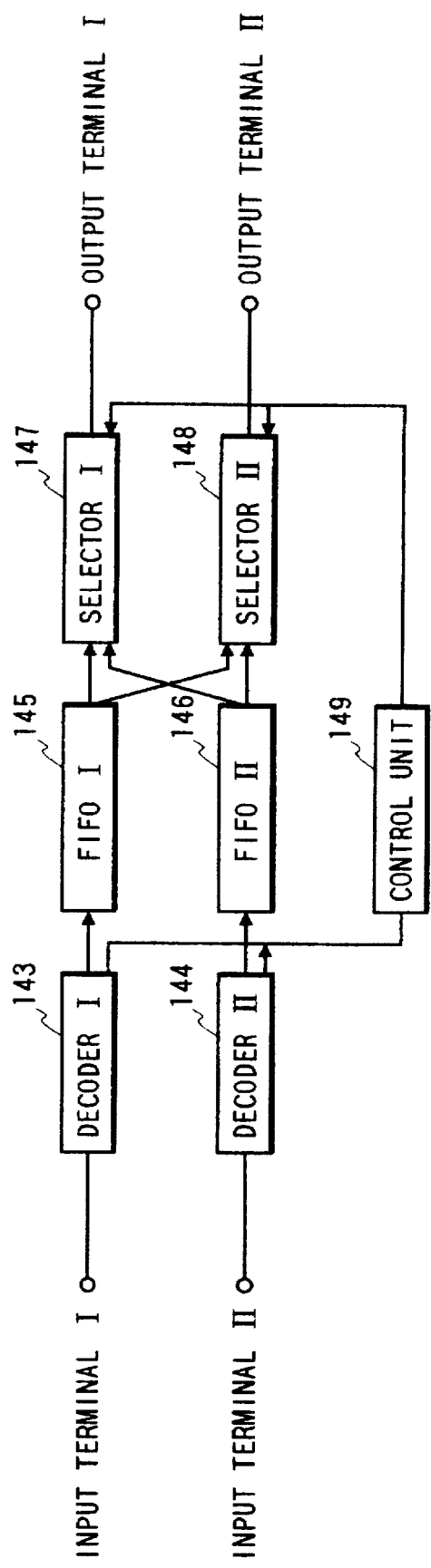
FIG. 17 is a block diagram showing the arrangement of a 2×2 electrical switch in the first system.
Figure 18:
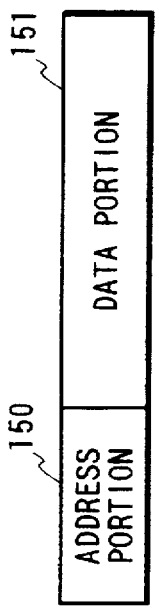
FIG. 18 is a view showing the format of a packet.
Figure 19:
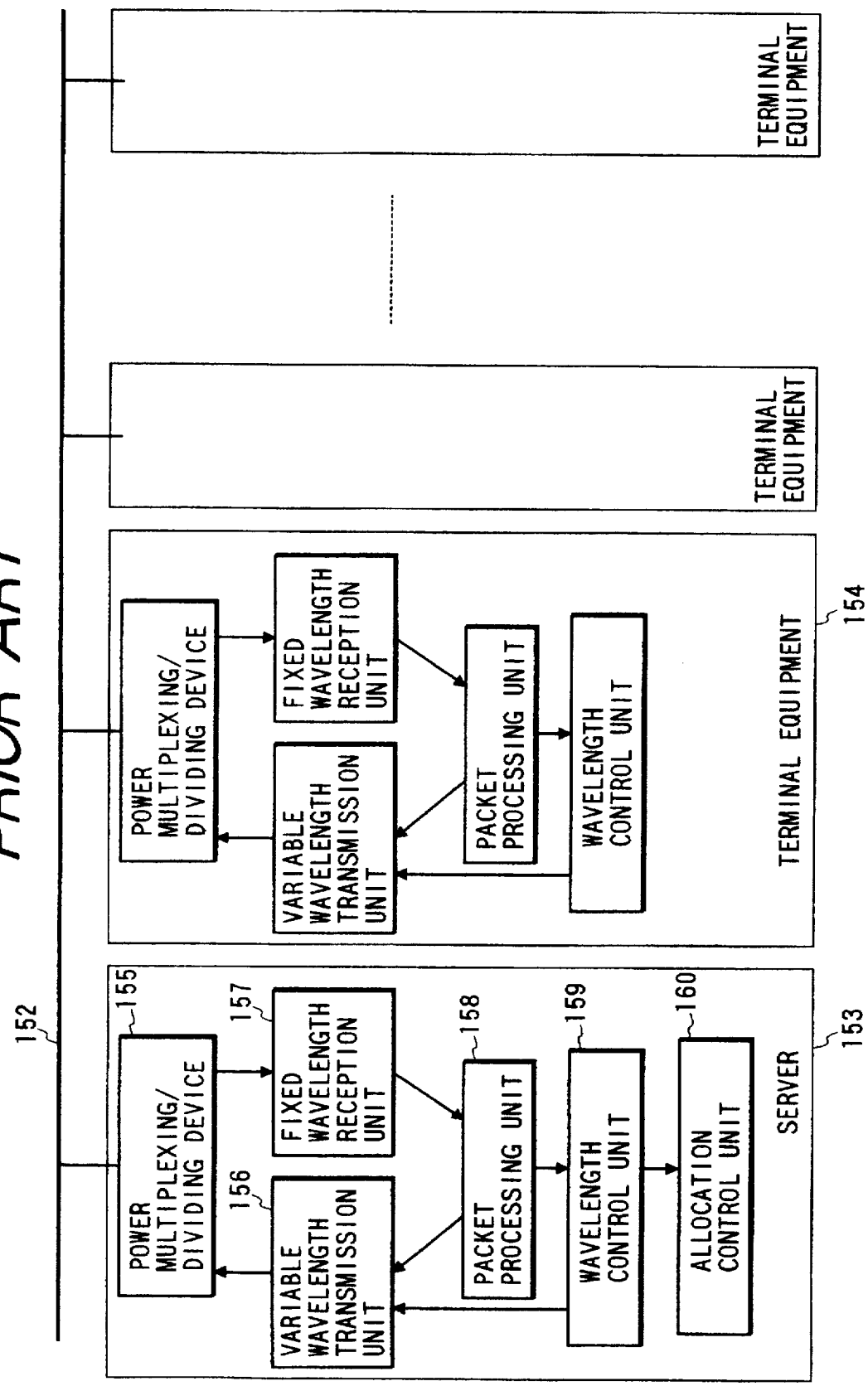
FIG. 19 is a block diagram showing the arrangement of the second system.
Figure 21:
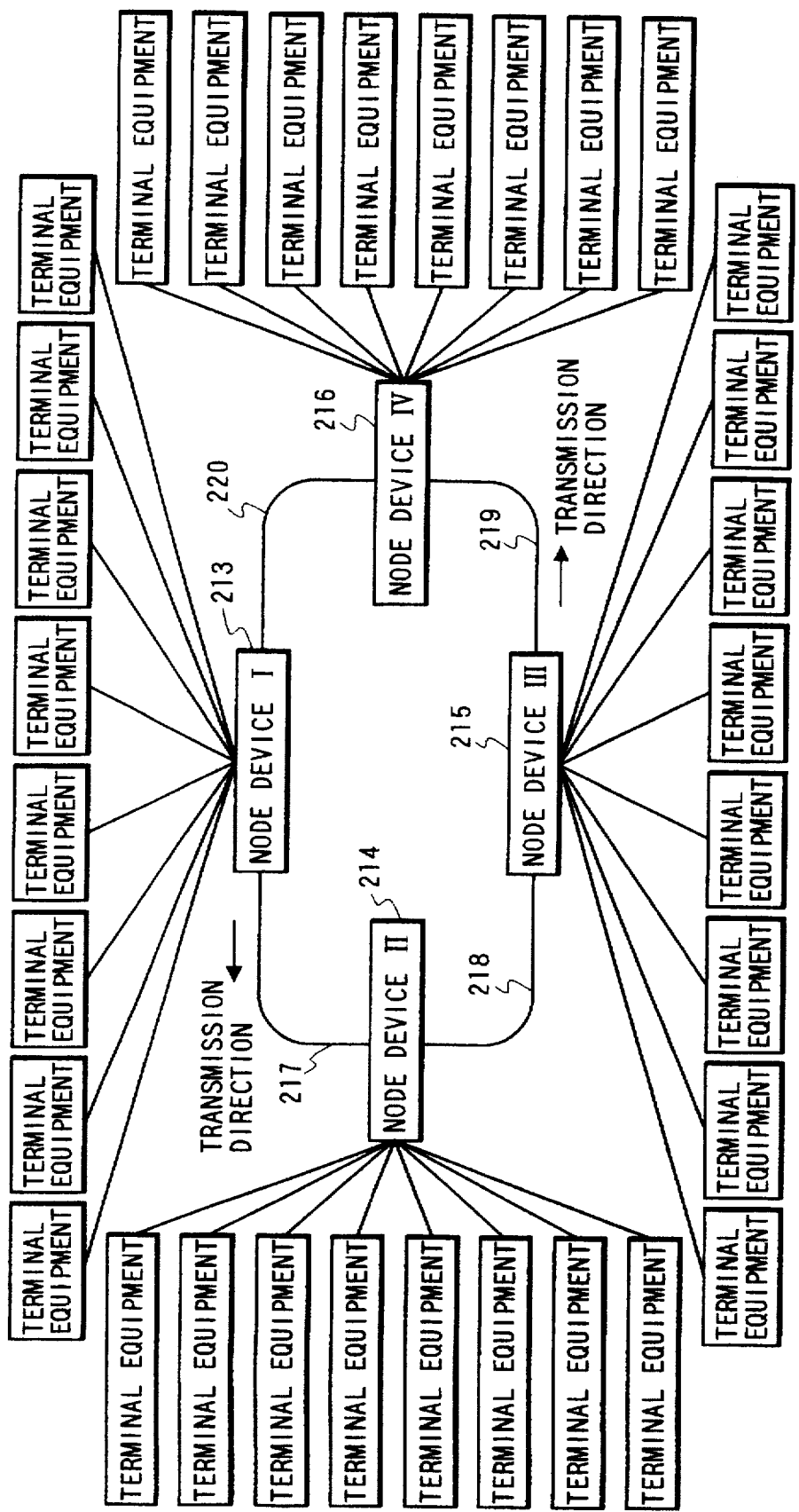
FIG. 21 is a block diagram showing the arrangement of a network system according to the other proposal of the present inventors.

FIGS. 13A and 13B show the third embodiment of the present invention, in which an optical signal of a desired wavelength is looped back using an optical wavelength demultiplexing means. In FIGS. 13A and 13B, the same reference numerals denote the same blocks as in FIGS. 1A and 1B. A wavelength demultiplexer 117 serves as a first optical wavelength demultiplexing means. The wavelength demultiplexer 117 demultiplexes an optical signal of the wavelength λ8 as the reception wavelength of a third fixed wavelength reception unit from the optical signals input from the optical fiber 4 via the input/output unit 6, outputs the demultiplexed optical signal to a wavelength multiplexer 119, and outputs other optical signals to four fixed wavelength reception units. A wavelength demultiplexer 118 serves as a second optical wavelength demultiplexing means. The wavelength demultiplexer 118 demultiplexes an optical signal of the wavelength λ7 as the reception wavelength of a fourth fixed wavelength reception unit from the optical signals input from the optical fiber 5 via the input/output unit 7, outputs the demultiplexed optical signal to a wavelength multiplexer 120, and outputs other optical signals to four fixed wavelength reception units.

The wavelength multiplexers 119 and 120 respectively multiplex the optical signals output from the four variable wavelength transmission units and the optical signals output from the wavelength demultiplexers 117 and 118, and output the multiplexed signals to the input/output units 6 and 7.

A fixed wavelength reception unit IX 121 serves as a fourth fixed wavelength reception unit, and receives a packet signal transmitted at the wavelength λ7. A fixed wavelength reception unit X 124 serves as a third fixed wavelength reception unit, and receives a packet signal transmitted at the wavelength λ8. Buffers IX 122 and X 125 have the same internal arrangement as that shown in FIG. 6 above. A variable wavelength transmission unit IX 123 serves as a fourth variable wavelength transmission unit. The variable wavelength transmission unit IX 123 converts a packet into an optical signal of a predetermined one of the wavelengths λ1, λ2, λ3, and λ8 as the reception wavelengths of the first fixed wavelength reception units I, II, and III, and the third fixed wavelength reception unit X under the control of the wavelength control unit 3, and delivers the converted signal.

The internal arrangement of the unit 123 is the same as that shown in FIG. 10. A variable wavelength transmission unit X 126 serves as a third variable wavelength transmission unit. The variable wavelength transmission unit X 126 converts a packet into an optical signal of a predetermined one of the wavelengths $\lambda 4$, $\lambda 5$, $\lambda 6$, and $\lambda 7$ as the reception wavelengths of the second and fourth fixed wavelength reception units IV, V, VI, and IX under the control of the wavelength control unit 3, and transmits the converted signal. The internal arrangement of the unit 126 is the same as that shown in FIG. 10.

In the third embodiment, optical signals of the wavelengths $\lambda 1$, $\lambda 2$, $\lambda 3$, and $\lambda 8$, which are transmitted from the variable wavelength transmission units I, II, III, and IX so as to propagate in the first transmission direction, are input from the input/output unit 6 of the node device at the downstream side in the transmission direction, and only the optical signal of the wavelength $\lambda 8$ is demultiplexed by the wavelength demultiplexer 117 and is input to the wavelength multiplexer 119. The optical signal of the wavelength $\lambda 8$ is transmitted onto the optical fiber via the input/output unit 6, and is received by the fixed wavelength reception unit X via the input/output unit 7 and the wavelength demultiplexer 118 of the own node device. The optical signal of the wavelength $\lambda 8$ is then looped back and transmitted from the variable wavelength transmission unit X as an optical signal that propagates in the second direction. The signals other than the optical signal of the wavelength $\lambda 8$ are input from the input/output unit 6 of the node device at the downstream side in the transmission direction, are demultiplexed by the wavelength demultiplexer 117, and are received by corresponding ones of the fixed wavelength reception units I, II, and III. If the wavelength demultiplexer 117 can demultiplex not only the wavelength $\lambda 8$ but also other wavelengths $\lambda 1$, $\lambda 2$, and $\lambda 3$ from other signals, filter means for wavelength selection can be omitted from the fixed wavelength reception units I, II, and III as in the fixed wavelength reception unit X.

Similarly, optical signals of the wavelengths $\lambda 4$, $\lambda 5$, $\lambda 6$, and $\lambda 7$, which are transmitted from the variable wavelength transmission units IV, V, VI, and X so as to travel in the second direction, are input from the input/output unit 7 of the node device at the downstream side in the transmission direction, and only the optical signal of the wavelength $\lambda 7$ is demultiplexed by the wavelength demultiplexer 118 and is output to the wavelength multiplexer 120. The optical signal of the wavelength $\lambda 7$ is transmitted onto the optical fiber via the input/output unit 7, and is received by the fixed wavelength reception unit IX via the input/output unit 6 and the demultiplexer 117 of the own node device. The received optical signal is looped back and transmitted from the variable wavelength transmission unit IX as an optical signal that propagates in the first direction. The signals other than the optical signal of the wavelength $\lambda 7$ are input from the input/output unit 7 of the node device at the downstream side in the transmission direction, are demultiplexed by the wavelength demultiplexer 118, and are received by corresponding ones of the fixed wavelength reception units IV, V, and VI. The same modification as for the above-mentioned wavelength demultiplexer 117 applies to the wavelength demultiplexer 118.

In the third embodiment, upon transmission of the same packet A as in operation example 1) in the first embodiment, after the packet A is transmitted from the node device I 54 in the first direction, the packet A is received by the fixed wavelength reception unit X of the node device I 54 without being received by the node device II 55, thus reducing the number of times of relaying the packet by one.

In the third embodiment, upon transmission of the same packet A in operation example 2) in the second embodiment, the packet A is transmitted from the node device I 54 in the first direction, is received by the node device II 55, and is then transmitted in the first direction. The packet A is received by the fixed wavelength reception unit X of the node device II 55 without being received by the node device III 56. Thereafter, the packet A is transmitted from the variable wavelength transmission unit X at a predetermined wavelength, and is received by the node device I 54. FIG. 24 shows the principle of the loopback communications in this embodiment. Referring to FIG. 24, numeral 1 and the like indicate the first one and the like.

(Fourth Embodiment)

Figure 22B:
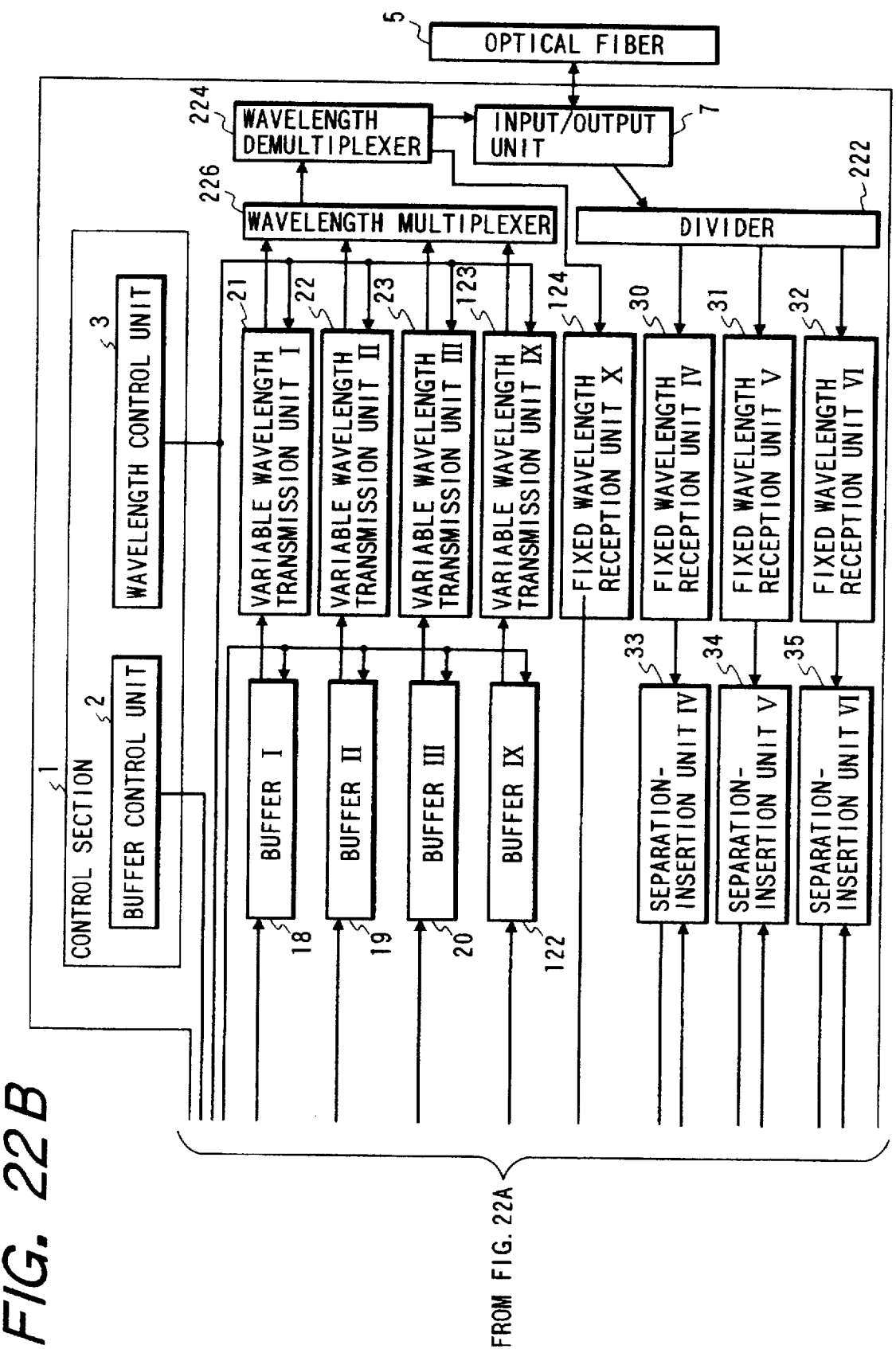
FIG. 22 is comprised of FIGS. 22A and 22B showing block diagrams illustrating the arrangement of a node device according to the fourth embodiment of the present invention.

In the third embodiment, optical signals of the wavelengths $\lambda 8$ and $\lambda 7$ output from the variable wavelength transmission units of a given node device are output from a neighboring node device in the opposite directions. However, this operation can be performed in the own node device. FIGS. 22A and 22B show the arrangement of the node device of this embodiment.

In this arrangement, an optical signal of the wavelength $\lambda 8$ output from the variable wavelength transmission unit I 21, II 22, III 23, or IX 123 is demultiplexed by a wavelength demultiplexer 224, and is directly input to the fixed wavelength reception unit X 124. Also, an optical signal of the wavelength $\lambda 7$ output from the variable wavelength transmission unit IV, V, VI, or X is demultiplexed by a wavelength demultiplexer 223, and is directly input to the fixed wavelength reception unit XI 121. According to this arrangement, the optical signals of the wavelengths $\lambda 7$ and $\lambda 8$ are never output onto the transmission path. Thus, in the above embodiments and in this embodiment, requirements for the transmission characteristics of the optical fibers used as the transmission paths can be relaxed, and for example, optical fibers that cause larger dispersion may be used. Unlike in the above embodiments, if different transmission paths are used in units of channels (wavelengths and the like) in place of the multiplex transmission path in which a plurality of channels (wavelengths) are multiplexed unlike in the above embodiments, the number of transmission paths can be reduced. FIG. 25 shows the principle of the loopback communications in this arrangement. Referring to FIG. 25, numeral 1 and the like indicate the first one and the like.

(Fifth Embodiment)

Figure 26B:
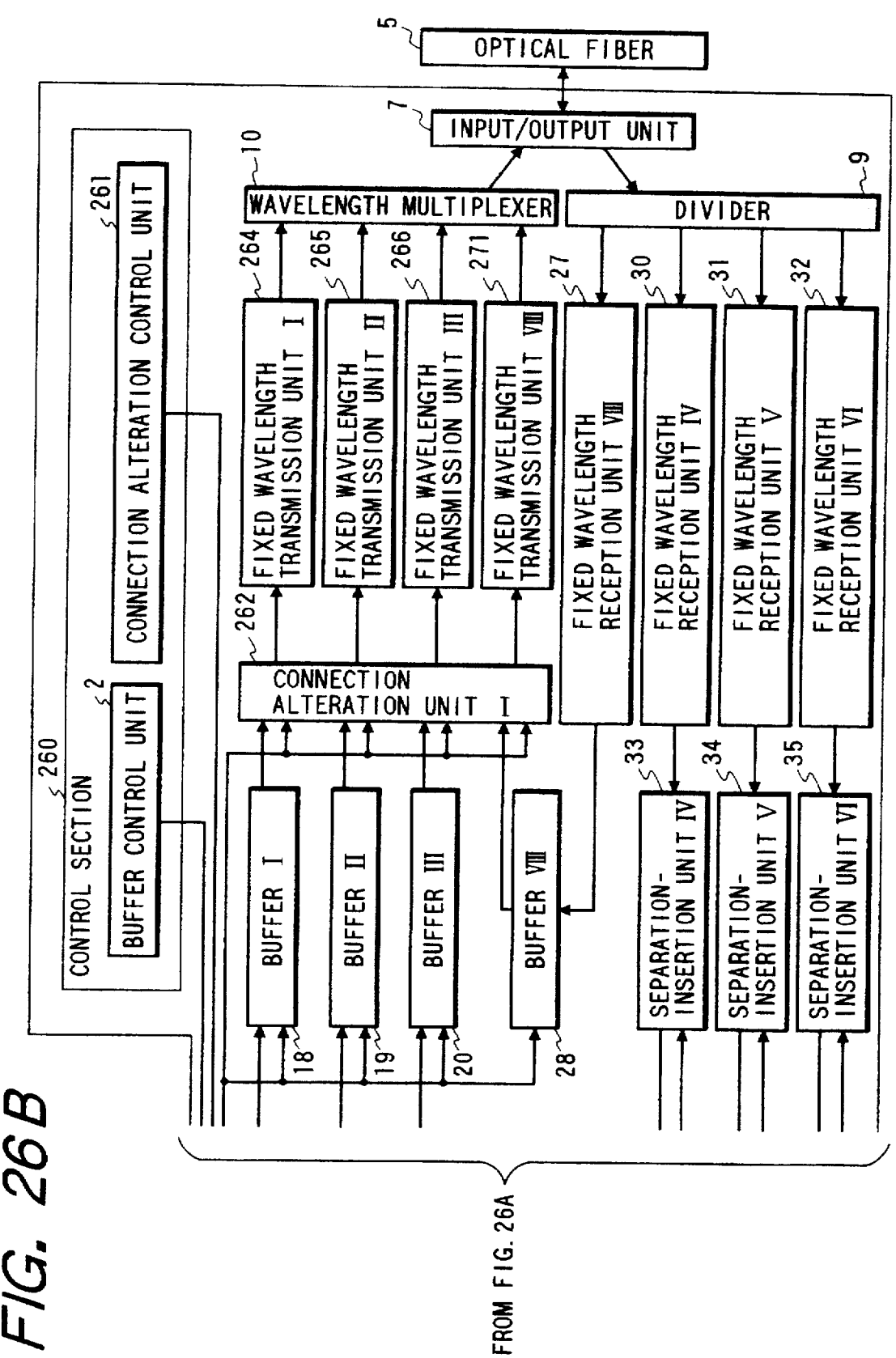
FIG. 26 is comprised of FIGS. 26A and 26B showing block diagrams illustrating the arrangement of a node device according to the fifth embodiment of the present invention.

As one characteristic feature of the present invention, channels connected to the respective buffers are switched as needed. In the above embodiments, variable channel transmitting means that can vary transmission channels are arranged as output means for switching the connected channels in correspondence with the buffers, and the channels to which the buffers are connected are switched by switching the transmission channels of the transmitting means. In contrast to this, in the following embodiments, a node device shown in FIGS. 26A and 26B is used. In FIGS. 26A and 26B, the same reference numerals denote the same parts as in FIGS. 1A and 1B. Differences from the node device shown in FIGS. 1A and 1B are that wavelengths output from fixed wavelength transmission units I 264 to VIII 271 are not variable, connection alteration units I 262 and II 263 for altering the connection relationships between the buffers and the transmission units are arranged, and a connection alteration control unit 261 for controlling the connection alteration units I 262 and II 263 is arranged in place of the wavelength control unit. In this embodiment, predetermined wavelengths are assigned to the fixed wavelength transmission units without changing their wavelengths, and the fixed wavelength transmission units to which the buffer can output data are altered in accordance with a predetermined pattern. The arrangement of the network in this embodiment is the same as that shown in FIG. 2.

The connection alteration units I 262 and II 263 serve as connection alteration means. Input terminals I to IV of the connection alteration unit I 262 are respectively connected to buffers I to III and VIII, and input terminals I to IV of the connection alteration unit II 263 are respectively connected to buffers IV to VII. Output terminals I to VIII of the connection alteration units I 262 and II 263 are respectively connected to fixed wavelength transmission units I 264 to VIII 271.

The fixed wavelength transmission units I 264 to VIII 271 serve as transmitting means using semiconductor lasers. The fixed wavelength transmission units I 264 to VIII 271 respectively convert packets output from the connection alteration units I and II into optical signals of predetermined wavelengths, and output the converted signals onto optical fibers as physical media of the optical wavelength multiplex transmission paths via corresponding wavelength multiplexers. As the semiconductor laser, a DFB (Distributed Feed Back) laser having a multi-electrode structure is used. In this embodiment as well, since eight channels are multiplexed by the optical wavelength multiplex method, transmission wavelengths λ1 to λ8 are respectively assigned to the fixed wavelength transmission units I to VIII by controlling the injection current amounts of the electrodes of the DFB lasers.

Figure 27:
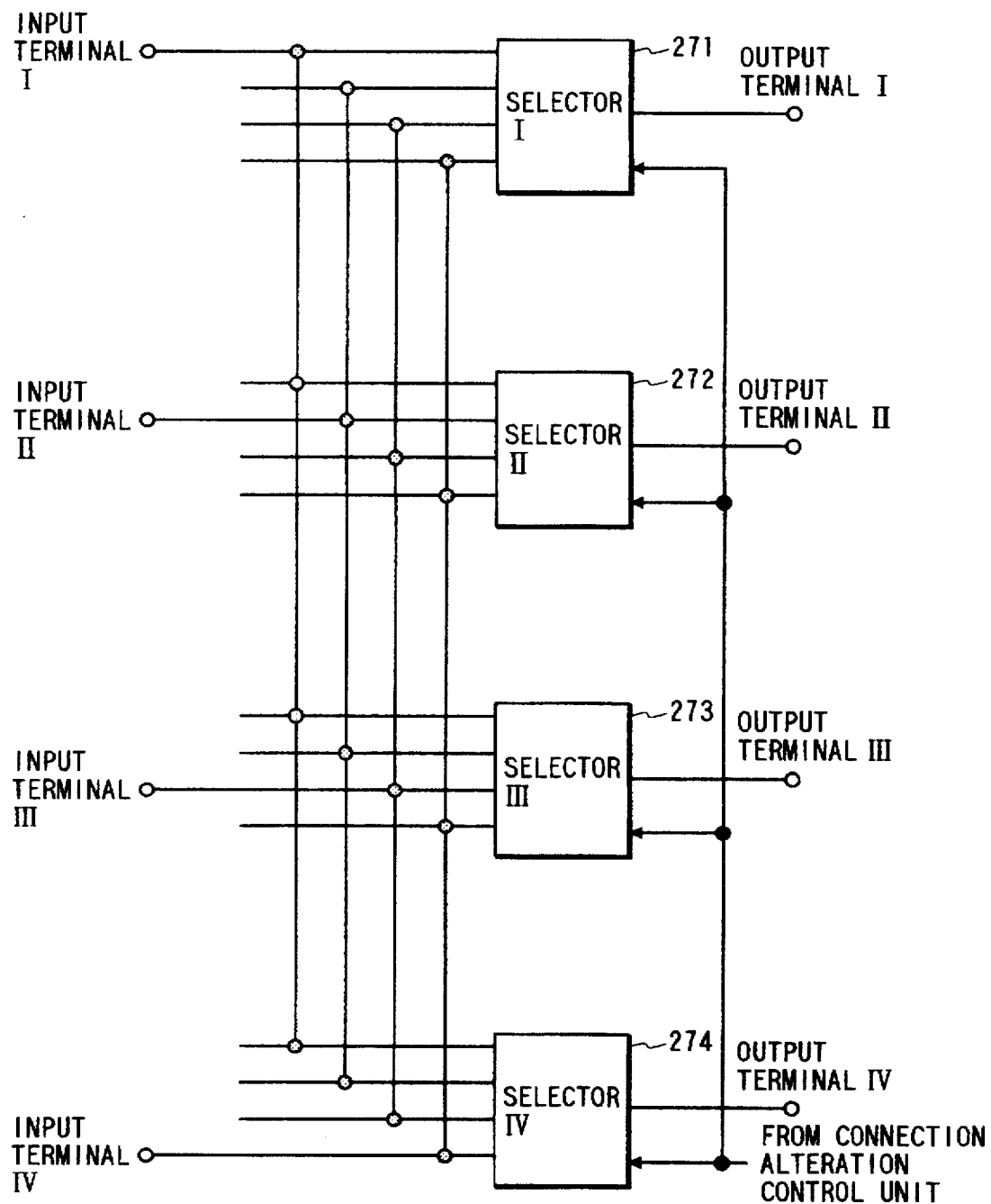
FIG. 27 is a block diagram showing the arrangement of a connection alteration unit according to the fifth embodiment of the present invention.

FIG. 27 shows the internal arrangement of each of the connection alteration units I and II used in this embodiment. Each of the connection alteration units I and II has four input terminals and four output terminals. Referring to FIG. 27, selectors I 271 to IV 274 receive four packet signals from the input terminals I to IV, and output packet signals input from the predetermined input terminals to the output terminals on the basis of a selection signal (to be described later) output from the connection alteration control unit. Thus, the connection relationship between the input and output terminals is set.

Figure 28:
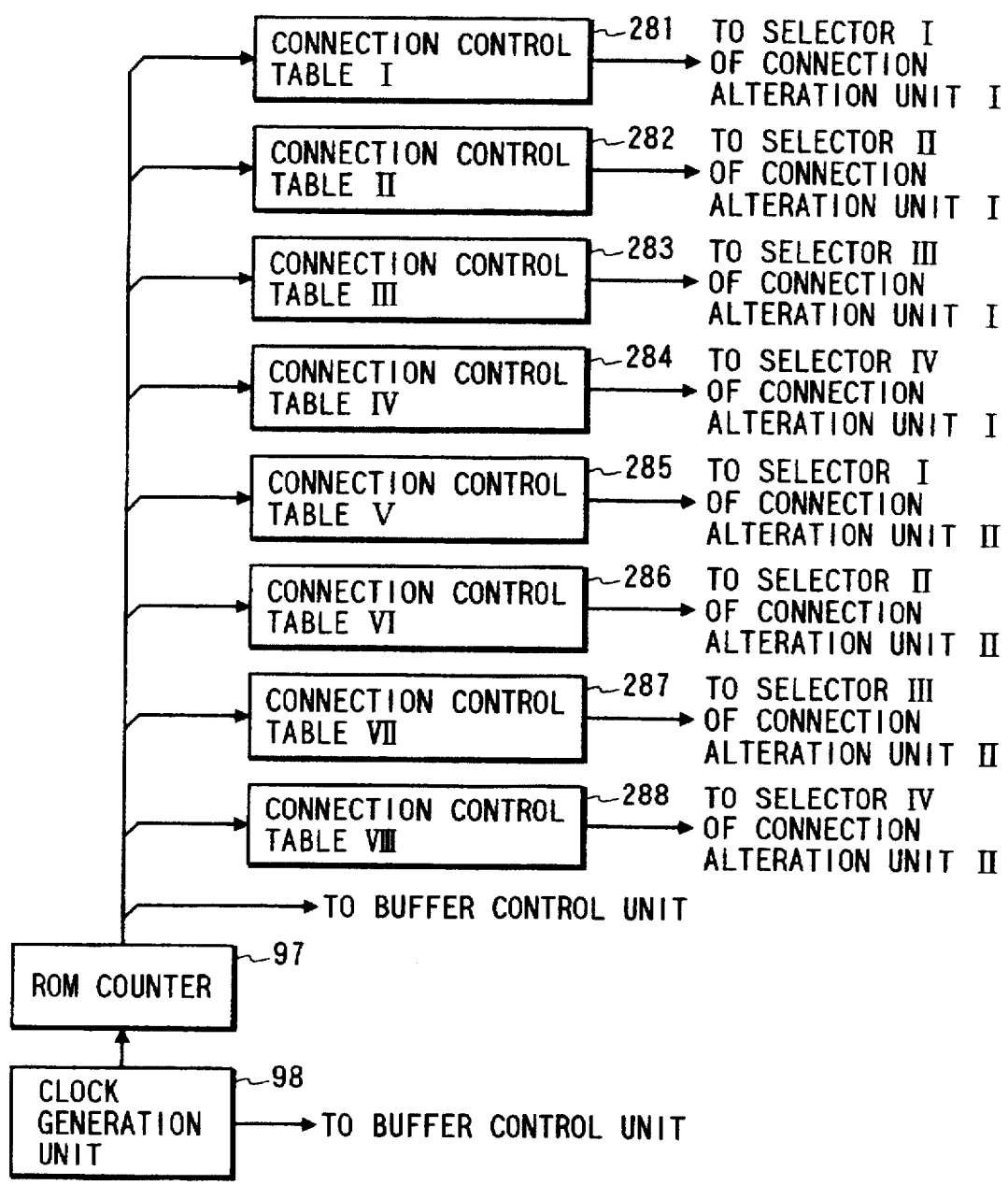
FIG. 28 is a block diagram showing the arrangement of a connection control unit according to the fifth embodiment of the present invention.

FIG. 28 shows the internal arrangement of the connection alteration control unit used in the fifth embodiment of the present invention. Referring to FIG. 28, connection control tables I 281 to VIII 288 are sequentially read out based on the address value output from the ROM counter 97 and output predetermined selection signals to the selectors of the connection alteration units. These tables are constituted by read-only memories (ROMs). The contents of the connection control tables will be described later.

In the fifth embodiment, the contents of the connection control tables I to VIII are set as shown in Table 4 below.

Table 4 shows the input terminals to be selected by the selectors I to IV of each of the connection alteration units I and II. Since the selectors I to IV are connected to the output terminals I to IV, the connection relationship between the input and output terminals is determined by the contents of Table 4. On the other hand, the contents of Table 4 are set so that more than one input terminals are not simultaneously connected to an identical output terminal. Table 4 shows the relationship between the input and output terminals set by the connection control tables I to VIII in units of output address values of the ROM counter.

Although the arrangement of the buffer control unit of this embodiment is the same as that shown in FIG. 8, the offset values of the above-mentioned buffer control tables I to VIII are set as shown in Table 5 below. These 16 tables are cyclically and synchronously read out by the ROM counter. Therefore, the connection relationship between the input and output terminals forms a cyclic pattern that cyclically sets the output terminals to which the input terminals are connected.

TABLE 4

| Table Name | | Address | | | |
|---|---|---|---|---|---|
| | | 0 | 1 | 2 | 3 |
| Connection Alteration Unit I | Connection Control Table I | I | II | III | IV |
| | Connection Control Table II | II | III | IV | I |
| | Connection Control Table III | IV | I | II | III |
| | Connection Control Table VIII | III | IV | I | II |
| Connection Alteration Unit II | Connection Control Table IV | I | II | III | IV |
| | Connection Control Table V | II | III | IV | I |
| | Connection Control Table VI | IV | I | II | III |
| | Connection Control Table VII | III | IV | I | II |

TABLE 5

| Table Name | Address | | | |
|---|---|---|---|---|
| | 0 | 1 | 2 | 3 |
| Buffer Control Table I | A1 | A3 | A4 | A2 |
| Buffer Control Table II | A2 | A1 | A3 | A4 |
| Buffer Control Table III | A4 | A2 | A1 | A3 |
| Buffer Control Table VIII | A3 | A4 | A2 | A1 |
| Buffer Control Table IV | A1 | A3 | A4 | A2 |
| Buffer Control Table V | A2 | A1 | A3 | A4 |
| Buffer Control Table VI | A4 | A2 | A1 | A3 |
| Buffer Control Table VII | A3 | A4 | A2 | A1 |

In Tables 4 and 5 above, when the connection destination of each input terminal is the output terminal I, the contents of the memory region I in units of channels of each buffer are read out. Likewise, when the connection destinations of the input terminal are the output terminals II, III, and IV, the contents of the memory regions II, II, and IV in units of channels of each buffer are read out. Therefore, when the connection control tables are set as shown in Table 4 above, and the buffer control tables are set as shown in Table 5 above, the reading operations of packets stored in the respective buffers are controlled to be performed in synchronism with connections to the output terminals corresponding to the fixed wavelength transmission units connected to the separation-insertion units to which the destination terminal equipments are connected in a neighboring node device.

Figure 29:
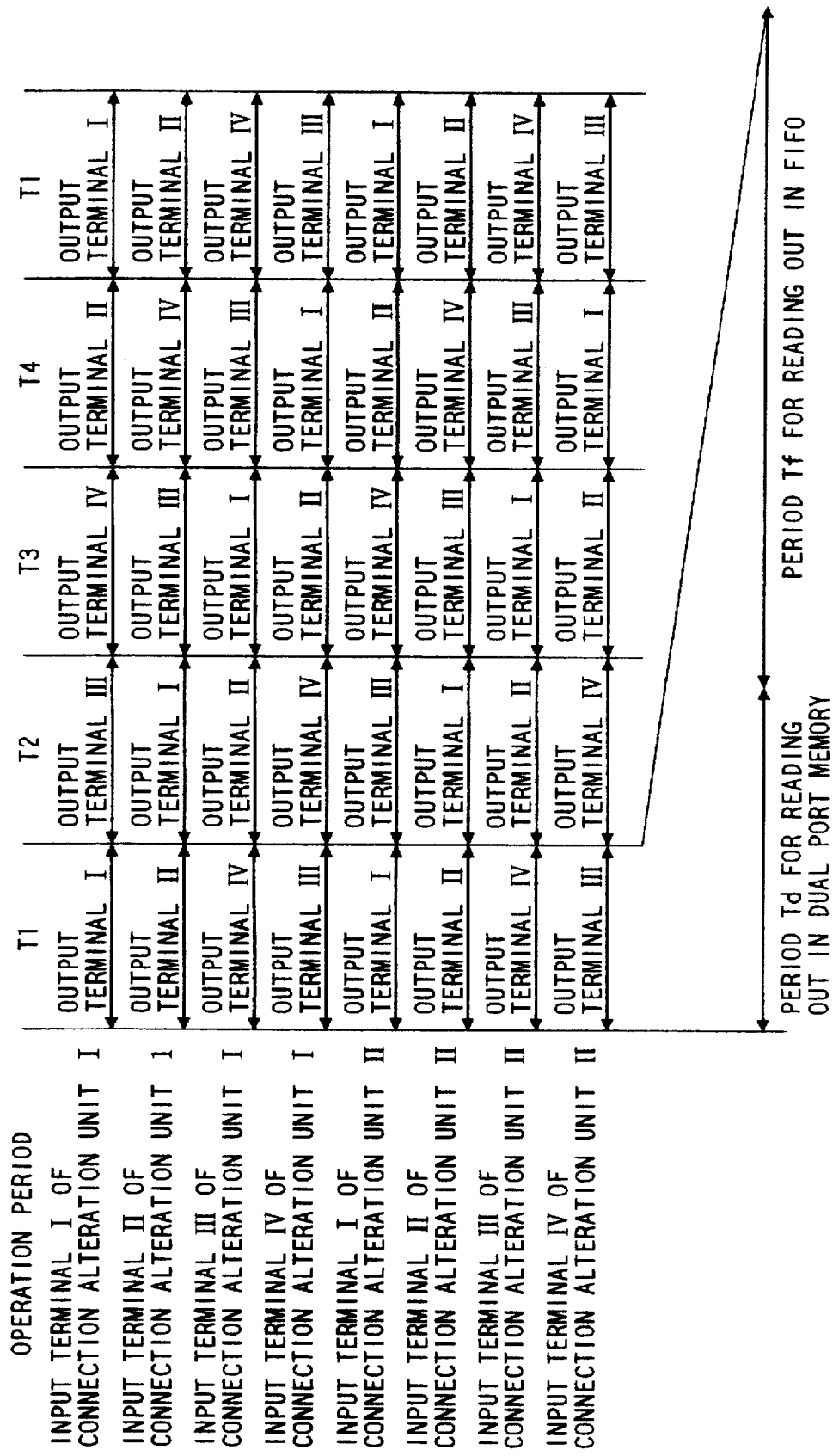
FIG. 29 is a timing chart of the fifth embodiment.

As shown in FIG. 29, the operation of the node device of this embodiment is constituted by four consecutive operation periods T1, T2, T3, and T4 by cyclically reading out four out of the above-mentioned 16 table values. Furthermore, each of these four operation periods is divided into a period Td for reading out the dual port memory and a period Tf for reading out the FIFO in correspondence with the operations of each buffer. The periods Td and Tf are preferably controlled as in the above embodiments.

The following operation examples of the fifth embodiment of the present invention will be described below with reference to FIGS. 26A to 28 and the timing chart in FIG. 29:

Operation Example 3) transmission of a packet whose source is the terminal equipment I 48 connected to the sub transmission path I 42 of the node device I 54, and whose destination is the terminal equipment V 52 connected to the sub transmission path V 46 of the node device IV 57; and Operation Example 4) transmission of a packet whose source is the terminal equipment I 48 connected to the sub transmission path I 42 of the node device I 54, and whose destination is the terminal equipment III 50 connected to the sub transmission path III 44 of the same first communication means of the same node device I 54.

In the following description, this packet will be called a packet B. Also, in the following description, identical constituting elements of different node devices will be denoted by the same reference numerals shown in FIGS. 26A to 28, for the sake of simplicity.

The operation of the node device in this embodiment is constituted by four consecutive operation periods T1, T2, T3, and T4, as shown in FIG. 29. Furthermore, each of these four consecutive operation periods T1, T2, T3, and T4 is divided into a period Td for reading out the dual port memory 77 and a period Tf for reading out the FIFO III 78 in correspondence with the operations of each buffer.

The terminal equipment I 48 as the source connected to the sub transmission path I 42 of the node device I 54 forms the packet B in the format shown in FIG. 3 by adding, as an address portion 62, the address of the terminal equipment V 52 as the destination connected to the sub transmission path V 46 of the node device IV 57, to data to be transmitted to the terminal equipment V 52 connected to the sub transmission path V 46 of the no de device IV 57. The terminal equipment I 48 then transmits the packet B to the separation-insertion unit I 15 of the node device I 54 via the sub transmission path I 52. The I/F unit 68 of the separation-insertion unit I 15 of the node device I 54 sequentially writes the packet B transmitted via the sub transmission path I 42 in the FIFO I 69. Upon completion of the writing operation of the packet B in the FIFO I 69, the insertion control unit 71 detects the division of a packet flow which is being read out from the FIFO II 70, switches the FIFO output to be output from the selector I 72 to the output from the FIFO I 69, stops the reading operation of the FIFO II 70, and starts the reading operation of the FIFO I 69. Upon completion of the reading operation of the packet B written in the FIFO I 69, the insertion control unit 71 switches the FIFO output to be output from the selector I 72 to the output from the FIFO II 70 again, stops the reading operation of the FIFO I 69, and restarts the reading operation of the FIFO II 70. The packet B output from the selector I 72 is input to the buffer I 18.

The decoder II 73 of the buffer I 18 reads the address portion 62 of the input packet B. The buffer I 18 belongs to the first communication means, and the destination of the packet B is the sub transmission path V 46 connected to the second communication means of the node device IV 57. For this reason, the decoder II 73 determines that condition (1) above is satisfied, sets the dual port memory 77 as the output destination of the demultiplexer II 76, and instructs the writing start address A4 to the writing address counter 74. The writing address counter 74 loads this writing start address, generates writing addresses of the input packet B by sequentially incrementing the counter, and outputs the writing addresses to the dual port memory 77. Since the input port of the dual port memory 77 receives the packet B via the demultiplexer II 76, the packet B is sequentially written in the memory region IV in accordance with the addresses output from the writing address counter 74.

Assuming that the operation period in which the packet B is written in the dual port memory 77 is T1, the reading operation of the packet B from the dual port memory 77 is controlled to wait until the operation period T3 in which the buffer I and the fixed wavelength transmission unit 271 that transmits the wavelength λ8 to be received by the fixed wavelength reception unit VII 24 of the first loopback communication means of the neighboring node device II 55 are connected by the connection alteration unit I. During the period Td for reading out the dual port memory in the operation period T3, the packet B is read out under the control of the buffer control unit 2.

During the operation period T3, the reading address value 2 is simultaneously output from the ROM counter 97 of the connection alteration control unit 261 to the connection control tables I 281 to VII 288. With this address value, the contents of the connection control tables are read out. As shown in Table 4 above, the contents read out from the connection control table I at that time are a control signal for connecting the input terminal III, and similarly, the contents respectively read out from the connection control tables II, III, and VI are control signals for connecting the input terminals IV, II, and I.

These control signals are respectively input to the selectors I to IV of the connection alteration units I and II to select predetermined input terminals.

At the same time, during the period Td for reading out the dual port memory in the operation period T3, a reading address value "2" output from the ROM counter 97 of the connection alteration control unit 261 is input to the buffer control tables of the buffer control unit 2. With this address value, the contents of the buffer control tables I 80 to VIII 87 are read out. As shown in Table 5 above, the contents read out from the buffer control table I at that time are the offset value A4 corresponding to the memory region IV, and likewise, the contents respectively read out from the buffer control tables II, III, IV, V, VI, VII, and VIII are the offset values A3, A1, A4, A3, A1, A2, and A2 corresponding to the memory regions III, I, IV, III, I, II, and II. These offset values are output to the reading address counters 75 of the buffers I 18 to VIII 28. On the other hand, the reading control unit 88 of the buffer control unit 2 outputs a control signal for setting the dual port memory 77 in the read enable state, a control signal for setting the FIFO III 78 in the read disable state, a control signal for setting the dual port memory 77 as the input source of the selector II 79, and the like on the basis of clock signals output from the connection alteration control unit 261.

Upon reception of these control signals, the reading address counter 75 in the buffer I 18 loads the offset value A4 output from the buffer control table I 80, generates addresses for reading out a packet written in the memory region IV by sequentially incrementing the counter, and outputs the addresses to the dual port memory 77. With these reading addresses, the packet is sequentially read out from the output port of the dual port memory 77, and is output to the fixed wavelength transmission unit VIII. The packet read out at this time is the packet B written in the memory region IV during the operation period T1, and the packet B is transmitted from the fixed wavelength transmission unit VIII. The transmission wavelength is λ8, and the packet B is received by the fixed wavelength reception unit VII 24 of the loopback communication means of the neighboring node device II 55 at the downstream side in the transmission direction.

At the same time, during the period Td for reading out the dual port memory in the operation period T3, the reading address counter 75 of the buffer II 19 loads the offset value A3 output from the buffer control table II 81, and a packet written in the memory region III is read out from the dual port memory 77 as in the buffer I 18. The readout packet is output to the fixed wavelength transmission unit III 266 via the connection alteration unit I. Similarly, packets are respectively read out from the memory region I of the buffer III 20, the memory region IV of the buffer IV 36, the memory region III of the buffer V 37, the memory region I of the buffer VI 38, the memory region II of the buffer VII 25, and the memory region II of the buffer VIII 28, and are output to the fixed wavelength transmission units connected by the connection alteration units I and II. The packets read out at that time are packets addressed to the terminal equipments connected to the sub transmission paths I to III of the neighboring node device II 55 at the downstream side in the transmission direction and the sub transmission paths IV to VI of the node device IV 57, or packets which are looped back by the loopback communication means.

Subsequently, during the period Tf for reading out the FIFO in the operation period T3, the reading control unit 88 of the buffer control unit 2 outputs a control signal for setting the dual port memory in the read disable state, a control signal for setting the FIFO III in the read enable state, a control signal for setting the FIFO III as the input source of the selector II, and the like on the basis of clock signals output from the connection alteration control unit 261. Upon reception of these control signals, a packet stored in the FIFO III in the buffer I 18 is read out, and is output to the fixed wavelength transmission unit VIII 271. In a similar way, packets written in the FIFOs III in the buffers II 19 to VIII 28 are sequentially read out, and are output to predetermined fixed wavelength transmission units via the connection alteration units I and II.

The fixed wavelength transmission units I 264 to III 266, and VIII 271 respectively convert the packets output from the buffers I 18 to III 20, and VIII 28 via the connection alteration unit I into optical signals of the wavelengths λ1, λ2, λ3, and λ8, and output these signals onto the optical fiber 5 (the optical fiber 58 in FIG. 2; the same applies to the following description) via the wavelength multiplexer 10 and the input/output unit 7 so as to be transmitted in the first direction. Although optical signals of the wavelengths λ4, λ5, λ6, and λ7 output from the node device II 55 are transmitted on the optical fiber 5 in the second direction, since these signals have different wavelengths, they do not influence each other. Similarly, the fixed wavelength transmission units IV 267 to VII 270 respectively convert the packets output from the buffers IV 36 to VII 25 via the connection alteration unit II into optical signals of the wavelengths λ7, λ6, λ4, and λ5, and output these signals onto the optical fiber 4 (the optical fiber 61 in FIG. 2; the same applies to the following description) via the wavelength multiplexer 11 and the input/output unit 6 so as to be transmitted in the second direction.

The packet B which has been transmitted from the terminal equipment I 48 connected to the sub transmission path I 42 of the node device I 54 to the terminal equipment V 52 connected to the sub transmission path V 46 of the node device IV 57 is transmitted to the node device II 55 as the optical signal of the wavelength λ8, as described above. The packet B received by the node device II 55 as the optical signal of the wavelength λ8 is subjected to loopback relay transmission processing by the first loopback communication means in the node device II 55.

The optical signals of the wavelengths λ1, λ2, λ3, and λ8 transmitted from the node device I 54 via the optical fiber 58 are output from the input/output unit 6 to the divider 8 of the node device II 55, and are divided by the divider 8. The divided optical signals are respectively input to the fixed wavelength reception units I 12 to III 14, and VII 24. In the fixed wavelength reception unit VII, only the optical signal of the wavelength λ8 passes through the filter 64, and is received by the reception unit 65. The packet B is received by the fixed wavelength reception unit VII 24 since it has been transmitted from the node device I 54 as the optical signal of the wavelength λ8. The packet B received by the fixed wavelength reception unit VII 24 is output to the buffer VII 25.

The decoder II 73 of the buffer VII 25 reads the address portion 62 of the input packet B. Since the destination of this packet B is none of the sub transmission paths connected to the neighboring node device I 54 ((3)-2 above), the decoder II 73 sets the FIFO III 78 as the output destination of the demultiplexer II 76. Thus, the packet B is written in the FIFO III. Assuming that the operation period in which the packet B is written in the FIFO III is T4, the packet B is read out under the control of the buffer control unit 2 during the period Tf for reading out the FIFO III in the neighboring operation period T1.

During the next operation period T1, the ROM counter 97 of the connection alteration control unit 261 simultaneously outputs a reading address value "0" to the connection control tables I to VIII. With this address value, the contents of the connection control tables are read out. Since the contents read out at that time indicate that the output terminal which selects the input terminal IV, to which the buffer VII is connected, is the output terminal III, the packet B is output as the optical signal of the wavelength λ6 from the fixed wavelength transmission unit VII 269 connected to the output terminal of the connection alteration unit II of the node device II 55 onto the optical fiber 58 so as to propagate in the second transmission direction, and is received by the fixed wavelength reception unit VI 32 of the node device I 54.

The packet B received by the fixed wavelength reception unit VI 32 of the node device I 54 is output to the separation-insertion unit VI 35. The decoder I 66 of the separation-insertion unit VI 35 reads the address portion 62 of the input packet B. Since the destination of the packet B is a sub transmission path connected to the neighboring node device IV 57 at the downstream side in the transmission direction, the decoder I 66 sets the FIFO II 70 as the output destination of the demultiplexer I 67. The packet B written in the FIFO II in this manner is read out under the control of the insertion control unit 71, and is output to the buffer VI 38 via the selector I 72.

The decoder II 73 of the buffer VI 38 reads the address portion 62 of the packet B again. Since the destination of the packet B is the terminal equipment V 52 connected to the sub transmission path V 46 connected to the neighboring node device IV 57 at the downstream side in the transmission direction, the decoder II 73 sets the dual port memory 77 as the output destination of the demultiplexer II 76, and at the same time, outputs A2 as the writing start address to the writing address counter 74. The writing address counter 74 loads this writing start address, generates the writing addresses of the input packet B by sequentially incrementing the counter, and outputs the writing addresses to the dual port memory 77. The packet B is input to the input port of the dual port memory 77 via the demultiplexer II, and is sequentially written in the memory region II in accordance with the addresses output from the address counter 74. The reading operation of the packet B from the dual port memory 77 is controlled to wait until the operation period T2 in which the fixed wavelength transmission unit V 268 and the buffer VI of the node device I 54 are connected by the connection alteration unit II, since the reception wavelength of the fixed wavelength reception unit V 31 that outputs a packet to the separation-insertion unit V, to which the sub transmission path V of the destination is connected, in the neighboring node device IV 57 at the downstream in the transmission direction is λ5. The packet B which is written in the memory region II of the buffer VI 38 is read out during the period Td for reading out the dual port memory in the operation period T2, as in the node device II 55, and is output as an optical signal of the wavelength λ5 from the fixed wavelength transmission unit V 268 onto the optical fiber 61 via the connection alteration unit II so as to travel in the second transmission direction. Then, the packet B is received by the fixed wavelength reception unit V 31 of the node device IV 57.

The packet B received by the fixed wavelength reception unit V 31 of the node device IV 57 is output to the separation-insertion unit V 34. The decoder I 66 of the separation-insertion unit V 34 reads the address portion 62 of the input packet B. Since the destination of the packet B is the sub transmission path V 46 connected to the separation-insertion unit V 34 itself, the decoder I 66 sets the I/F unit 68 as the output destination of the demultiplexer I 67. With this control, the packet B is output to the I/F unit 68 via the demultiplexer I 67, and is transmitted to the sub transmission path V 46. Thereafter, the packet B is received by the terminal equipment V 52 as the destination. After the address portion 62 is removed from the packet B, only the data portion 63 is extracted, and is subjected to desired processing.

As described above, in operation example 3), the packet B, which is transmitted from the terminal equipment I 48 as the source connected to the sub transmission path I 42 of the node device I 54 to the terminal equipment V 52 connected to the sub transmission path V 46 of the node device IV 57, is output from the fixed wavelength transmission unit VIII 271 of the node device I 54 at the wavelength λ8 in the first direction. Thereafter, the packet B is output at the wavelength λ6 in the second transmission direction by the first loopback communication means of the neighboring node II 55 at the downstream side of the node device I 54. In the node device I 54 located at the upstream side, in the transmission direction, of the node device IV 57 as the destination, the packet B is converted into an optical signal of the wavelength λ5 as the reception wavelength of the fixed wavelength reception unit V that outputs a packet to the separation-insertion unit V, to which the sub transmission path V of the destination is connected, in the node device IV 57, and is output in the second transmission direction. Then, the packet B is received by the fixed wavelength reception unit V 31 of the node device IV 57, and is separated by the separation-insertion unit V 34. The separated packet B is transmitted onto the sub transmission path V 46, and is then received by the terminal equipment V 52.

Subsequently, operation example 4) transmission of a packet whose source is the terminal equipment I 48 connected to the sub transmission path I 42 of the node device I 54, and whose destination is the terminal equipment III 50 connected to the sub transmission path III 44 of the same first communication means of the same node device I 54 will be explained below.

In the case of operation example 4), a packet is looped back by two node devices, i.e., the node devices II 55 and IV 57. The operation condition of the decoder II 73 of the buffer I 18 upon transmission of a packet from the node device I 54 is (2)-1 above. However, in this case, since the same operation as in (1) is performed, the operation of the buffer I 18 is the same as that in operation example 3) above. The operation from when the packet transmitted from the node device I 54 is looped back by the node device II 55 until it is received by the fixed wavelength reception unit VI 32 of the node device I 54 is the same as that in operation example 3) above, and a detailed description thereof will be omitted.

The packet B received by the fixed wavelength reception unit VI 32 of the node device I 54 is output to the separation-insertion unit VI 35. The decoder I 66 of the separation-insertion unit VI 35 reads the address portion 62 of the input packet B. Since the destination of this packet B is "(1) the terminal equipment connected to the separation-insertion means that belongs to the communication means different from that, to which the own buffer belongs, of the first or second communication means", the decoder II 73 sets the dual port memory 77 as the output destination of the demultiplexer II 76, and instructs the writing address counter 74 of the writing start address A4. With this control, the packet B is written in the memory region IV.

The packet B written in the memory region IV is read out during the period Td for reading out the dual port memory in the operation period T1, in which the fixed wavelength transmission unit VII 270 and the buffer VI of the node device I 54 are connected via the connection alteration unit II, since the reception wavelength of the fixed wavelength reception unit VIII 27 of the loopback communication means of the neighboring node device IV 57 is λ7. The readout packet B is output as an optical signal of the wavelength λ7 from the fixed wavelength transmission unit VII 270 onto the optical fiber 61 so as to propagate in the second transmission direction, and is then received by the fixed wavelength reception unit VIII 27 of the node device IV 57.

The packet B received by the node device IV 57 as the optical signal of the wavelength λ7 is subjected to loopback relay transmission processing by the second loopback communication means in the node device IV 57. The packet B received by the fixed wavelength reception unit VIII 27 of the node device IV 57 is written in the memory region III of the dual port memory 77 of the buffer VIII 28 since its destination is the terminal equipment III 50 connected to the sub transmission path III 44 of the first communication means of the neighboring node device I 54 at the downstream side in the transmission direction opposite to the transmission direction of the wavelength received by the fixed wavelength reception unit VIII 27. The packet B written in the dual port memory 77 is read out during the period Td for reading out the dual port memory in the operation period T1, and is output as an optical signal of the wavelength λ3 from the fixed wavelength transmission unit III 266 onto the optical fiber 61 so as to propagate in the first transmission direction. Then, the packet B is received by the fixed wavelength reception unit III 14 of the node device I 54.

The packet B received by the fixed wavelength reception unit III 14 of the node device I 54 is separated by the separation-insertion unit III 17, and is output to the I/F unit 68 via the demultiplexer I 67. The packet B is transmitted onto the sub transmission path III 44, and is then received by the terminal equipment III 50 as the destination. After the address portion 62 is removed from the packet B, only the data portion 63 is extracted, and is subjected to desired processing.

As described above, in operation example 4), the packet B which is transmitted from the terminal equipment I 48 as the source connected to the sub transmission path I 42 of the node device I 54 toward the terminal equipment III 50 connected to the sub transmission path III 44 of the same first communication means of the same node device I 54 is looped back by two node devices, i.e., the node devices II 55 and IV 57, and is then transmitted to the terminal equipment III 50 as the destination.

According to this arrangement, when a predetermined channel is extracted in the own node and is input to the predetermined reception unit, as shown in FIGS. 22A and 22B, the transmission unit that outputs the predetermined channel can be directly connected to the predetermined reception unit, resulting in a simple arrangement.

(Sixth Embodiment)

Figure 30A:
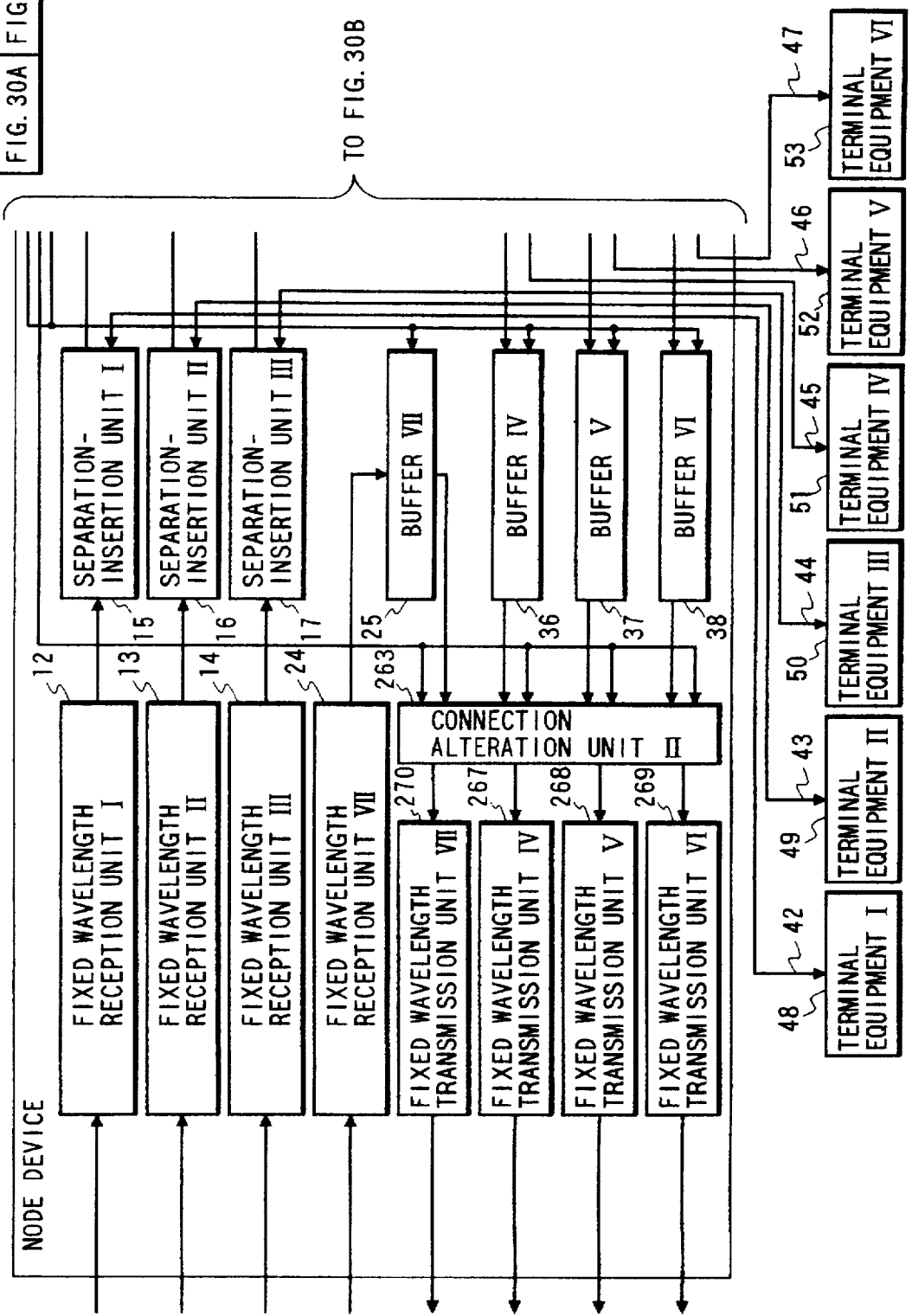
FIG. 30 is comprised of FIGS. 30A and 30B showing block diagrams illustrating the arrangement of a node device according to the sixth embodiment of the present invention.
Figure 30B:
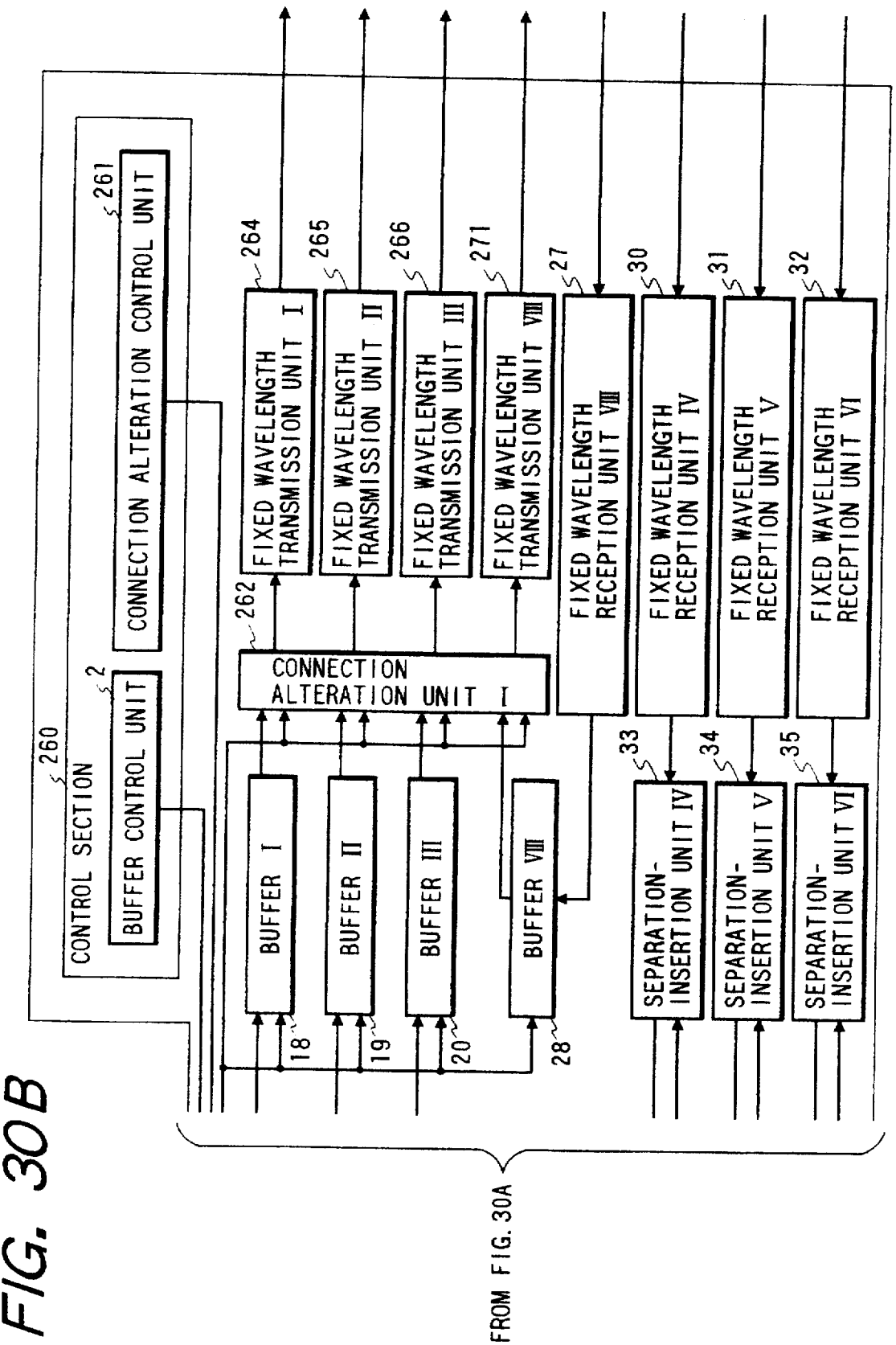

Since each of the first to fourth embodiments uses transmission units that can change their transmission channels, multiplexed channels must be demultiplexed and the demultiplexed channels must be input to individual transmission paths if different transmission paths are used in units of channels. On the other hand, as in the fifth embodiment, when the transmission channels use fixed transmission units, it is easy to use different transmission paths in units of channels. FIGS. 30A and 30B show such arrangement. In this arrangement, fixed wavelength transmission units and fixed wavelength reception units are connected to a plurality of optical fibers serving as independent transmission paths without going through any wavelength multiplexers or dividers. At this time, when these plurality of transmission paths are bundled like a ribbon fiber, the layout is easy.

(Another Embodiment)

In the above embodiments, for example, when a packet output from the first communication means is received by the third fixed wavelength reception unit and is transmitted from the third variable wavelength transmission unit, if the packet does not designate any transmission wavelength (this is the case when the packet is addressed to the sub transmission path of a non-neighboring node device), the packet is input to the FIFO III 78 in the buffer X, and may be output at the wavelength λ7 as the reception wavelength of the fixed wavelength reception unit IX depending on the timing. In order to prevent this, the reading operation from the FIFO III 78 in the buffer X 125 can be inhibited when the transmission wavelength of the variable wavelength transmission unit X is λ7. The same applies to the buffer IX 122 that belongs to the fourth communication means. In the present invention, since the variable wavelength transmission units IX and X of the third and fourth communication means need not output λ8 and λ7, a light source having a narrower variable wavelength width may be used.

On the other hand, when sub transmission paths are connected to the third and fourth communication means via separation-insertion units as in the first and second communication means, the wavelength can be designated and output by utilizing the fact that the respective variable wavelength transmission units can output the wavelengths λ7 and λ8 to be received by the fourth and third fixed wavelength reception units, so as to input the output from the third communication means to the first communication means or to input the output from the fourth communication means to the second communication means.

In each of the above embodiments, one terminal equipment is connected to each sub transmission path. However, the present invention is not limited to this. For example, a plurality of terminal equipments may be connected via a single sub transmission path. In such arrangement, in order to designate one of the plurality of terminal equipments connected to the single sub transmission path as the destination of a packet, a sub address for designating the terminal equipment may be added to the address of the sub transmission path as the destination address of the packet.

In each of the above embodiments, when channels are multiplexed by the wavelength multiplex method, all the channels are set to have different wavelengths. However, channels having different transmission directions may use an identical wavelength. In this case, the wavelength range to be used can be narrowed.

Furthermore, in each of the above embodiments, a multichannel transmission path using the optical wavelength multiplex method has been exemplified. Electrical signals may be used in place of optical signals, and a multi-channel transmission path of frequency multiplex, spatial multiplex, time-division multiplex, code multiplex, or the like may be constituted.

When a plurality of channels are to be transmitted via different transmission paths in the spatial multiplex network, since fixed channel reception units need only directly receive signals from the corresponding transmission paths, the arrangement can be simplified, and the channels need not be distinguished from each other based on their wavelengths or frequencies. In this case, variable channel transmission units can vary transmission paths used for transmission in place of those that can select the wavelengths or frequencies to be transmitted.

As described above, according to the network system, the node device, and the transmission control method of the present invention, the following effects are expected.

The routing control of a packet input from the sub transmission path to the separation-insertion unit can be simplified since it is attained by changing the fixed channel receiving means that will receive the packet by controlling channels to which the buffers are connected, and by controlling the reading/writing operations from/to the buffer means arranged in units of the separation-insertion means. In addition, the need for any switching unit in the node device used in the first conventional network system can be obviated. Therefore, the hardware scale of the node device can be reduced.

Since the arbitration control is attained by setting the transmission channel pattern so that multiple variable channel transmitting means do not simultaneously transmit an identical channel, the need for performing arbitration control by detecting generation of output congestion associated with the transmission wavelengths from all the node devices in units of transmission wavelengths, which is required in the conventional wavelength multiplex network system, can be obviated. For this reason, the arrangement of each node device can be simplified, thus realizing a small hardware scale.

Since the change pattern of transmission channels to which the buffer means are connected is fixed, and the wavelength change amount upon changing the wavelengths can be reduced, the channels can be changed at high speed, thus improving the operation speed of the node device and the throughput of the network system.

Since the loopback communication means is arranged, even when a packet is to be transmitted to a node device at the upstream side in the transmission direction, the transmission direction can be reversed by utilizing the loopback communication means. For this reason, a packet can be transmitted to the node device as the destination with a minimum number of times of relaying transmission.

Also, since the loopback communication means is arranged, even when terminal equipments which respectively serve as the source and the destination are connected to different separation-insertion units of an identical node device, the packet need not be relayed by all the node devices arranged in a ring pattern except for the own node device. For this reason, when the number of node devices arranged in the ring pattern is large (five devices or more), the number of times of relaying transmission can be reduced.

Furthermore, since the optical wavelength demultiplexing means is arranged, the number of times of relaying transmission upon loopback communication can be reduced.

What is claimed is:

1. A network system which connects a plurality of node devices via a transmission path for transmitting a plurality of channels, and transmits packets between the node devices in a first direction and a second direction opposite to the first direction, comprising:

a transmission path; and
  a node device comprising:
    first communication means constituted by first receiving means for receiving a first channel, transmitted in the first direction, of the plurality of channels, and first buffer means for temporarily storing a packet received by said first receiving means;
    second communication means constituted by second receiving means for receiving a second channel, transmitted in the second direction, of the plurality of channels, and second buffer means for temporarily storing a packet received by said second receiving means;
    third communication means constituted by third receiving means for receiving a third channel different from the first and second channels, and third buffer means for temporarily storing a packet received by said third receiving means;
    fourth communication means constituted by fourth receiving means for receiving a fourth channel different from the first, second, and third channels, and fourth buffer means for temporarily storing a packet received by said fourth receiving means;
    first output means for connecting said first and fourth buffer means to different channels of the first and third channels, wherein said first output means can switch the channels to which said first and fourth buffer means are connected;
    second output means for connecting said second and third buffer means to different channels of the second and fourth channels, wherein said second output means can switch the channels to which said second and third buffer means are connected; and
    buffer control means for controlling said first, second, third, and fourth buffer means so that packets to be output by the channels to which said first, second, third, and fourth buffer means are connected are read out from said first, second, third, and fourth buffer means.

2. A system according to claim 1, wherein $n_1$ first channels ($n_1$ is an integer not less than 1), $n_2$ second channels ($n_2$ is an integer not less than 1), $n_3$ third channels ($n_3$ is an integer not less than 1), and $n_4$ fourth channels ($n_4$ is an integer not less than 1) are provided, said node device comprises $n_1$ first communication means equivalent to said first communication means, $n_2$ second communication means equivalent to said second communication means, $n_3$ third communication means equivalent to said third communication means, and $n_4$ fourth communication means equivalent to said fourth communication means, the $n_1$ first receiving means of said $n_1$ first communication means respectively receive different channels of the $n_1$ first channels, the $n_2$ second receiving means of said $n_2$ second communication means respectively receive different channels of the $n_2$ second channels, the $n_3$ third receiving means of said $n_3$ third communication means respectively receive different channels of the $n_3$ third channels, and the $n_4$ fourth receiving means of said $n_4$ fourth communication means respectively receive different channels of the $n_4$ fourth channels, said first output means connect the $n_1$ first buffer means and the $n_4$ fourth buffer means to different channels of the $n_1$ first channels and the $n_3$ third channels, wherein said first output means can switch the channels to which the $n_1$ first buffer means and the $n_4$ fourth buffer means are connected, and said second output means connect the $n_2$ second buffer means and the $n_3$ third buffer means to different channels of the $n_2$ second channels and the $n_4$ fourth channels, wherein said second output means can switch the channels to which the $n_2$ second buffer means and the $n_3$ third buffer means are connected.

3. A system according to claim 2, wherein $n_1$ and $n_2$ are equal to each other, and $n_3$ and $n_4$ are equal to each other.

4. A system according to claim 2, wherein said first output means comprises $n_1+n_4$ variable channel transmitters respectively corresponding to the $n_1$ first buffer means and the $n_4$ fourth buffer means, and said second output means comprises $n_2+n_3$ variable channel transmitters respectively corresponding to the $n_2$ second buffer means and the $n_3$ third buffer means.

5. A system according to claim 2, wherein said first output means comprises $n_1+n_3$ fixed channel transmitters for performing transmission using different channels of the $n_1$ first channels and the $n_3$ third channels, and first connection alteration means which has $n_1+n_4$ input terminals respectively corresponding to the $n_1$ first buffer means and the $n_4$ fourth buffer means and $n_1+n_3$ output terminals respectively corresponding to said $n_1+n_3$ fixed channel transmitters, and can alter a connection relationship between the input and output terminals, and said second output means comprises $n_2+n_4$ fixed channel transmitters for performing transmission using different channels of the $n_2$ first channels and the $n_4$ third channels, and second connection alteration means which has $n_2+n_3$ input terminals respectively corresponding to the $n_2$ first buffer means and the $n_3$ third buffer means and $n_2+n_4$ output terminals respectively corresponding to said $n_2+n_4$ fixed channel transmitters, and can alter a connection relationship between the input and output terminals.

6. A system according to claim 2, wherein said third receiving means receives the third channel transmitted from the output means of another node device at an upstream side in the first direction, and said fourth receiving means receives the fourth channel transmitted from the output means of another node device at an upstream side in the second direction.

7. A system according to claim 6, wherein the $n_1$ first channels, the $n_2$ second channels, the $n_3$ third channels, and the $n_4$ fourth channels are optical channels which are distinguished from each other on the basis of at least either the transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

8. A system according to claim 2, wherein said first output means outputs the third channel in the first direction, and said second output means outputs the fourth channel in the second direction, and said node device further comprises means for extracting the third channel from the channels transmitted in the first direction and outputting the extracted third channel in the second direction, and means for extracting the fourth channel from the channels transmitted in the second direction and outputting the extracted fourth channel in the first direction.

9. A system according to claim 8, wherein the $n_1$ first channels, the $n_2$ second channels, the $n_3$ third channels, and the $n_4$ fourth channels are optical channels which are distinguished from each other on the basis of at least either the transmission directions or wavelengths thereof, and at least the $n_1$ first channels and the $n_3$ third channels are optical channels having different wavelengths, at least the $n_2$ second channels and the $n_4$ fourth channels are optical channels having different wavelengths, at least the $n_1$ first channels and the $n_4$ fourth channels are optical channels having different wavelengths, and at least the $n_2$ second channels and the $n_4$ fourth channels are optical channels having different wavelengths.

10. A system according to claim 2, wherein said node device further comprises means for extracting the third channel from outputs from said first output means of the own node device, and inputting the extracted third channel to said third receiving means, and means for extracting the fourth channel from outputs from said second output means of the own node device, and inputting the extracted fourth channel to said fourth receiving means.

11. A system according to claim 10, wherein the $n_1$ first channels, the $n_2$ second channels, the $n_3$ third channels, and the $n_4$ fourth channels are optical channels which are distinguished from each other on the basis of at least either the transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

12. A system according to claim 1, wherein said first buffer means reads out a packet to be transmitted in the second direction of input packets when said first buffer means is connected to the third channel, and said second buffer means reads out a packet to be transmitted in the first direction of input packets when said second buffer means is connected to the fourth channel.

13. A system according to claim 4, wherein transmission channels of at least the $n_1$ variable channel transmitters corresponding to the $n_1$ first buffer means of said $n_1+n_4$ variable channel transmitters of said first output means are controlled to change in accordance with a pattern for selecting the $n_1$ first channels and the $n_3$ third channels in turn, and transmission channels of at least the $n_2$ variable channel transmitters corresponding to the $n_2$ second buffer means of said $n_2+n_3$ variable channel transmitters of said second output means are controlled to change in accordance with a pattern for selecting the $n_2$ second channels and the $n_4$ fourth channels in turn.

14. A system according to claim 13, wherein the transmission channels of the $n_1$ variable channel transmitters are controlled to change in accordance with identical patterns having different selection timings, and the transmission channels of the $n_2$ variable channel transmitters are controlled to change in accordance with identical patterns having different selection timings.

15. A system according to claim 13, wherein transmission channels of at least the $n_4$ variable channel transmitters corresponding to the $n_4$ fourth buffer means of said $n_1+n_4$ variable channel transmitters of said first output means are controlled to change in accordance with a pattern for selecting at least the $n_1$ first channels in turn, and transmission channels of at least the $n_3$ variable channel transmitters corresponding to the $n_3$ third buffer means of said $n_2+n_3$ variable channel transmitters of said second output means are controlled to change in accordance with a pattern for selecting at least the $n_2$ second channels in turn.

16. A system according to claim 4, wherein transmission channels of said $n_1+n_4$ variable channel transmitters of said first output means are controlled to change in accordance with identical patterns which select the $n_1$ first channels and the $n_3$ third channels in turn and have different selection timings, and transmission channels of said $n_2+n_3$ variable channel transmitters of said second output means are controlled to change in accordance with identical patterns which select the $n_2$ second channels and the $n_4$ fourth channels in turn and have different selection timings.

17. A system according to claim 13, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects odd wavelengths in turn in an ascending order starting from a first wavelength when the channels to be selected by the pattern are arranged in an order of shorter wavelengths, selects a largest even wavelength after a largest odd wavelength is selected, selects even wavelengths in a descending order, and selects the first wavelength again after a second wavelength is selected.

18. A system according to claim 16, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects odd wavelengths in turn in an ascending order starting from a first wavelength when the channels to be selected by the pattern are arranged in an order of shorter wavelengths, selects a largest even wavelength after a largest odd wavelength is selected, selects even wavelengths in a descending order, and selects the first wavelength again after a second wavelength is selected.

19. A system according to claim 13, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects even wavelengths in turn in an ascending order starting from a second wavelength when the channels to be selected by the pattern are arranged in an order of shorter wavelengths, selects a largest odd wavelength after a largest even wavelength is selected, selects odd wavelengths in a descending order, and selects the second wavelength again after a first wavelength is selected.

20. A system according to claim 16, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects even wavelengths in turn in an ascending order starting from a second wavelength when the channels to be selected by the pattern are arranged in an order of shorter wavelengths, selects a largest odd wavelength after a largest even wavelength is selected, selects odd wavelengths in a descending order, and selects the second wavelength again after a first wavelength is selected.

21. A system according to claim 1, wherein the plurality of node devices are connected in a ring pattern.

22. A system according to claim 1, wherein said node device further comprises separation means for separating a packet to be output onto a sub transmission path from packets transmitted by some of the plurality of channels, and outputting the separated packet onto the sub transmission path.

23. A system according to claim 1, wherein said node device further comprises insertion means for inserting a packet to be output to another node device via one of the buffer means and one of the output means into a packet flow received by one of the receiving means.

24. A node device used in a network system which connects a plurality of node devices via a transmission path for transmitting a plurality of channels, and transmits packets between the node devices in a first direction and a second direction opposite to the first direction, comprising:

first communication means constituted by first receiving means for receiving a first channel, transmitted in the first direction, of the plurality of channels, and first buffer means for temporarily storing a packet received by said first receiving means;

second communication means constituted by second receiving means for receiving a second channel, transmitted in the second direction, of the plurality of channels, and second buffer means for temporarily storing a packet received by said second receiving means;

third communication means constituted by third receiving means for receiving a third channel different from the first and second channels, and third buffer means for temporarily storing a packet received by said third receiving means;

fourth communication means constituted by fourth receiving means for receiving a fourth channel different from the first, second, and third channels, and fourth buffer means for temporarily storing a packet received by said fourth receiving means;

first output means for connecting said first and fourth buffer means to different channels of the first and third channels, wherein said first output means can switch the channels to which said first and fourth buffer means are connected;

second output means for connecting said second and third buffer means to different channels of the second and fourth channels, wherein said second output means can switch the channels to which said second and third buffer means are connected; and buffer control means for controlling said first, second, third, and fourth buffer means so that packets to be output by the channels to which said first, second, third, and fourth buffer means are connected are read out from said first, second, third, and fourth buffer means.

25. A device according to claim 24, wherein $n_1$ first channels ($n_1$ is an integer not less than 1), $n_2$ second channels ($n_2$ is an integer not less than 1), $n_3$ third channels ($n_3$ is an integer not less than 1), and $n_4$ fourth channels ($n_4$ is an integer not less than 1) are provided, said node device comprises $n_1$ first communication means equivalent to said first communication means, $n_2$ second communication means equivalent to said second communication means, $n_3$ third communication means equivalent to said third communication means, and $n_4$ fourth communication means equivalent to said fourth communication means, the $n_1$ first receiving means of said $n_1$ first communication means respectively receive different channels of the $n_1$ first channels, the $n_2$ second receiving means of said $n_2$ second communication means respectively receive different channels of the $n_2$ second channels, the $n_3$ third receiving means of said $n_3$ third communication means respectively receive different channels of the $n_3$ third channels, and the $n_4$ fourth receiving means of said $n_4$ fourth communication means respectively receive different channels of the $n_4$ fourth channels, said first output means connect the $n_1$ first buffer means and the $n_4$ fourth buffer means to different channels of the $n_1$ first channels and the $n_3$ third channels, wherein said first output means can switch the channels to which the $n_1$ first buffer means and the $n_4$ fourth buffer means are connected, and said second output means connect the $n_2$ second buffer means and the $n_3$ third buffer means to different channels of the $n_2$ second channels and the $n_4$ fourth channels, wherein said second output means can switch the channels to which the $n_2$ second buffer means and the $n_3$ third buffer means are connected.

26. A device according to claim 25, wherein $n_1$ and $n_2$ are equal to each other, and $n_3$ and $n_4$ are equal to each other.

27. A device according to claim 25, wherein said first output means comprises $n_1+n_4$ variable channel transmitters respectively corresponding to the $n_1$ first buffer means and the $n_4$ fourth buffer means, and said second output means comprises $n_2+n_3$ variable channel transmitters respectively corresponding to the $n_2$ second buffer means and the $n_3$ third buffer means.

28. A device according to claim 25, wherein said first output means comprises $n_1+n_3$ fixed channel transmitters for performing transmission using different channels of the $n_1$ first channels and the $n_3$ third channels, and first connection alteration means which has $n_1+n_4$ input terminals respectively corresponding to the $n_1$ first buffer means and the $n_4$ fourth buffer means and $n_1+n_3$ output terminals respectively corresponding to said $n_1+n_3$ fixed channel transmitters, and can alter a connection relationship between the input and output terminals, and said second output means comprises $n_2+n_4$ fixed channel transmitters for performing transmission using different channels of the $n_2$ first channels and the $n_4$ third channels, and second connection alteration means which has $n_2+n_3$ input terminals respectively corresponding to the $n_2$ first buffer means and the $n_3$ third buffer means and $n_2+n_4$ output terminals respectively corresponding to said $n_2+n_4$ fixed channel transmitters, and can alter a connection relationship between the input and output terminals.

29. A device according to claim 25, wherein said third receiving means receives the third channel transmitted from the output means of another node device at an upstream side in the first direction, and said fourth receiving means receives the fourth channel transmitted from the output means of another node device at an upstream side in the second direction.

30. A device according to claim 29, wherein the $n_1$ first channels, the $n_2$ second channels, the $n_3$ third channels, and the $n_4$ fourth channels are optical channels which are distinguished from each other on the basis of at least either the transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

31. A device according to claim 25, wherein said first output means outputs the third channel in the first direction, and said second output means outputs the fourth channel in the second direction, and said node device further comprises means for extracting the third channel from the channels transmitted in the first direction and outputting the extracted third channel in the second direction, and means for extracting the fourth channel from the channels transmitted in the second direction and outputting the extracted fourth channel in the first direction.

32. A device according to claim 31, wherein the $n_1$ first channels, the $n_2$ second channels, the $n_3$ third channels, and the $n_4$ fourth channels are optical channels which are distinguished from each other on the basis of at least either the transmission directions or wavelengths thereof, and at least the $n_1$ first channels and the $n_3$ third channels are optical channels having different wavelengths, at least the $n_2$ second channels and the $n_4$ fourth channels are optical channels having different wavelengths, at least the $n_1$ first channels and the $n_4$ fourth channels are optical channels having different wavelengths, and at least the $n_2$ second channels and the $n_4$ fourth channels are optical channels having different wavelengths.

33. A device according to claim 25, further comprising means for extracting the third channel from outputs from said first output means of the own node device, and inputting the extracted third channel to said third receiving means, and means for extracting the fourth channel from outputs from said second output means of the own node device, and inputting the extracted fourth channel to said fourth receiving means.

34. A device according to claim 33, wherein the $n_1$ first channels, the $n_2$ second channels, the $n_3$ third channels, and the $n_4$ fourth channels are optical channels which are distinguished from each other on the basis of at least either the transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

35. A device according to claim 24, wherein said first buffer means reads out a packet to be transmitted in the second direction of input packets when said first buffer means is connected to the third channel, and said second buffer means reads out a packet to be transmitted in the first direction of input packets when said second buffer means is connected to the fourth channel.

36. A device according to claim 27, wherein transmission channels of at least the $n_1$ variable channel transmitters corresponding to the $n_1$ first buffer means of said $n_1+n_4$ variable channel transmitters of said first output means are controlled to change in accordance with a pattern for selecting the $n_1$ first channels and the $n_3$ third channels in turn, and transmission channels of at least the $n_2$ variable channel transmitters corresponding to the $n_2$ second buffer means of said $n_2+n_3$ variable channel transmitters of said second output means are controlled to change in accordance with a pattern for selecting the $n_2$ second channels and the $n_4$ fourth channels in turn.

37. A device according to claim 36, wherein the transmission channels of the $n_1$ variable channel transmitters are controlled to change in accordance with identical patterns having different selection timings, and the transmission channels of the $n_2$ variable channel transmitters are controlled to change in accordance with identical patterns having different selection timings.

38. A device according to claim 36, wherein transmission channels of at least the $n_4$ variable channel transmitters corresponding to the $n_4$ fourth buffer means of said $n_1+n_4$ variable channel transmitters of said first output means are controlled to change in accordance with a pattern for selecting at least the $n_1$ first channels in turn, and transmission channels of at least the $n_3$ variable channel transmitters corresponding to the $n_3$ third buffer means of said $n_2+n_3$ variable channel transmitters of said second output means are controlled to change in accordance with a pattern for selecting at least the $n_2$ second channels in turn.

39. A device according to claim 27, wherein transmission channels of said $n_1+n_4$ variable channel transmitters of said first output means are controlled to change in accordance with identical patterns which select the $n_1$ first channels and the $n_3$ third channels in turn and have different selection timings, and transmission channels of said $n_2+n_3$ variable channel transmitters of said second output means are controlled to change in accordance with identical patterns which select the $n_2$ second channels and the $n_4$ fourth channels in turn and have different selection timings.

40. A device according to claim 36, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects odd wavelengths in turn in an ascending order starting from a first wavelength when the channels to be selected by the pattern are arranged in an order of shorter wavelengths, selects a largest even wavelength after a largest odd wavelength is selected, selects even wavelengths in a descending order, and selects the first wavelength again after a second wavelength is selected.

41. A device according to claim 39, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects odd wavelengths in turn in an ascending order starting from a first wavelength when the channels to be selected by the pattern are arranged in an order of shorter wavelengths, selects a largest even wavelength after a largest odd wavelength is selected, selects even wavelengths in a descending order, and selects the first wavelength again after a second wavelength is selected.

42. A device according to claim 36, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects even wavelengths in turn in an ascending order starting from a second wavelength when the channels to be selected by the pattern are arranged in an order of shorter wavelengths, selects a largest odd wavelength after a largest even wavelength is selected, selects odd wavelengths in a descending order, and selects the second wavelength again after a first wavelength is selected.

43. A device according to claim 39, wherein the $n_1$ first channels, the $n_2$ second channels, the $n_3$ third channels, and the $n_4$ fourth channels are optical channels which are distinguished from each other on the basis of at least either the transmission directions or wavelengths thereof, and the pattern for selecting the plurality of channels in turn selects even wavelengths in turn in an ascending order starting from a second wavelength when the channels to be selected by the pattern are arranged in an order of shorter wavelengths, selects a largest odd wavelength after a largest even wavelength is selected, selects odd wavelengths in a descending order, and selects the second wavelength again after a first wavelength is selected.

44. A device according to claim 24, further comprising separation means for separating a packet to be output onto a sub transmission path from packets transmitted by some of the plurality of channels, and outputting the separated packet onto the sub transmission path.

45. A device according to claim 24, further comprising insertion means for inserting a packet to be output to another node device via one of the buffer means and one of the output means into a packet flow received by one of the receiving means.

46. A network system which connects a plurality of node devices via a transmission path, comprising:

the transmission path, said transmission path having a plurality of channels including first, second, third and fourth channels, said system transmitting signals over the channels in a first direction and in a second direction opposite to the first direction; and one of the node devices, said node device comprising:

first buffer means for temporarily storing a signal transmitted over the first channel in the first direction;

second buffer means for temporarily storing a signal transmitted over the second channel in the second direction;

third buffer means for temporarily storing a signal transmitted over the third channel different from the first and second channels;

fourth buffer means for temporarily storing a signal transmitted over the fourth channel different from the first, second, and third channels;

first output means for connecting said first buffer means to the first and third channels and for connecting said fourth buffer means to at least the first channel, wherein said first output means can switch the channels to which said first and fourth buffer means are connected;

second output means for connecting said second buffer means to the second and fourth channels and for connecting said third buffer means to at least the second channel, wherein said second output means can switch the channels to which said second and third buffer means are connected; and buffer control means for controlling said first, second, third, and fourth buffer means so that signals to be output over the channels to which said first, second, third, and fourth buffer means are connected are read out from said first, second, third, and fourth buffer means.

47. A system according to claim 46, wherein $n_1$ first channels ($n_1$ is an integer not less than 1), $n_2$ second channels ($n_2$ is an integer not less than 1), $n_3$ third channels ($n_3$ is an integer not less than 1), and $n_4$ fourth channels ($n_4$ is an integer not less than 1) are provided, said node device comprises $n_1$ first buffer means, $n_2$ second buffer means, $n_3$ third buffer means, and $n_4$ fourth buffer, the $n_1$ first buffer means respectively temporarily store signals transmitted over different channels of the $n_1$ first channels, the $n_2$ second buffer means respectively temporarily store signals transmitted over different channels of the $n_2$ second channels, the $n_3$ third buffer means respectively temporarily store signal transmitted over different channels of the $n_3$ third channels, and the $n_4$ fourth buffer means respectively temporarily store signals transmitted over different channels of the $n_4$ fourth channels, said first output means connects the $n_1$ first buffer means to different channels of the $n_1$ first channels and the $n_3$ third channels, and connects the $n_4$ fourth buffer means to different channels of at least the $n_1$ first channels, wherein said first output means can switch the channels to which the $n_1$ first buffer means and the $n_4$ fourth buffer means are connected, and said first output means performs its connection action such that the $n_1$ first buffer means and the $n_4$ fourth buffer means are not concurrently connected to the same channel, and said second output means connects the $n_2$ second buffer means to different channels of the $n_2$ second channels and the $n_4$ fourth channels and connects the $n_3$ third buffer means to different channels of at least the $n_2$ second channels, wherein said second output means can switch the channels to which the $n_2$ second buffer means and the $n_3$ third buffer means are connected, and said second output means performs its connection action such that the $n_2$ second buffer means and the $n_3$ third buffer means are not concurrently connected to the same channel.

48. A system according to claim 47, wherein said first output means concurrently connects all of said buffer means to different channels, and said second output means concurrently connects all of said buffer means to different channels.

49. A system according to claim 48, wherein said first output means in turn changes channels to which all of said buffer means are connected, and said second output means in turn changes channels to which all of said buffer means are connected.

50. A system according to claim 47, wherein said first output means comprises $n_1+n_4$ variable channel transmitters respectively corresponding to the $n_1$ first buffer means and the $n_4$ fourth buffer means, and said second output means comprises $n_2+n_3$ variable channel transmitters respectively corresponding to the $n_2$ second buffer means and the $n_3$ third buffer means.

51. A system according to claim 50, wherein transmission channels of at least the $n_1$ variable channel transmitters corresponding to the $n_1$ first buffer means of said $n_1+n_4$ variable channel transmitters of said first output means are controlled to change in accordance with a pattern for selecting the $n_1$ first channels and the $n_3$ third channels in turn, and transmission channels of at least the $n_2$ variable channel transmitters corresponding to the $n_2$ second buffer means of said $n_2+n_3$ variable channel transmitters of said second output means are controlled to change in accordance with a pattern for selecting the $n_2$ second channels and the $n_4$ fourth channels in turn.

52. A system according to claim 51, wherein the transmission channels of the $n_1$ variable channel transmitters are controlled to change in accordance with identical patterns having different selection timings, and the transmission channels of the $n_2$ variable channel transmitters are controlled to change in accordance with identical patterns having different selection timings.

53. A system according to claim 50, wherein transmission channels of at least the $n_4$ variable channel transmitters corresponding to the $n_4$ fourth buffer means of said $n_1+n_4$ variable channel transmitters of said first output means are controlled to change in accordance with a pattern for selecting at least the $n_1$ first channels in turn, and transmission channels of at least the $n_3$ variable channel transmitters corresponding to the $n_3$ third buffer means of said $n_2+n_3$ variable channel transmitters of said second output means are controlled to change in accordance with a pattern for selecting at least the $n_2$ second channels in turn.

54. A system according to claim 50, wherein transmission channels of said $n_1+n_4$ variable channel transmitters of said first output means are controlled to change in accordance with identical patterns which select the $n_1$ first channels and the $n_3$ third channels in turn and have different selection timings, and transmission channels of said $n_2+n_3$ variable channel transmitters of said second output means are controlled to change in accordance with identical patterns which select the $n_2$ second channels and the $n_4$ fourth channels in turn and have different selection timings.

55. A system according to claim 47, wherein the first output means comprises first connection alteration means which has input terminals respectively corresponding to the $n_1$ first buffer means and the $n_4$ fourth buffer means and output terminals respectively corresponding to the $n_1$ first channels and the $n_3$ third channels, and can alter a connection relationship between its input and output terminals, and said second output means comprises second connection alteration means which has input terminals respectively corresponding to the $n_2$ second buffer means and the $n_3$ third buffer means and output terminals respectively corresponding to the $n_2$ second channels and the $n_4$ fourth channels, and can alter a connection relationship between its input and output terminals.

56. A system according to claim 55, wherein said first output means is controlled such that at least $n_1$ input terminals of said input terminals of said first connection alteration means respectively corresponding to the $n_1$ first buffer means are in turn connected to the output terminals respectively corresponding to the $n_1$ first channels and the $n_3$ third channels, and said second output means is controlled such that at least $n_2$ input terminals of said input terminals of said second connection alteration means respectively corresponding to the $n_2$ second buffer means are in turn connected to the output terminals respectively corresponding to the $n_2$ second channels and the $n_4$ fourth channels.

57. A system according to claim 56, wherein said first connection alteration means is controlled such that the output terminals to be connected to the $n_1$ input terminals corresponding to the $n_1$ first buffer means are changed in accordance with identical patterns whose connection timings are deviated from each other, and said second connection alteration means is controlled such that the output terminals to be connected to the $n_2$ input terminals corresponding to the $n_2$ second buffer means are changed in accordance with identical patterns whose connection timings are deviated from each other.

58. A system according to claim 55, wherein said first output means is controlled such that at least $n_4$ input terminals of said input terminals of said first connection alteration means respectively corresponding to the $n_4$ fourth buffer means are in turn connected to the output terminals respectively corresponding to at least the $n_1$ first channels, and said second output means is controlled such that at least $n_3$ input terminals of said input terminals of said second connection alteration means respectively corresponding to at least the $n_3$ third buffer means are in turn connected to the output terminals respectively corresponding to at least the $n_2$ second channels.

59. A system according to claim 58, wherein the first connection alteration means is controlled such that the output terminals to be connected to the $n_4$ input terminals corresponding to the $n_4$ fourth buffer means are changed in accordance with identical patterns whose connection timings are deviated from each other, and said second connecting alteration means is controlled such that the output terminals to be connected to the $n_3$ input terminals corresponding to the $n_3$ third buffer means are changed in accordance with identical patterns whose connection timings are deviated from each other.

60. A system according to claim 55, wherein said first output means is controlled such that the input terminals of said first connection alteration means are in turn connected to the output terminals respectively corresponding to the $n_1$ first channels and the $n_3$ third channels, and said second output means is controlled such that the input terminals of said second connection alteration means are in turn connected to the output terminals respectively corresponding to the $n_2$ second channels and the $n_4$ fourth channels.

61. A system according to claim 60, wherein said first connection alteration means is controlled such that the output terminals to be connected to the input terminals are changed in accordance with identical patterns whose connection timings are deviated from each other, and said second connection alteration means is controlled such that the output terminals to be connected to the input terminals are changed in accordance with identical patterns whose connection timings are deviated from each other.

62. A system according to claim 46, wherein said third buffer means stores a signal transmitted over the third channel and output from an output means of a first other node device, the first other node device having a structure identical to that of said node device and being located upstream of said node device in the first direction, and said fourth buffer means stores a signal transmitted over the fourth channel and output from an output means of a second other node device, the second other node device having a structure identical to that of said node device and being located upstream of said node device in the second direction.

63. A system according to claim 62, wherein the $n_1$ first channels, the $n_2$ second channels, the $n_3$ third channels, and the $n_4$ fourth channels are optical channels which are distinguished from each other on the basis of at least either transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

64. A system according to claim 46, wherein said first output means outputs signals over the third channel in the first direction, and said second output means outputs signals over the fourth channel in the second direction, and said node device further comprises means for extracting signals in the third channel from signals in channels transmitted in the first direction and outputting the extracted third channel signals in the second direction, and means for extracting signals in the fourth channel from signals in channels transmitted in the second direction and outputting the extracted fourth channel signals in the first direction.

65. A system according to claim 64, wherein the $n_1$ first channels, the $n_2$ second channels, the $n_3$ third channels, and the $n_4$ fourth channels are optical channels which are distinguished from each other on the basis of at least either transmission directions or wavelengths thereof, and at least the $n_1$ first channels and the $n_3$ third channels are optical channels having different wavelengths, at least the $n_2$ second channels and the $n_4$ fourth channels are optical channels having different wavelengths, at least the $n_1$ first channels and the $n_4$ fourth channels are optical channels having different wavelengths, and at least the $n_2$ second channels and the $n_4$ fourth channels are optical channels having different wavelengths.

66. A system according to claim 46, wherein said node device further comprises means for extracting signals in the third channel from outputs from said first output means of said node device, and inputting the extracted third channel signal to said third buffer means, and means for extracting signals in the fourth channel from outputs from said second output means of said node device, and inputting the extracted fourth channel signals to said fourth buffer means.

67. A system according to claim 46, wherein the $n_1$ first channels, the $n_2$ second channels, the $n_3$ third channels, and the $n_4$ fourth channels are optical channels which are distinguished from each other on the basis of at least either transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

68. A system according to claim 46, wherein said first buffer means reads out a signal to be transmitted in the second direction of input signals when said first buffer means is connected to the third channel, and said second buffer means reads out a signal to be transmitted in the first direction of input signals when said second buffer means is connected to the fourth channel.

69. A system according to claim 46, further comprising a plurality of other node device having a structure identical to said node device and connected to each other and said node device via the transmission path in a ring pattern.

70. A system according to claim 46, wherein said node device further comprises separation means for separating a signal to be output onto a sub-transmission path from signals transmitted over some of the plurality of channels, and outputting the separated signal onto the sub-transmission path.

71. A system according to claim 46, wherein said node device further comprises insertion means for inserting a signal to be output via one of the buffer means and one of the output means into one of the channels.

72. A node device in a network system which connects a plurality of node devices via a transmission path, the transmission path having a plurality of channels including first, second, third and fourth channels, the system transmitting signals over the channels in a first direction and in a second direction opposite to the first direction, said node device comprising:

first buffer means for temporarily storing a signal transmitted over the first channel in the first direction;

second buffer means for temporarily storing a signal transmitted over the second channel in the second direction;

third buffer means for temporarily storing a signal transmitted over the third channel different from the first and second channels;

fourth buffer means for temporarily storing a signal transmitted over the fourth channel different from the first, second, and third channels;

first output means for connecting said first buffer means to the first and third channels and for connecting said fourth buffer means to at least the first channel, wherein said first output means can switch the channels to which said first and fourth buffer means are connected;

second output means for connecting said second buffer means to the second and fourth channels and for connecting said third buffer means to at least the second channel, wherein said second output means can switch the channels to which said second and third buffer means are connected; and buffer control means for controlling said first, second, third, and fourth buffer means so that signals to be output over the channels to which said first, second, third, and fourth buffer means are connected are read out from said first, second, third, and fourth buffer means.

73. A node device according to claim 72, wherein $n_1$ first channels ($n_1$ is an integer not less than 1), $n_2$ second channels ($n_2$ is an integer not less than 1), $n_3$ third channels ($n_3$ is an integer not less than 1), and $n_4$ fourth channels ($n_4$ is an integer not less than 1) are provided, said node device comprises $n_1$ first buffer means, $n_2$ second buffer means, $n_3$ third buffer means, and $n_4$ fourth buffer, the $n_1$ first buffer means respectively temporarily store signals transmitted over different channels of the $n_1$ first channels, the $n_2$ second buffer means respectively temporarily store signals transmitted over different channels of the $n_2$ second channels, the $n_3$ third buffer means respectively temporarily store signal transmitted over different channels of the $n_3$ third channels, and the $n_4$ fourth buffer means respectively temporarily store signals transmitted over different channels of the $n_4$ fourth channels, said first output means connects the $n_1$ first buffer means to different channels of the $n_1$ first channels and the $n_3$ third channels, and connects the $n_4$ fourth buffer means to different channels of at least the $n_1$ first channels, wherein said first output means can switch the channels to which the $n_1$ first buffer means and the $n_4$ fourth buffer means are connected, and said first output means performs its connection action such that the $n_1$ first buffer means and the $n_4$ fourth buffer means are not concurrently connected to the same channel, and said second output means connects the $n_2$ second buffer means to different channels of the $n_2$ second channels and the $n_4$ fourth channels and connects the $n_3$ third buffer means to different channels of at least the $n_2$ second channels, wherein said second output means can switch the channels to which the $n_2$ second buffer means and the $n_3$ third buffer means are connected, and said second output means performs its connection action such that the $n_2$ second buffer means and the $n_3$ third buffer means are not concurrently connected to the same channel.

74. A node device according to claim 73, wherein said first output means concurrently connects all of said buffer means to different channels, and said second output means concurrently connects all of said buffer means to different channels.

75. A node device according to claim 74, wherein said first output means in turn changes channels to which all of said buffer means are connected, and said second output means in turn changes channels to which all of said buffer means are connected.

76. A node device according to claim 73, wherein said first output means comprises $n_1+n_4$ variable channel transmitters respectively corresponding to the $n_1$ first buffer means and the $n_4$ fourth buffer means, and said second output means comprises $n_2+n_3$ variable channel transmitters respectively corresponding to the $n_2$ second buffer means and the $n_3$ third buffer means.

77. A node device according to claim 76, wherein transmission channels of at least the $n_1$ variable channel transmitters corresponding to the $n_1$ first buffer means of said $n_1+n_4$ variable channel transmitters of said first output means are controlled to change in accordance with a pattern for selecting the $n_1$ first channels and the $n_3$ third channels in turn, and transmission channels of at least the $n_2$ variable channel transmitters corresponding to the $n_2$ second buffer means of said $n_2+n_3$ variable channel transmitters of said second output means are controlled to change in accordance with a pattern for selecting the $n_2$ second channels and the $n_4$ fourth channels in turn.

78. A node device according to claim 77, wherein the transmission channels of the $n_1$ variable channel transmitters are controlled to change in accordance with identical patterns having different selection timings, and the transmission channels of the $n_2$ variable channel transmitters are controlled to change in accordance with identical patterns having different selection timings.

79. A node device according to claim 76, wherein transmission channels of at least the $n_4$ variable channel transmitters corresponding to the $n_4$ fourth buffer means of said $n_1+n_4$ variable channel transmitters of said first output means are controlled to change in accordance with a pattern for selecting at least the $n_1$ first channels in turn, and transmission channels of at least the $n_3$ variable channel transmitters corresponding to the $n_3$ third buffer means of said $n_2+n_3$ variable channel transmitters of said second output means are controlled to change in accordance with a pattern for selecting at least the $n_2$ second channels in turn.

80. A node device according to claim 76, wherein transmission channels of said $n_1+n_4$ variable channel transmitters of said first output means are controlled to change in accordance with identical patterns which select the $n_1$ first channels and the $n_3$ third channels in turn and have different selection timings, and transmission channels of said $n_2+n_3$ variable channel transmitters of said second output means are controlled to change in accordance with identical patterns which select the $n_2$ second channels and the $n_4$ fourth channels in turn and have different selection timings.

81. A node device according to claim 73, wherein the first output means comprises first connection alteration means which has input terminals respectively corresponding to the $n_1$ first buffer means and the $n_4$ fourth buffer means and output terminals respectively corresponding to the $n_1$ first channels and the $n_3$ third channels, and can alter a connection relationship between its input and output terminals, and said second output means comprises second connection alteration means which has input terminals respectively corresponding to the $n_2$ second buffer means and the $n_3$ third buffer means and output terminals respectively corresponding to the $n_2$ second channels and the $n_4$ fourth channels, and can alter a connection relationship between its input and output terminals.

82. A node device according to claim 81, wherein said first output means is controlled such that at least $n_1$ input terminals of said input terminals of said first connection alteration means respectively corresponding to the $n_1$ first buffer means are in turn connected to the output terminals respectively corresponding to the $n_1$ first channels and the $n_3$ third channels, and said second output means is controlled such that at least $n_2$ input terminals of said input terminals of said second connection alteration means respectively corresponding to the $n_2$ second buffer means are in turn connected to the output terminals respectively corresponding to the $n_2$ second channels and the $n_4$ fourth channels.

83. A node device according to claim 82, wherein said first connection alteration means is controlled such that the output terminals to be connected to the $n_1$ input terminals corresponding to the $n_1$ first buffer means are changed in accordance with identical patterns whose connection timings are deviated from each other, and said second connection alteration means is controlled such that the output terminals to be connected to the $n_2$ input terminals corresponding to the $n_2$ second buffer means are changed in accordance with identical patterns whose connection timings are deviated from each other.

84. A node device according to claim 81, wherein said first output means is controlled such that at least $n_4$ input terminals of said input terminals of said first connection alteration means respectively corresponding to the $n_4$ fourth buffer means are in turn connected to the output terminals respectively corresponding to at least the $n_1$ first channels, and said second output means is controlled such that at least $n_3$ input terminals of said input terminals of said second connection alteration means respectively corresponding to at least the $n_3$ third buffer means are in turn connected to the output terminals respectively corresponding to at least the $n_2$ second channels.

85. A node device according to claim 84, wherein the first connection alteration means is controlled such that the output terminals to be connected to the $n_4$ input terminals corresponding to the $n_4$ fourth buffer means are changed in accordance with identical patterns whose connection timings are deviated from each other, and said second connecting alteration means is controlled such that the output terminals to be connected to the $n_3$ input terminals corresponding to the $n_3$ third buffer means are changed in accordance with identical patterns whose connection timings are deviated from each other.

86. A system according to claim 81, wherein said first output means is controlled such that the input terminals of said first connection alteration means are in turn connected to the output terminals respectively corresponding to the $n_1$ first channels and the $n_3$ third channels, and said second output means is controlled such that the input terminals of said second connection alteration means are in turn connected to the output terminals respectively corresponding to the $n_2$ second channels and the $n_4$ fourth channels.

87. A node device according to claim 86, wherein said first connection alteration means is controlled such that the output terminals to be connected to the input terminals are changed in accordance with identical patterns whose connection timings are deviated from each other, and said second connection alteration means is controlled such that the output terminals to be connected to the input terminals are changed in accordance with identical patterns whose connection timings are deviated from each other.

88. A node device according to claim 72, wherein said third buffer means stores a signal transmitted over the third channel and output from an output means of a first other node device, the first other node device having a structure identical to that of said node device and being located upstream of said node device in the first direction, and said fourth buffer means stores a signal transmitted over the fourth channel and output from an output means of a second other node device, the second other node device having a structure identical to that of said node device and being located upstream of said node device in the second direction.

89. A node device according to claim 88, wherein the $n_1$ first channels, the $n_2$ second channels, the $n_3$ third channels, and the $n_4$ fourth channels are optical channels which are distinguished from each other on the basis of at least either transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

90. A node device according to claim 72, wherein said first output means outputs signals over the third channel in the first direction, and said second output means outputs signals over the fourth channel in the second direction, and said node device further comprises means for extracting signals in the third channel from signals in channels transmitted in the first direction and outputting the extracted third channel signals in the second direction, and means for extracting signals in the fourth channel from signals in channels transmitted in the second direction and outputting the extracted fourth channel signals in the first direction.

91. A node device according to claim 90, wherein the $n_1$ first channels, the $n_2$ second channels, the $n_3$ third channels, and the $n_4$ fourth channels are optical channels which are distinguished from each other on the basis of at least either transmission directions or wavelengths thereof, and at least the $n_1$ first channels and the $n_3$ third channels are optical channels having different wavelengths, at least the $n_2$ second channels and the $n_4$ fourth channels are optical channels having different wavelengths, at least the $n_1$ first channels and the $n_4$ fourth channels are optical channels having different wavelengths, and at least the $n_2$ second channels and the $n_4$ fourth channels are optical channels having different wavelengths.

92. A node device according to claim 72, wherein said node device further comprises means for extracting signals in the third channel from outputs from said first output means of said node device, and inputting the extracted third channel signal to said third buffer means, and means for extracting signals in the fourth channel from outputs from said second output means of said node device, and inputting the extracted fourth channel signals to said fourth buffer means.

93. A node device according to claim 72, wherein the $n_1$ first channels, the $n_2$ second channels, the $n_3$ third channels, and the $n_4$ fourth channels are optical channels which are distinguished from each other on the basis of at least either transmission directions or wavelengths thereof, and at least the $n_1$ first channels and the $n_3$ third channels are optical channels having different wavelengths, and at least the $n_2$ second channels and the $n_4$ fourth channels are optical channels having different wavelengths.

94. A node device according to claim 72, wherein said first buffer means reads out a signal to be transmitted in the second direction of input signals when said first buffer means is connected to the third channel, and said second buffer means reads out a signal to be transmitted in the first direction of input signals when said second buffer means is connected to the fourth channel.

95. A node device according to claim 72, further comprising a plurality of other node device having a structure identical to said node device and connected to each other and said node device via the transmission path in a ring pattern.

96. A node device according to claim 72, wherein said node device further comprises separation means for separating a signal to be output onto a sub-transmission path from signals transmitted over some of the plurality of channels, and outputting the separated signal onto the sub-transmission path.

97. A node device according to claim 72, wherein said node device further comprises insertion means for inserting a signal to be output via one of the buffer means and one of the output means into one of the channels.

* * * * *

UNITED STATES PATENT AND TRADEMARK OFFICE
CERTIFICATE OF CORRECTION

PATENT NO. : 5,777,762

DATED : July 7, 1998

INVENTOR(S): MITSURU YAMAMOTO

It is certified that error appears in the above-identified patent and that said Letters Patent is hereby corrected as shown below:

COLUMN 50

Line 20, "signal" should read --signals--.

COLUMN 54

Line 55, "signal" should read --signals--.

COLUMN 58

Line 42, "device" should read --devices--.

Signed and Sealed this

Fourteenth Day of September, 1999

Attest:

Q. TODD DICKINSON

Attesting Officer    Acting Commissioner of Patents and Trademarks